(12) United States Patent
Gonzalez Munoz et al.

(10) Patent No.: US 12,162,538 B2
(45) Date of Patent: Dec. 10, 2024

(54) DEVICES, SYSTEM AND ASSOCIATED METHODS FOR AERODYNAMIC DRAG REDUCTION USING TRIBODYNAMIC CELLS

(71) Applicants: Marcos A Gonzalez Munoz, Marengo, IL (US); Leah Marie Mitchell Gonzalez, Marengo, IL (US)

(72) Inventors: Marcos A Gonzalez Munoz, Marengo, IL (US); Leah Marie Mitchell Gonzalez, Marengo, IL (US)

( * ) Notice: Subject to any disclaimer, the term of this patent is extended or adjusted under 35 U.S.C. 154(b) by 308 days.

(21) Appl. No.: 17/817,179

(22) Filed: Aug. 3, 2022

(65) Prior Publication Data

US 2024/0059360 A1 Feb. 22, 2024

(51) Int. Cl.
*B62D 35/00* (2006.01)
*B62D 37/02* (2006.01)
*F15D 1/00* (2006.01)

(52) U.S. Cl.
CPC .......... *B62D 35/001* (2013.01); *B62D 37/02* (2013.01); *F15D 1/005* (2013.01)

(58) Field of Classification Search
CPC ....... B62D 35/001; B62D 37/02; F15D 1/005; F15D 1/12
See application file for complete search history.

(56) References Cited

U.S. PATENT DOCUMENTS

| | | | | |
|---|---|---|---|---|
| 5,844,518 A | * | 12/1998 | Berg | H01Q 17/008 342/4 |
| 7,810,867 B2 | * | 10/2010 | Salaverry | B62D 35/00 296/180.1 |
| 9,834,267 B1 | * | 12/2017 | Hanagan | B62D 35/00 |
| 11,932,317 B2 | * | 3/2024 | Logsdon | B62D 35/001 |
| 2006/0134379 A1 | * | 6/2006 | Pulkka | B64C 21/10 428/141 |
| 2009/0230725 A1 | * | 9/2009 | Juieng | B62D 35/00 296/1.01 |
| 2010/0090496 A1 | * | 4/2010 | Carlson | B62D 35/00 296/180.1 |
| 2017/0107011 A1 | * | 4/2017 | Melland | E04C 2/10 |

(Continued)

FOREIGN PATENT DOCUMENTS

| | | | | |
|---|---|---|---|---|
| CN | 109906854 A | * | 6/2019 | |
| DE | 102006045840 A1 | * | 5/2008 | ........... A01K 63/006 |

(Continued)

*Primary Examiner* — Lori Lyjak
(74) *Attorney, Agent, or Firm* — Collaborative IP; Paul Ditmyer

(57) ABSTRACT

The approach to the current problem of plastic deformation on the walls of the transportation truck is the development of a tribodynamic cell. This geometrically manufactured shape is able to reduce the force of more than 60.00% in a truck, more than 80.00% as a unit cell at standard speeds, and 90.00% at sonic range velocities. This reduction signifies an economic savings in fuel, service life of the transportation system, as well as reducing the carbon footprint locally and worldwide. Strategically, the tribodynamic cell embodiments convert the immediate surrounding airflow into a surface capable of lowering friction drastically and achieving supersonic speeds in half the time compared to a surface without the geometrically enhanced approach.

20 Claims, 31 Drawing Sheets

(56) References Cited

U.S. PATENT DOCUMENTS

| | | | | |
|---|---|---|---|---|
| 2018/0226917 A1* | 8/2018 | Jacques | .................... | E04B 2/72 |
| 2018/0312203 A1* | 11/2018 | Smith | .................. | B62D 35/001 |
| 2020/0023911 A1* | 1/2020 | Otterstrom | ............. | B62D 35/02 |
| 2021/0231141 A1* | 7/2021 | Smith | .................... | B64C 21/10 |
| 2022/0056935 A1* | 2/2022 | Scott | ........................ | F15D 1/10 |
| 2023/0330492 A1* | 10/2023 | Madson | ........... | A63B 37/00065 |
| 2023/0415825 A1* | 12/2023 | Smith | ................... | B62D 37/02 |

FOREIGN PATENT DOCUMENTS

| | | | | | |
|---|---|---|---|---|---|
| DE | 102015204569 A1 | * | 9/2016 | | |
| JP | 2004245811 A | * | 9/2004 | | |
| WO | WO-2015185925 A1 | * | 12/2015 | ............. | A47B 96/20 |

* cited by examiner

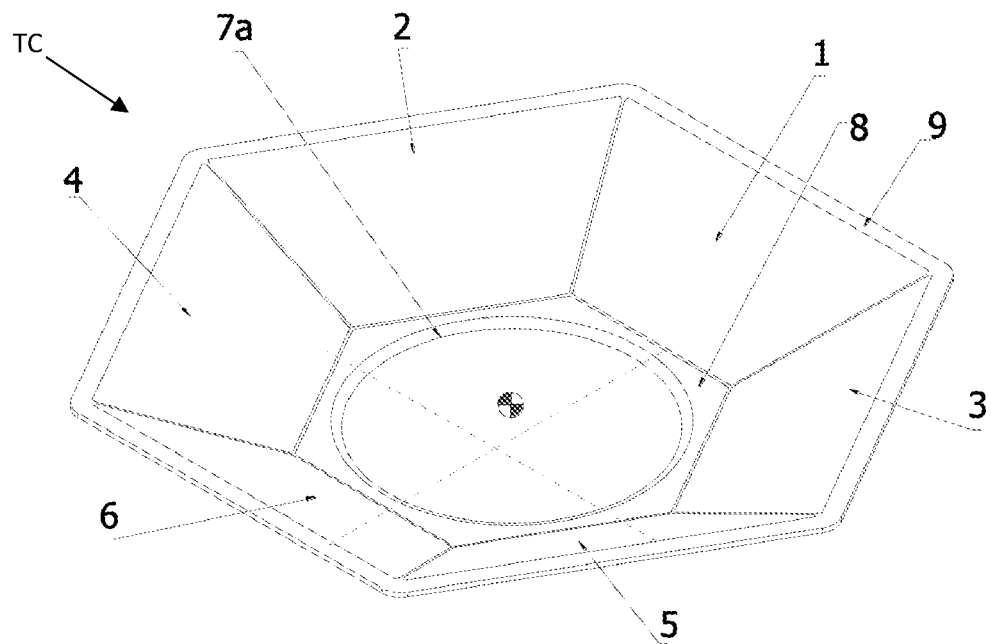
Fig. 1.0
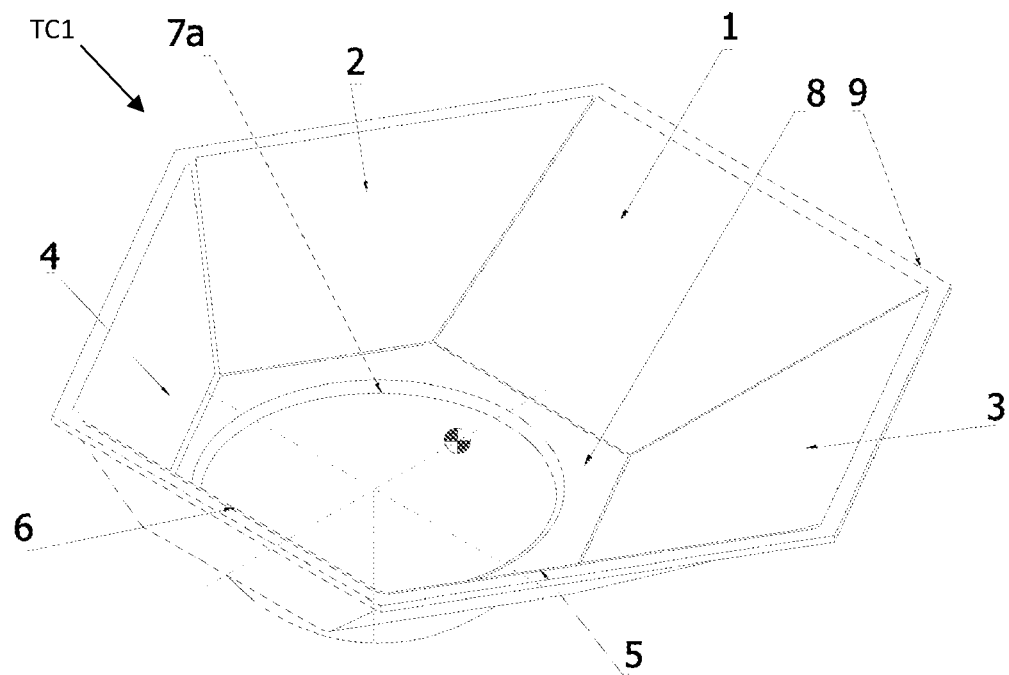
Fig. 1.1

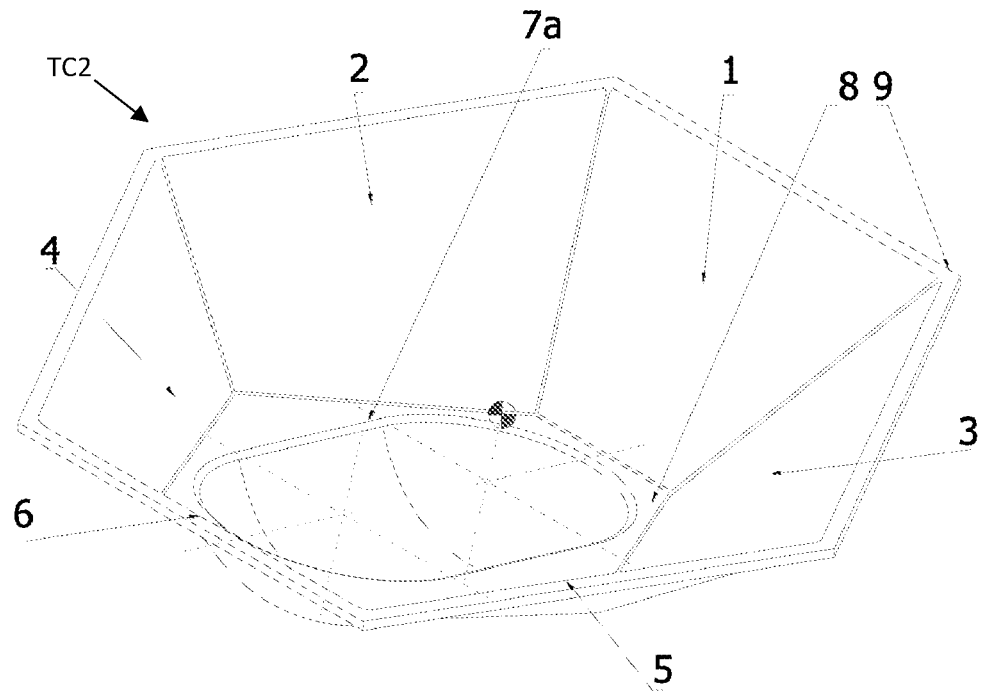
Fig. 1.2
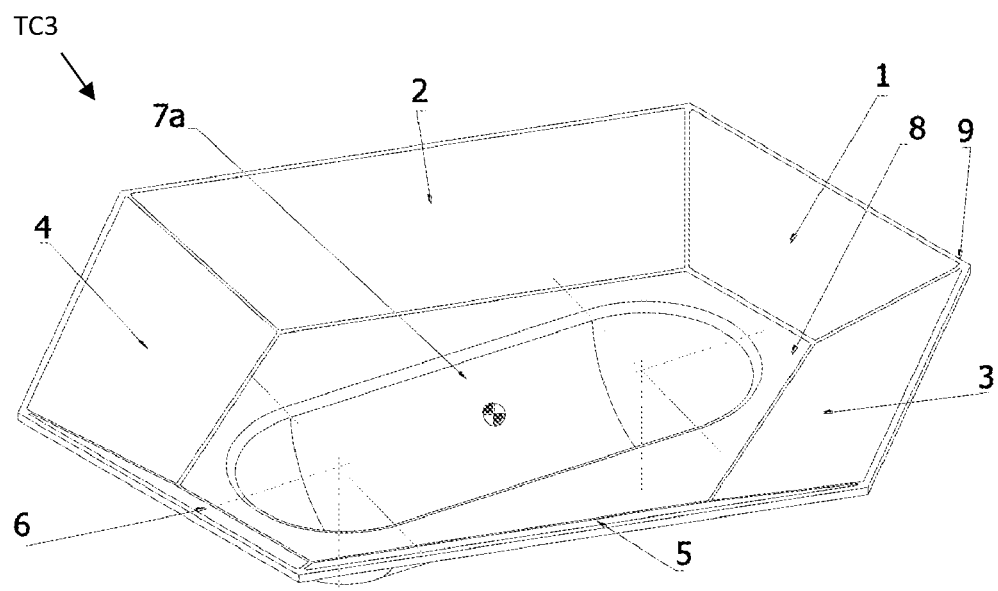
Fig. 1.3

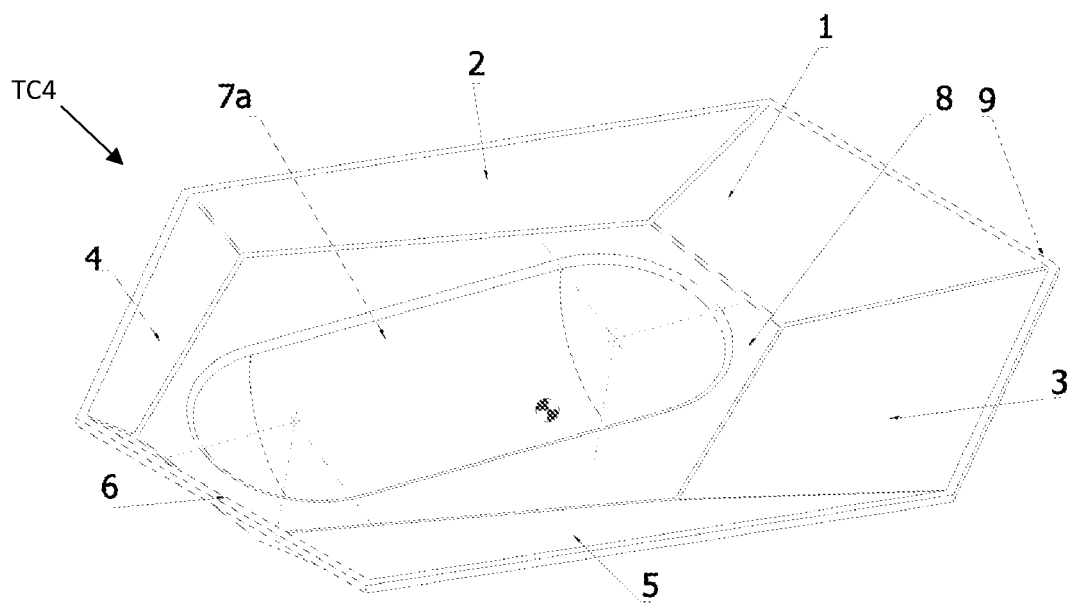
Fig. 1.4
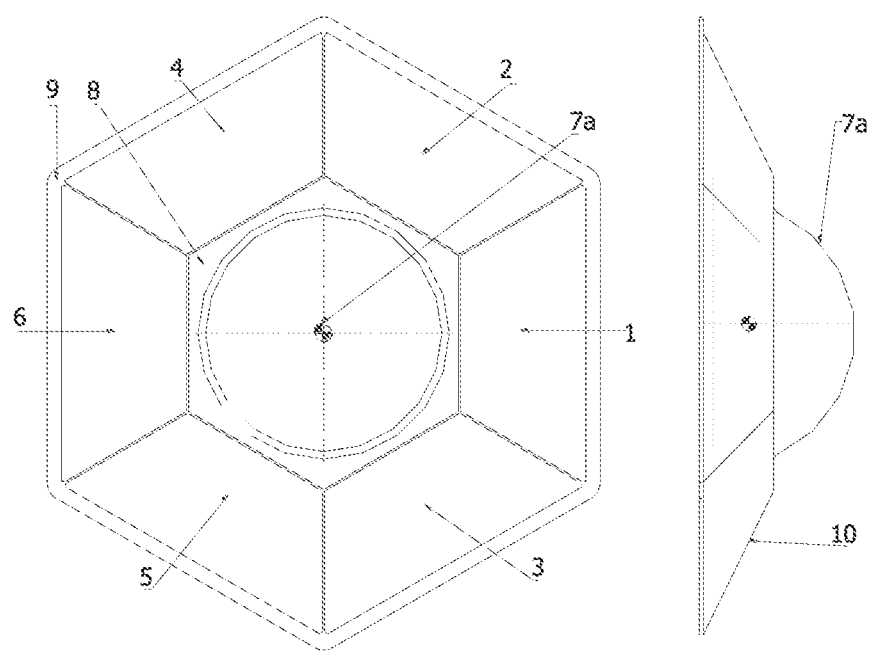
Fig. 2.0A
Fig. 2.0C
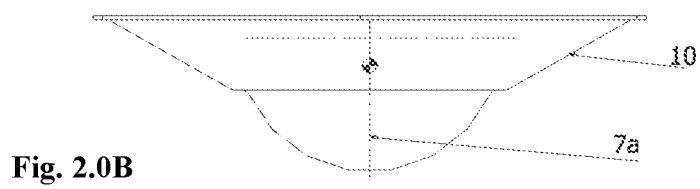
Fig. 2.0B

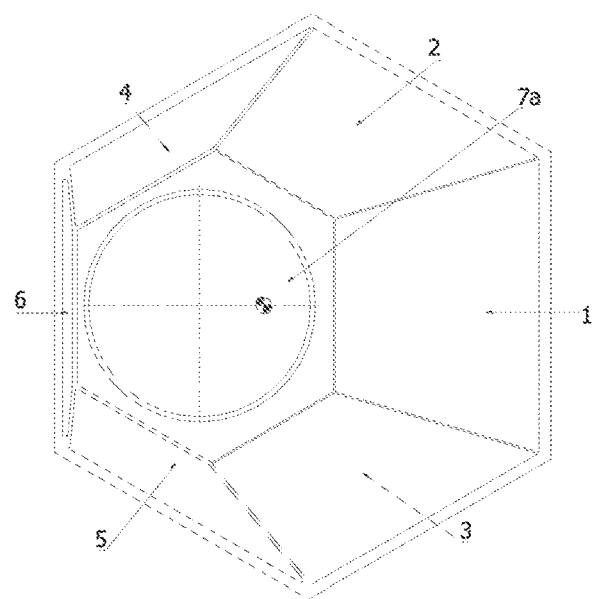
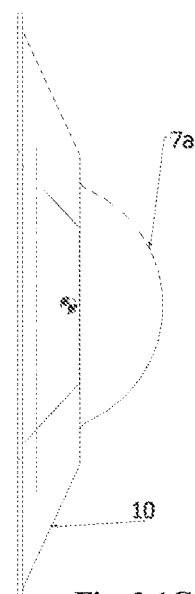
Fig. 2.1A
Fig. 2.1C
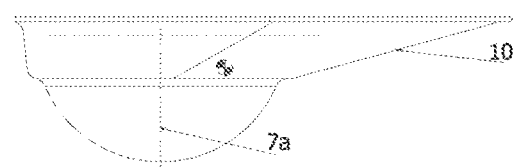
Fig. 2.1B
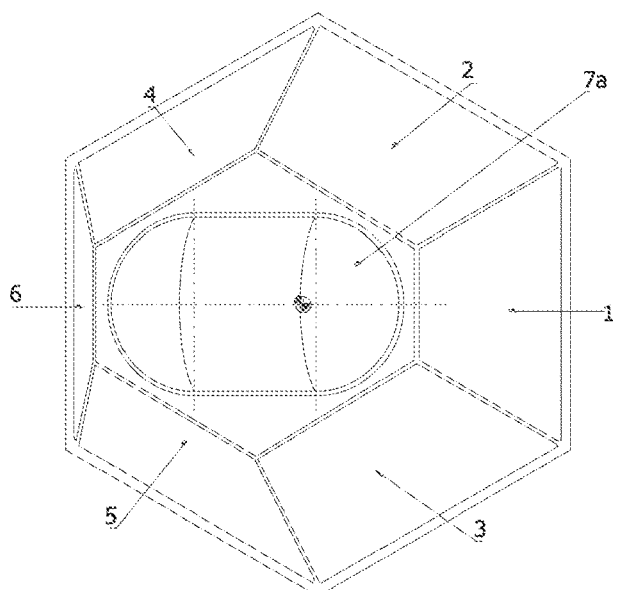
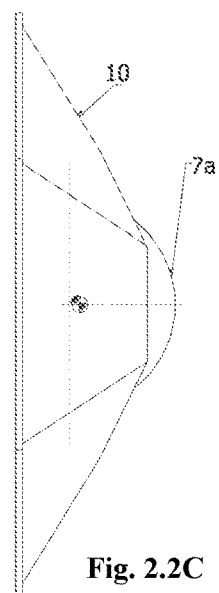
Fig. 2.2A
Fig. 2.2C
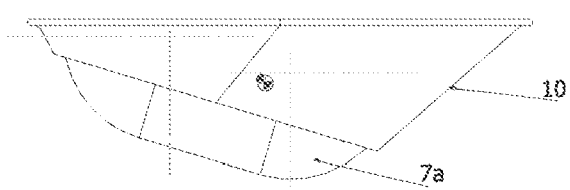
Fig. 2.2B

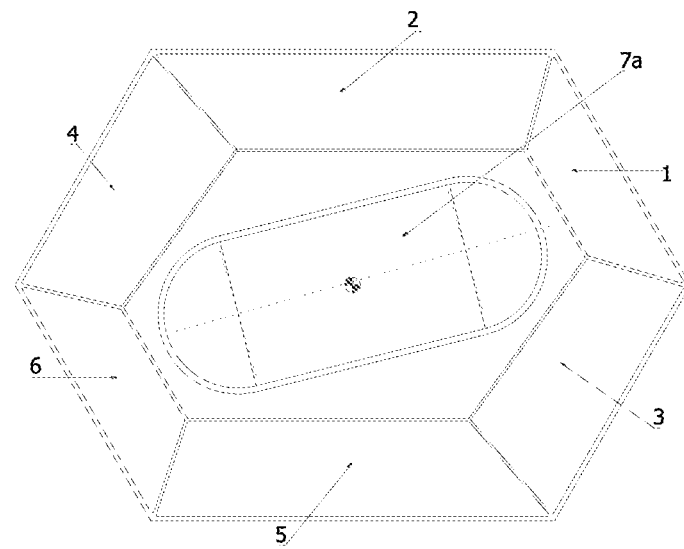
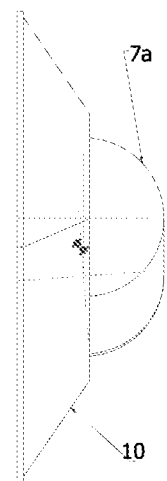
Fig. 2.3A
Fig. 2.3C
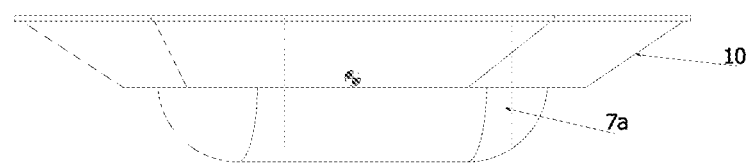
Fig. 2.3B
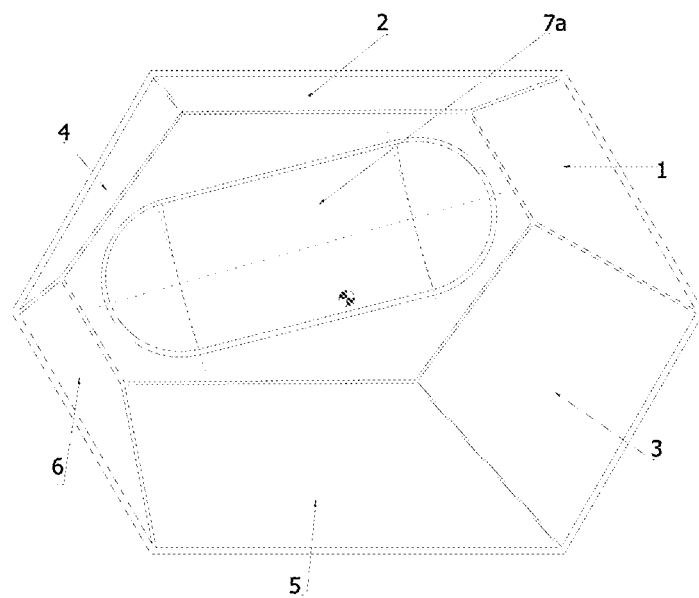
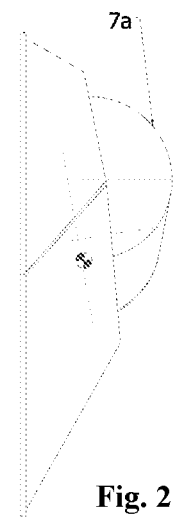
Fig. 2.4A
Fig. 2.4C
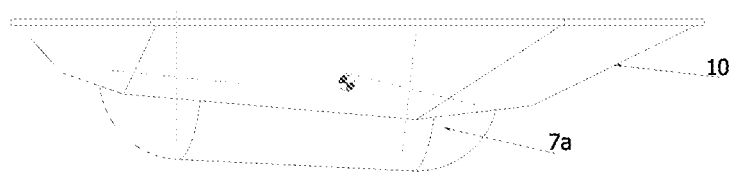
Fig. 2.4B

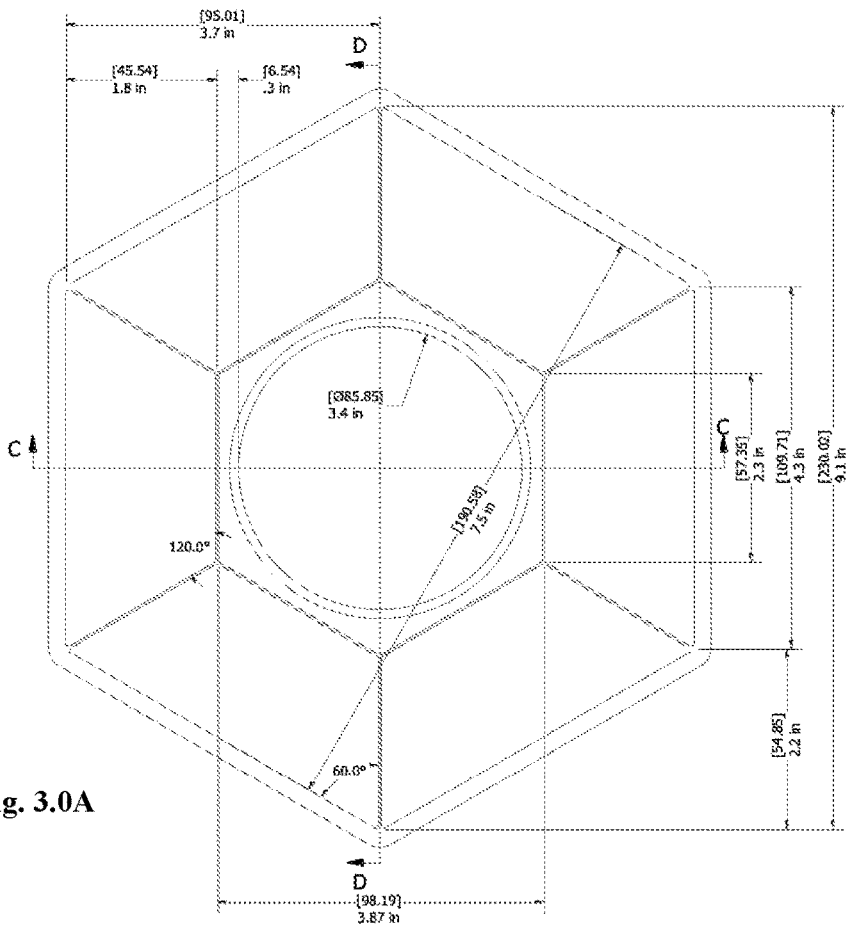
Fig. 3.0A
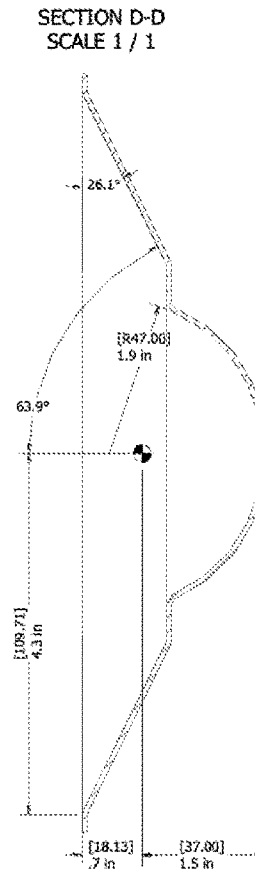
Fig. 3.0D
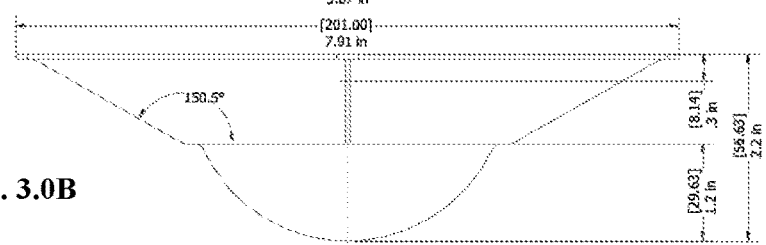
Fig. 3.0B
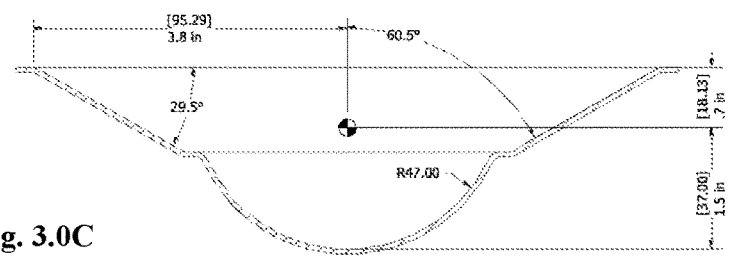
Fig. 3.0C

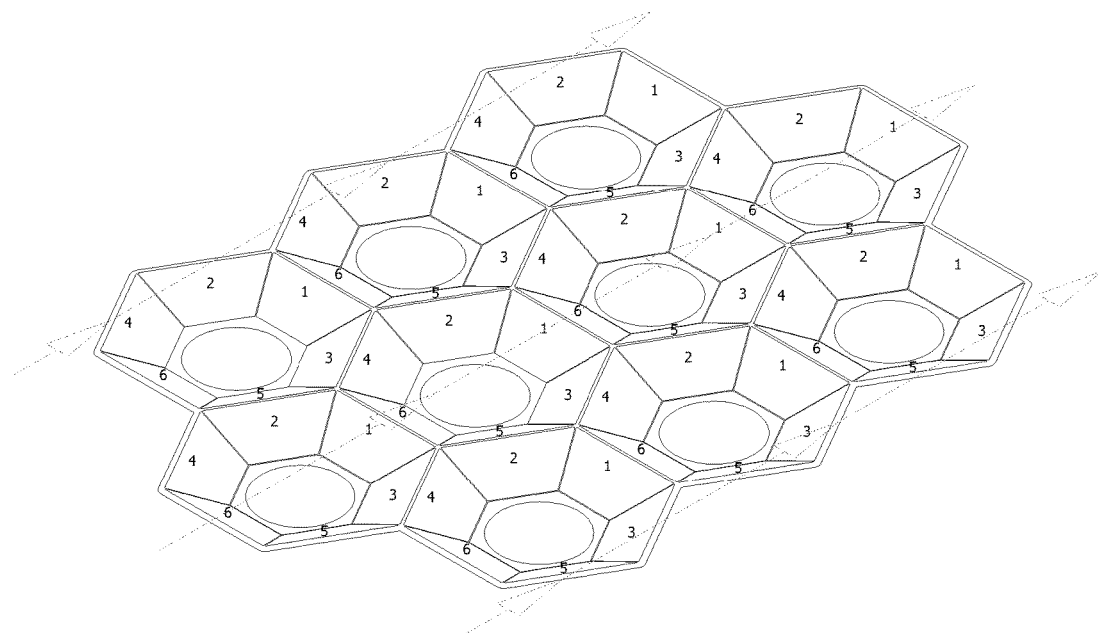
Fig. 4.0
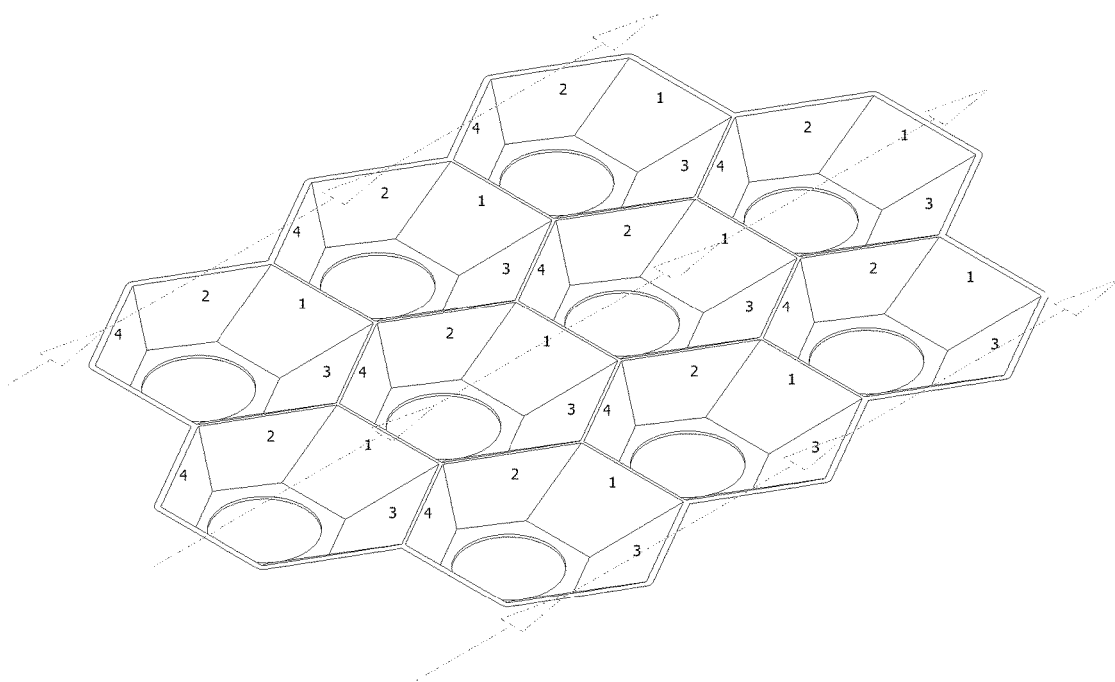
Fig. 4.1

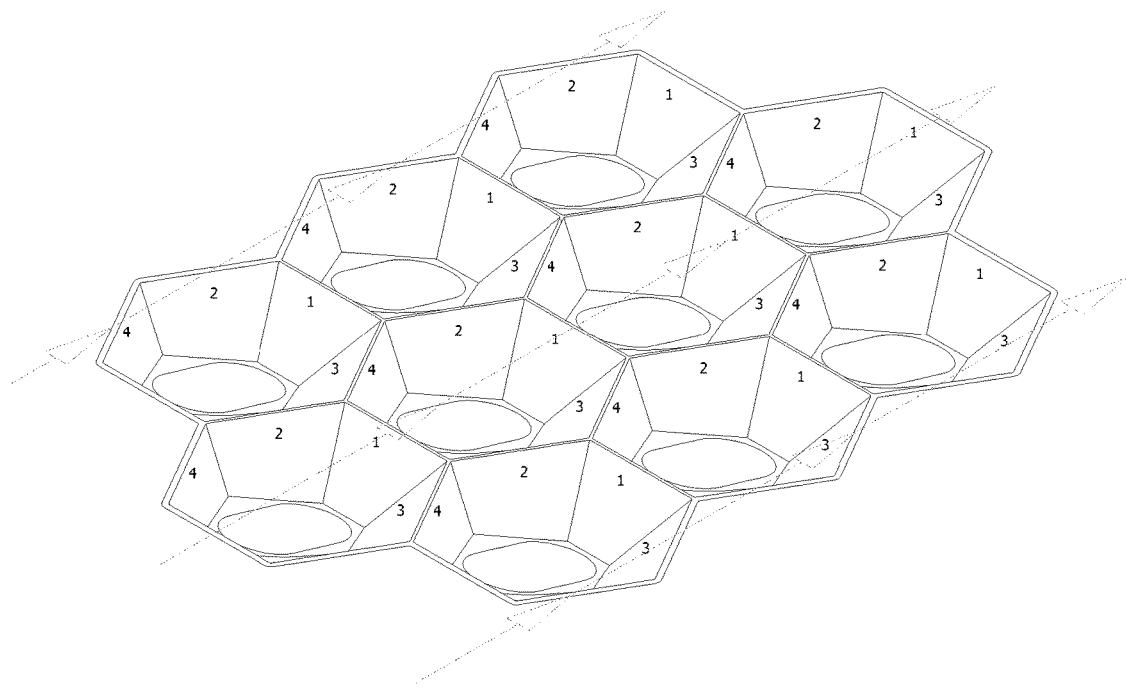
Fig. 4.2
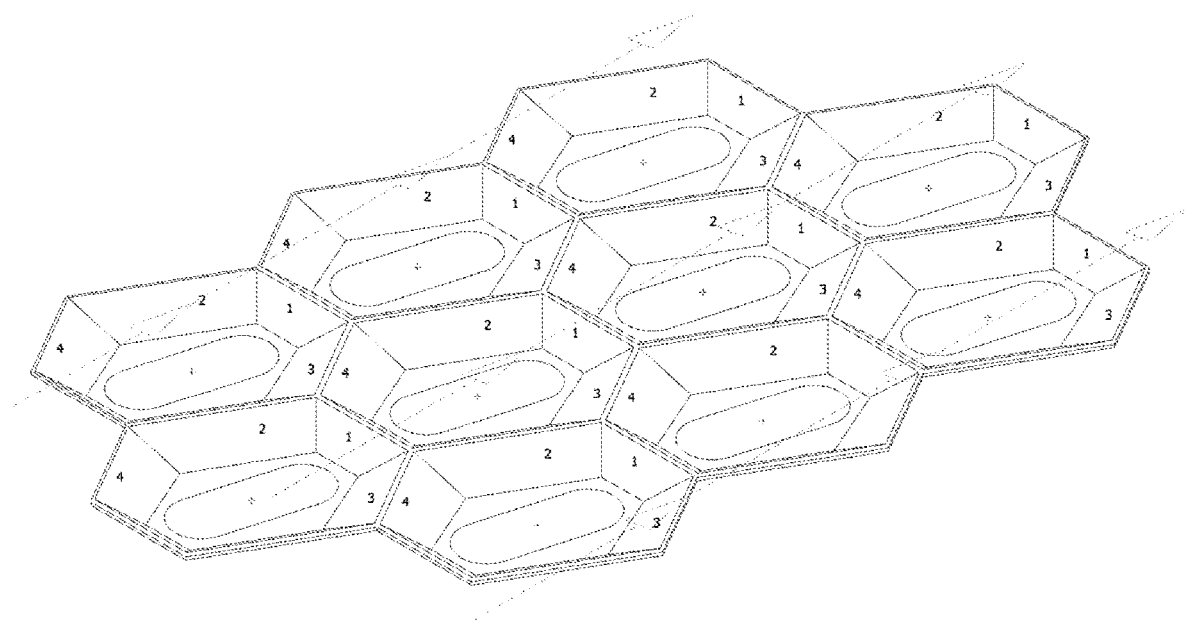
Fig. 4.3

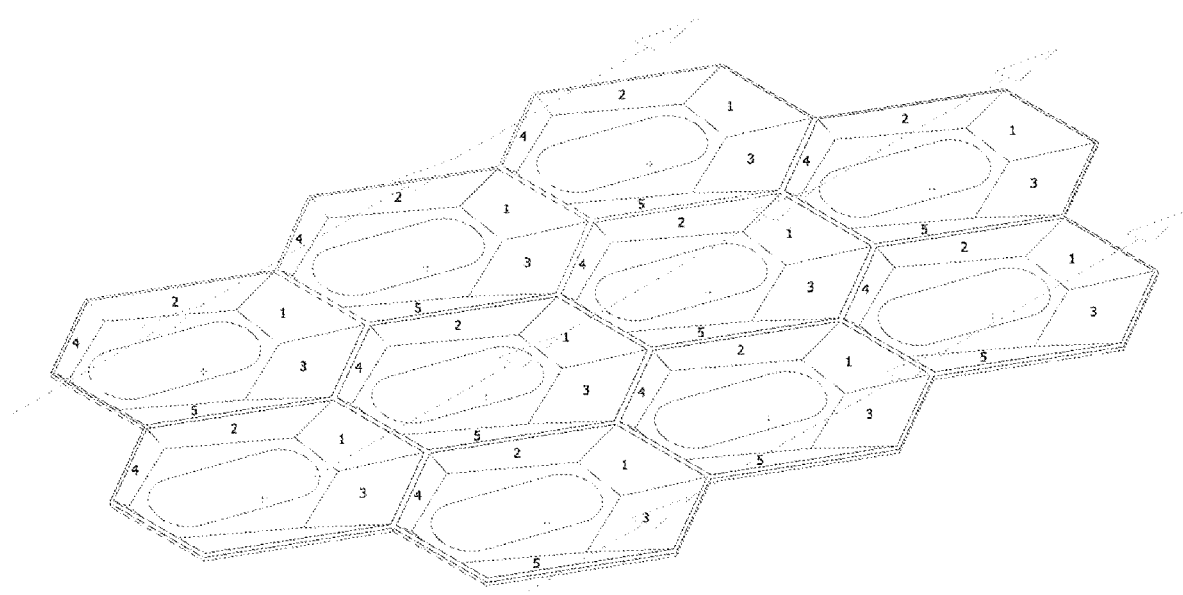
Fig. 4.4
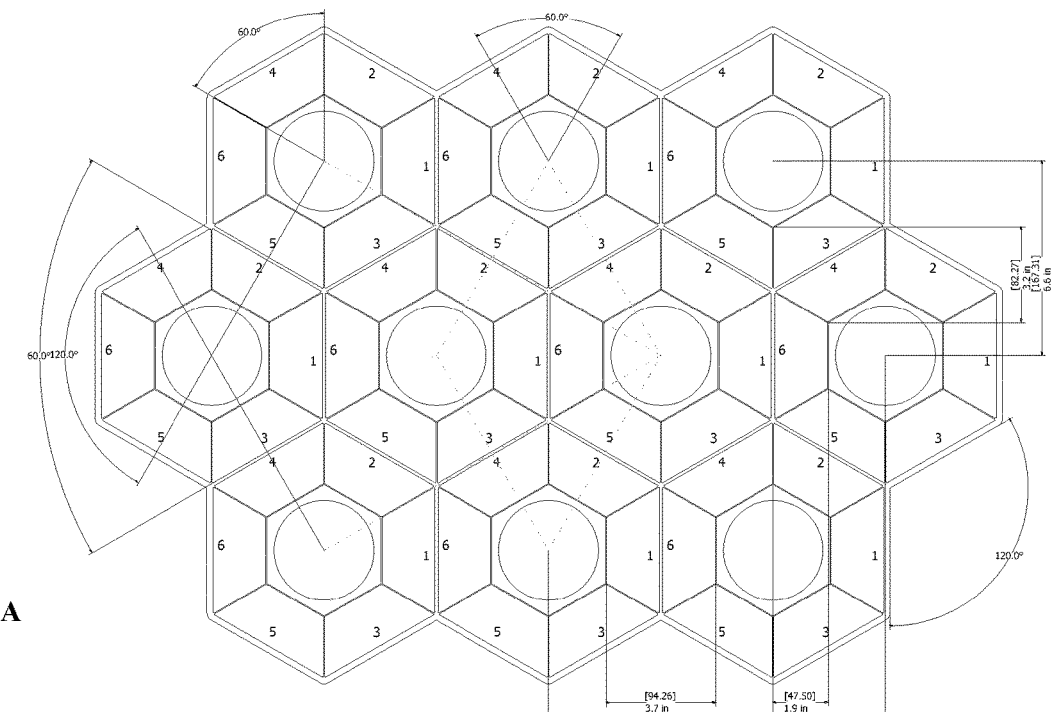
Fig. 5.0A
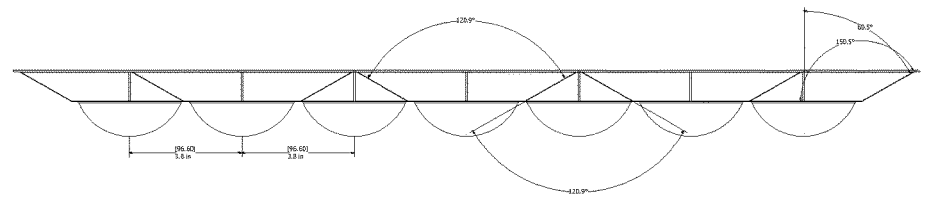
Fig. 5.0B

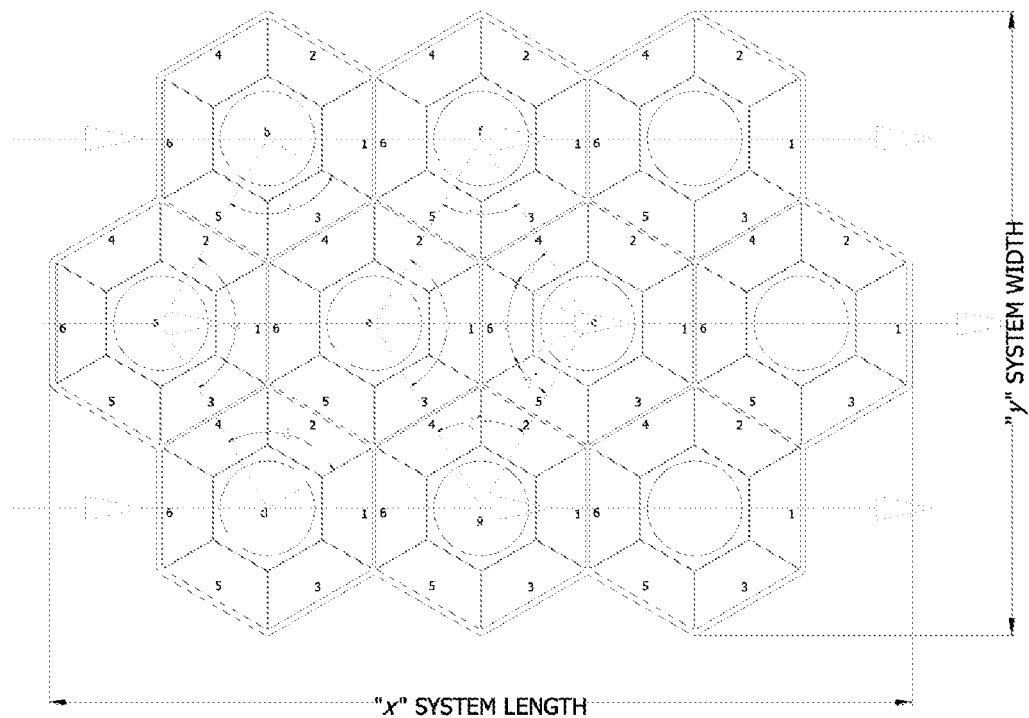
Fig. 5.1
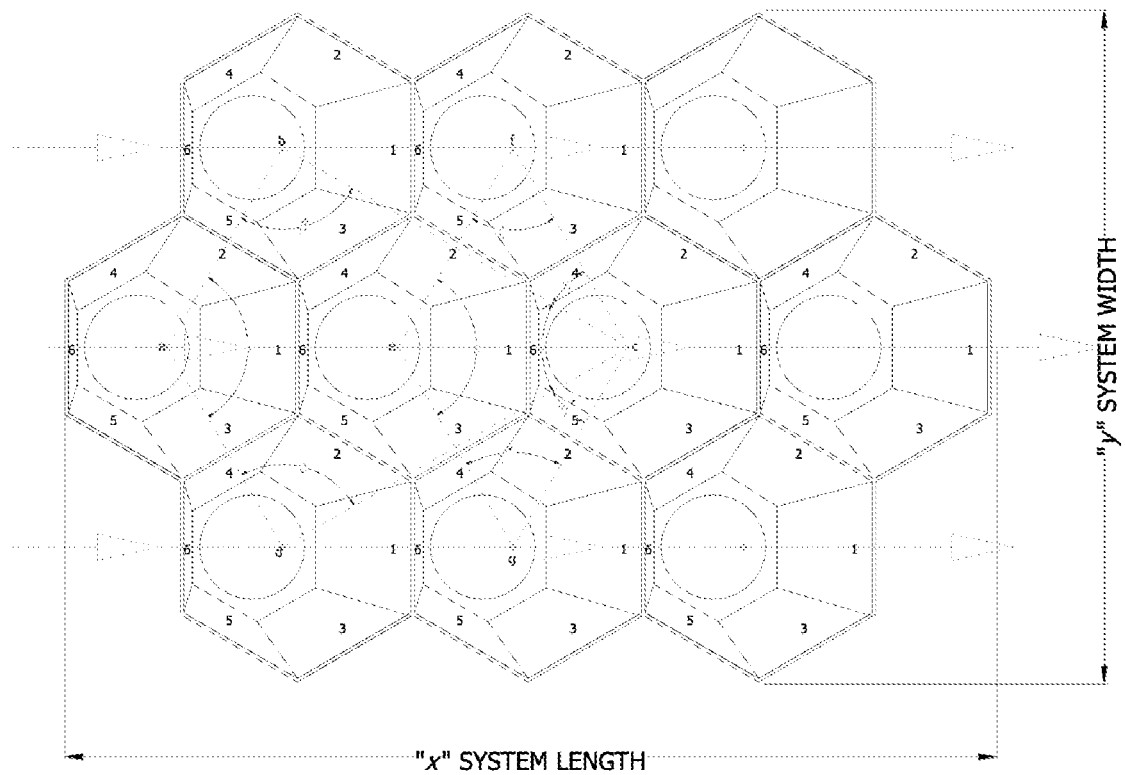
Fig. 5.2

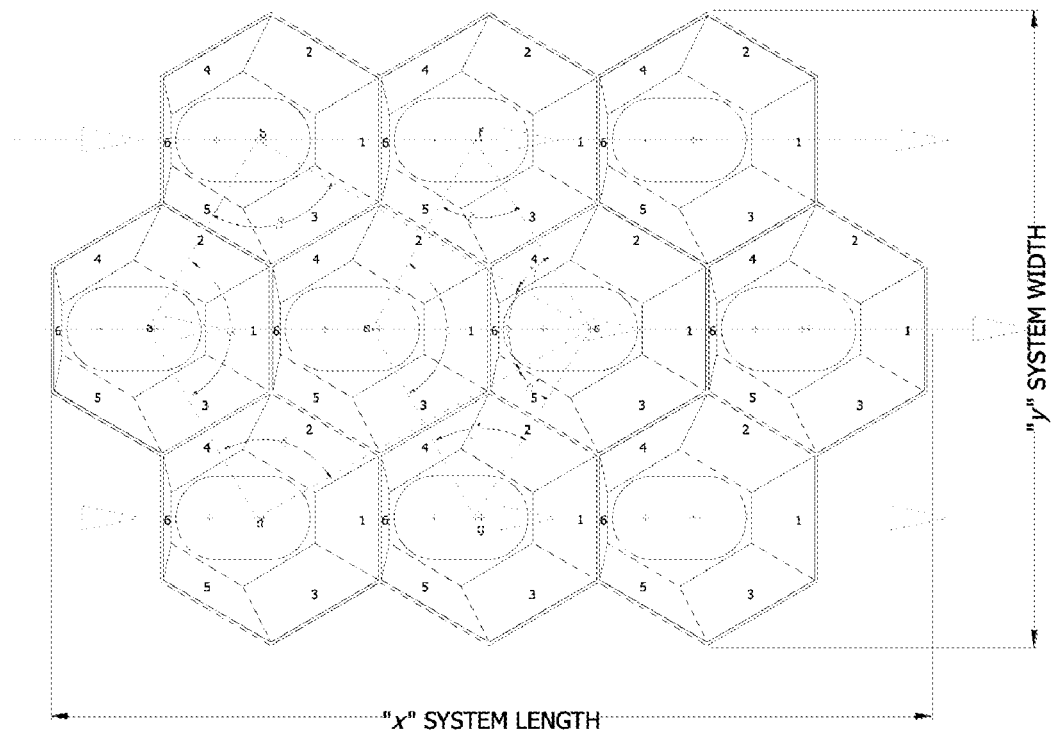
Fig. 5.3
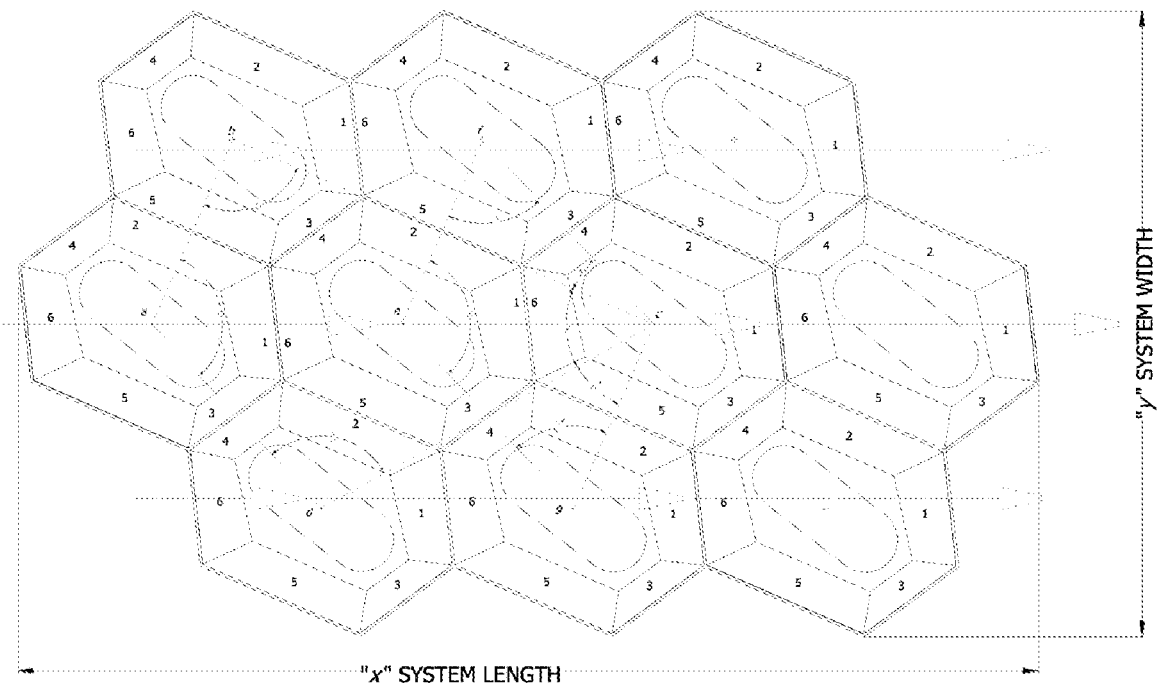
Fig. 5.4

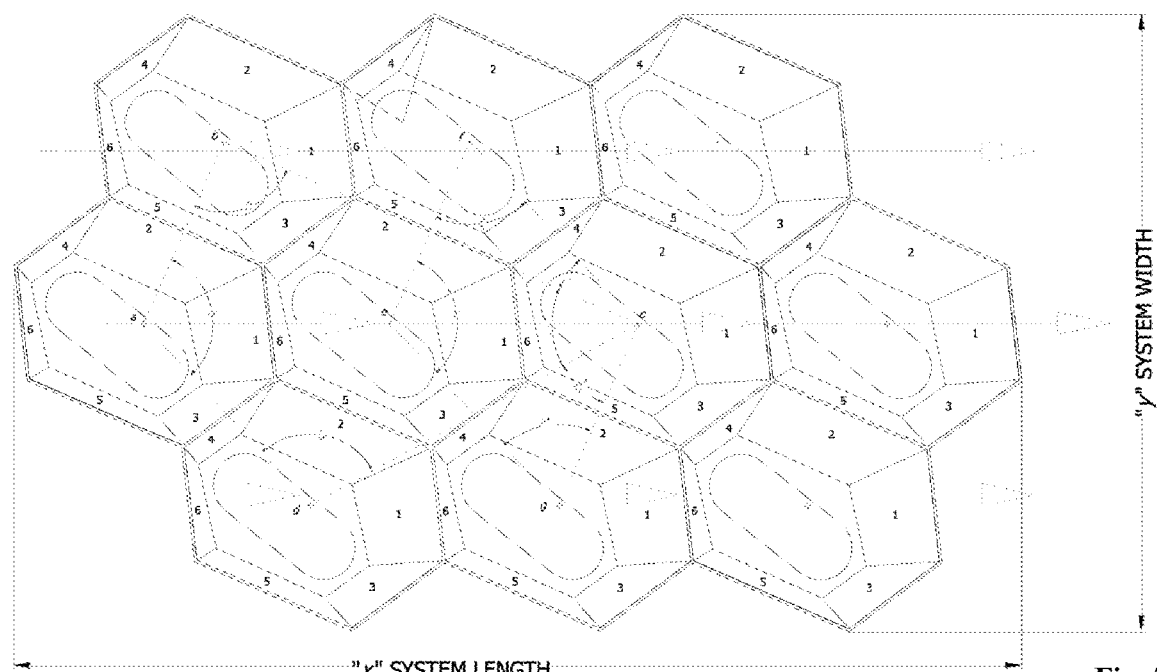
Fig. 5.5
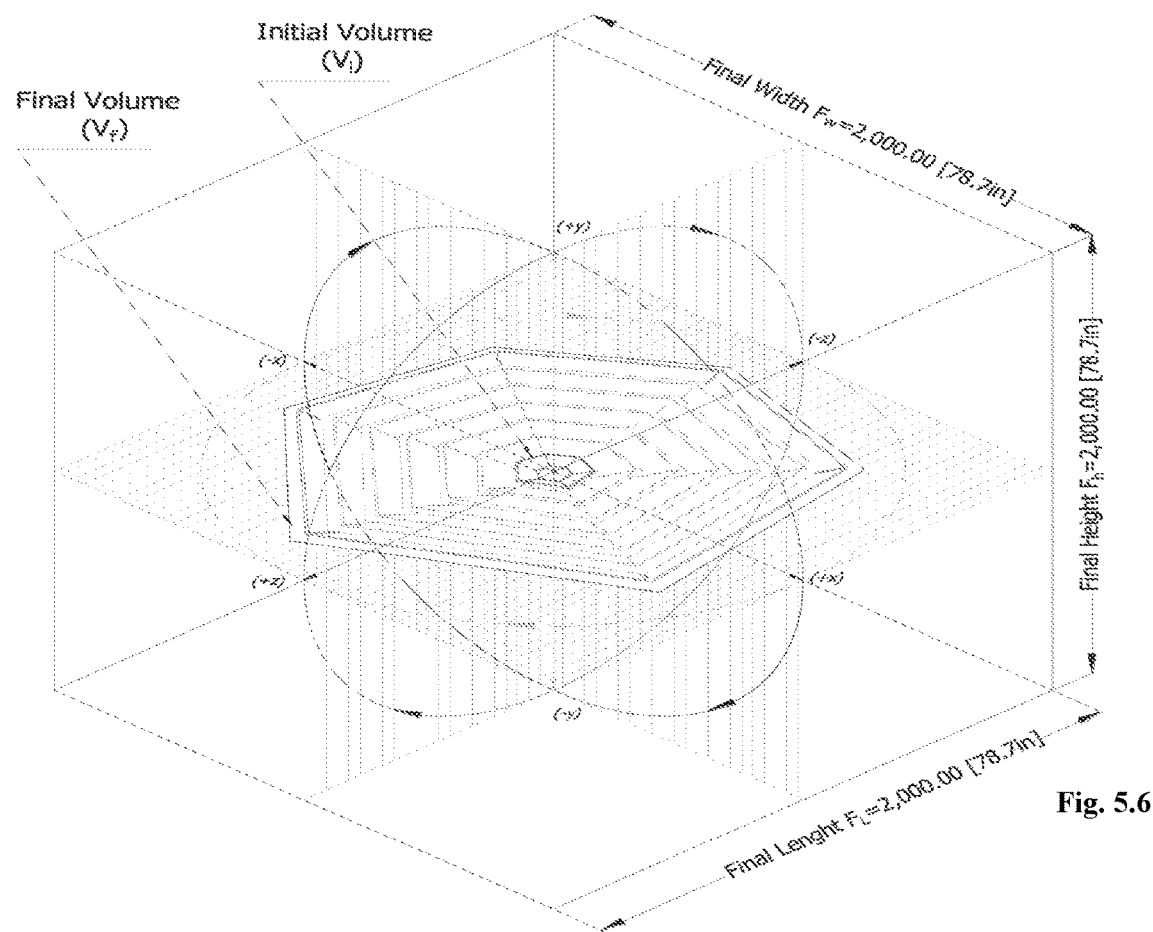
Fig. 5.6

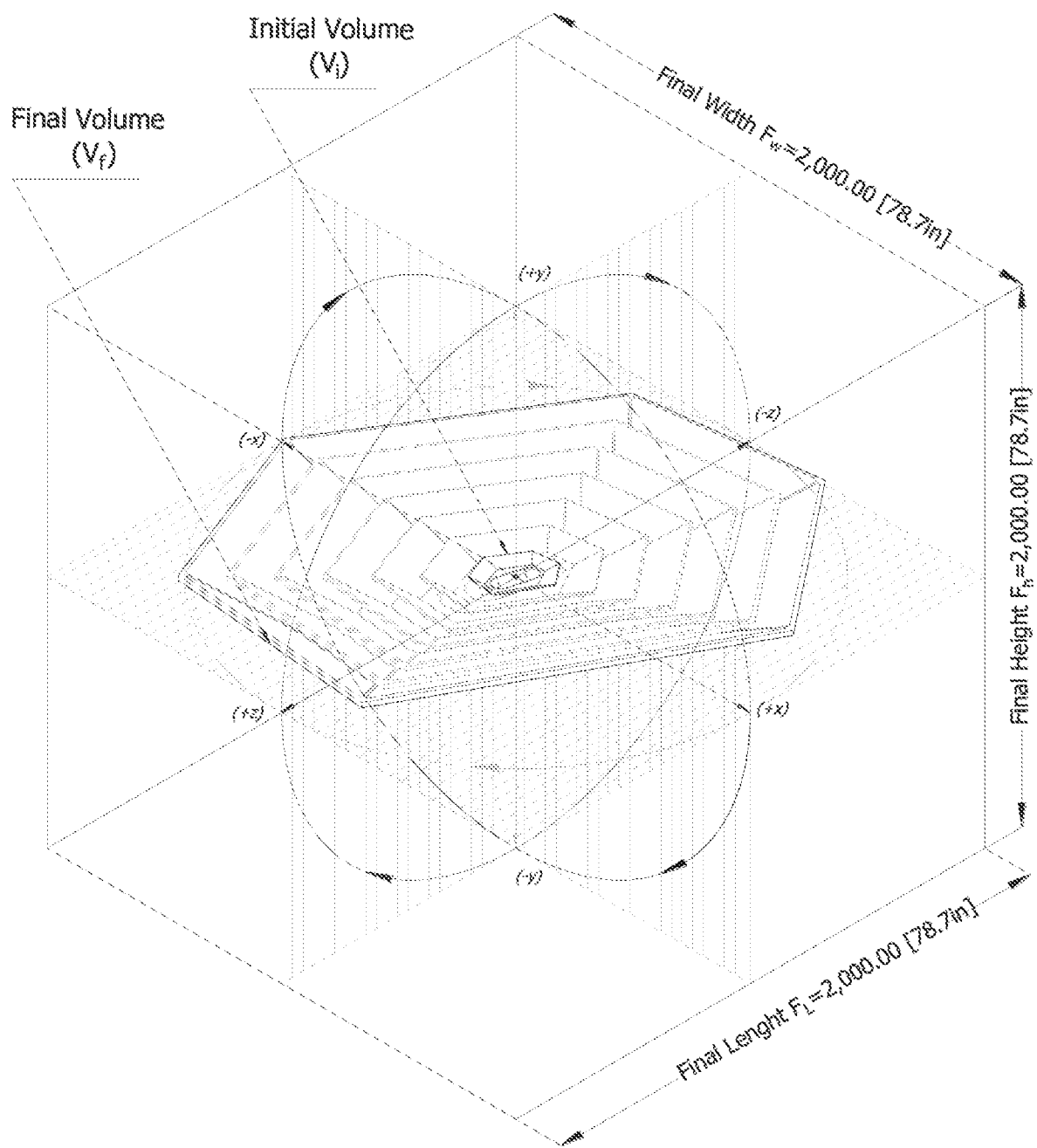
Fig. 5.7

Graph of forces and pressures associated with the walls of the trailer. Speed 33.33 $\frac{m}{s}$ ~ 119.99 $\frac{km}{hr}$ ~ 74.56 mph

Differential drag graph and Tribo-dynamic pressure versus Smooth Surface, speed 33.33 $\frac{m}{s}$ ~119.99 $\frac{km}{hr}$ ~ 74.56 mph.

Graph of Tribo-electric forces associated with the walls of the smooth surface trailer, speed 33.33 $\frac{m}{s}$ ~ 119.99 $\frac{km}{hr}$ ~ 74.56 mph

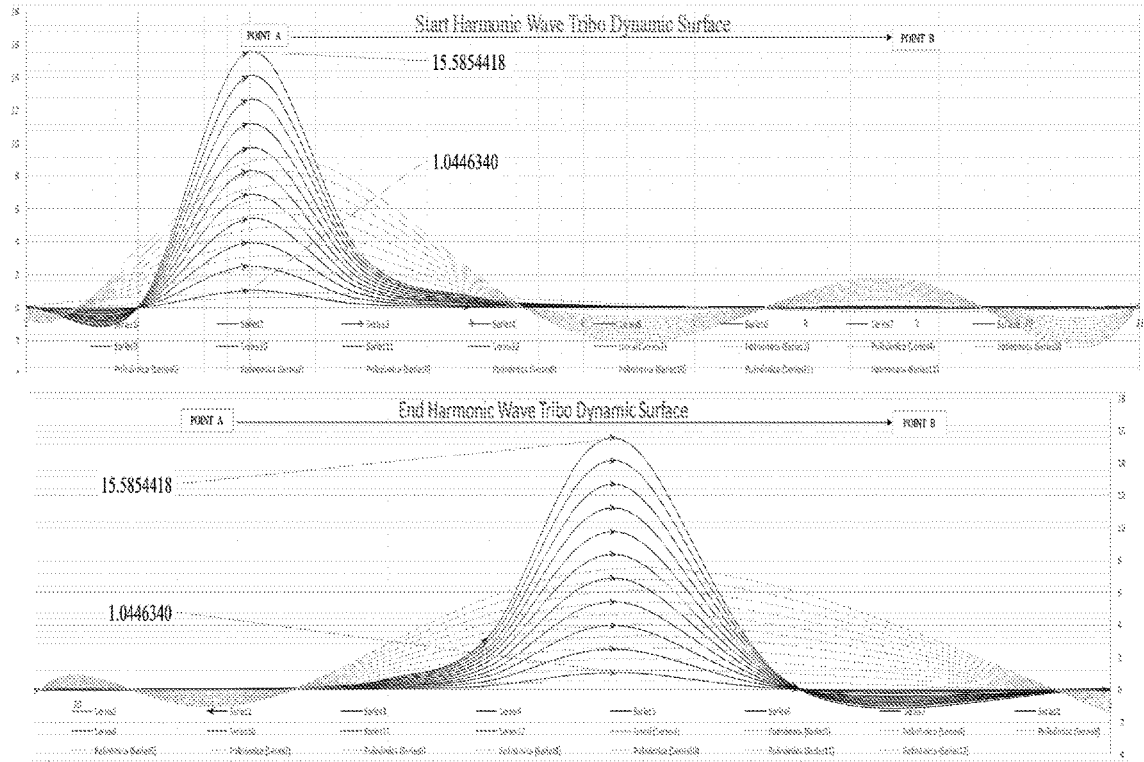
Fig. 8B Graph of Tribo-electric forces associated with the walls of the Tribo-dynamic surface trailer, speed 33.33 $\frac{m}{s}$ ~ 119.99 $\frac{km}{hr}$ ~ 74.56 mph
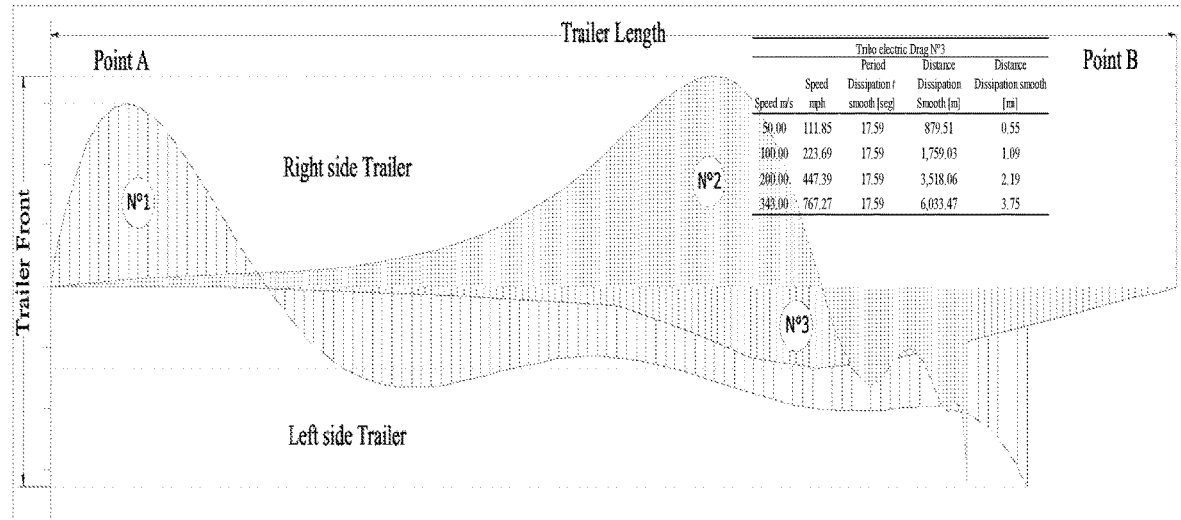
Fig. 9A Differential graphs frontal area + yaw angle N ° 1, by pressure N°2, by Tribo-electricity N°3, Tribo-dynamic Surface v / s Smooth Surface areas under the curve, speed 33.33 $\frac{m}{s}$ ~ 119.99 $\frac{km}{hr}$ ~ 74.56 mph.

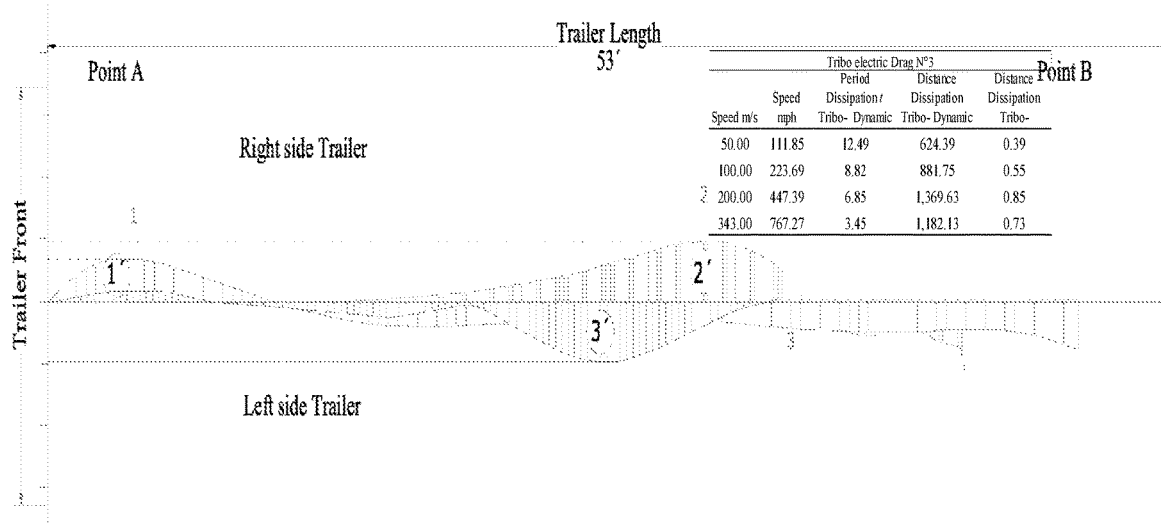
Fig. 9B Differential graph frontal area + yaw angle N°1, by pressure N°2, by Tribo-electricity N°3, Tribo-dynamic Surface v/s Smooth Surface areas under the curve, speed $33.33 \frac{m}{s} \sim 119.99 \frac{km}{hr} \sim 74.56$ mph.
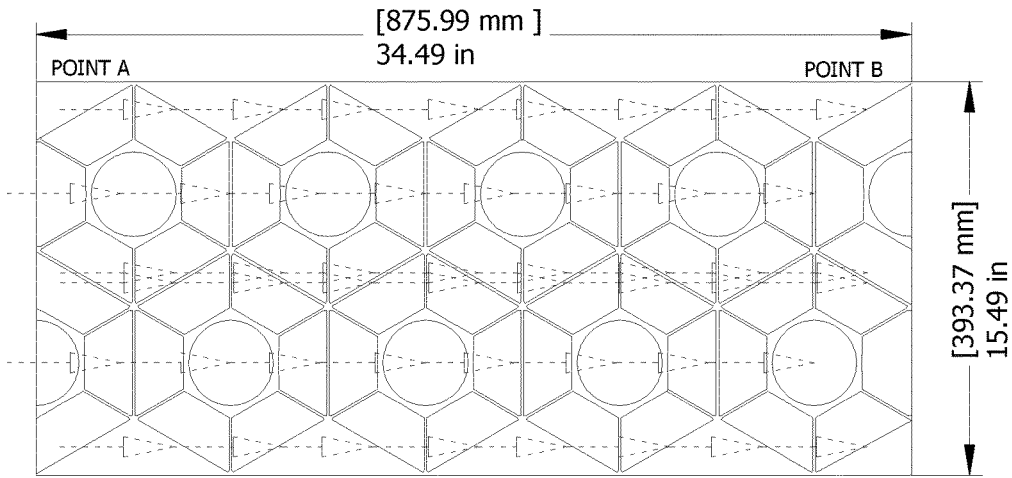
Fig.10

Graphs of states of transitions of the air

Graph of yaw angle tunnel 3d Tractor-Trailer (dry van 53 foot), Tribodynamic versus smooth surface

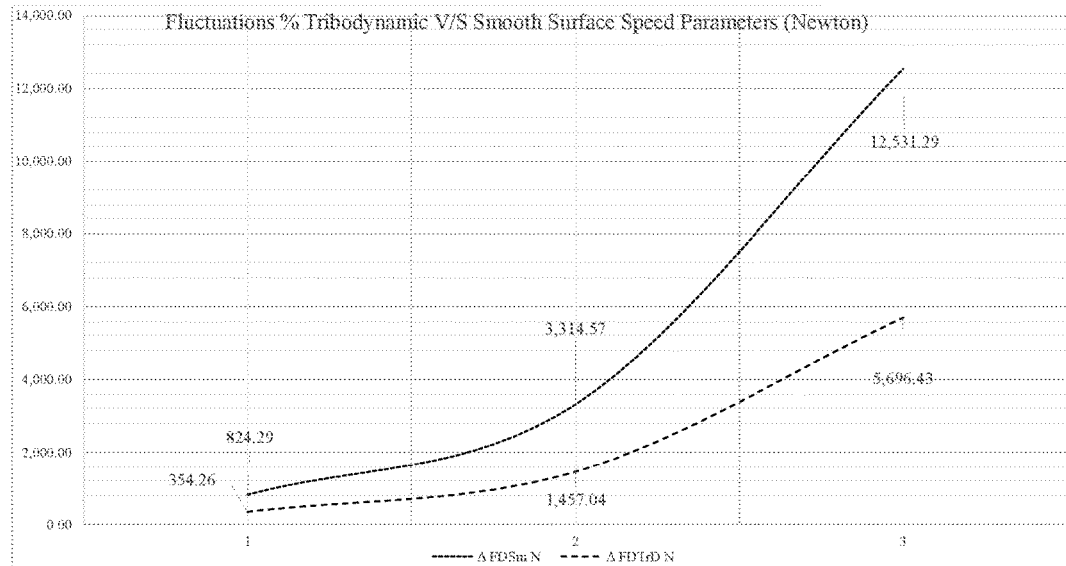
Fig. 24
Graph of top speed Tribodynamic versus smooth surface Tractor-Trailer (dry van 53 foot)
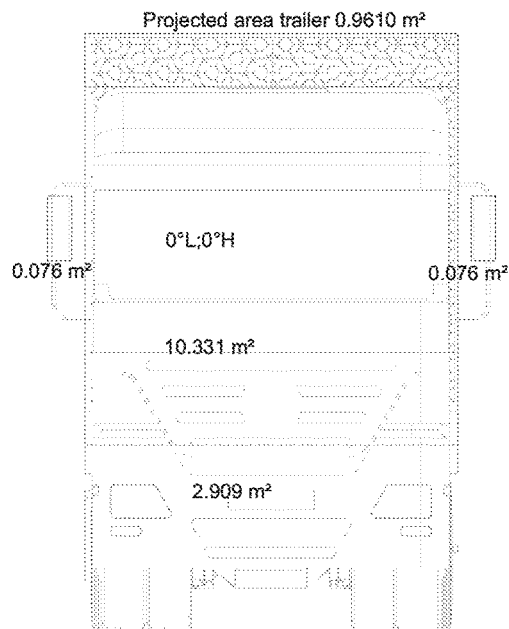
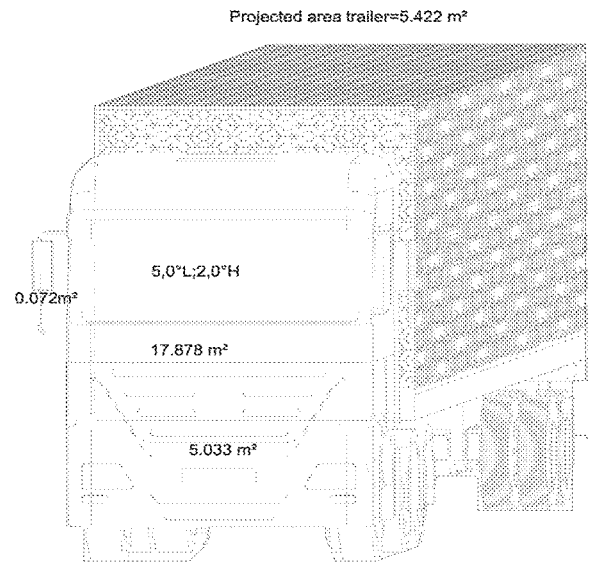
Fig. 25A                     Fig. 25B Graph of comparative Smooth Surface versus Tribodynamic Cell before and after component force wind
Table 4 a. y 4 b.

Graphic sample section Smooth Surface versus Tribodynamic Cell Table 5.a. and 5.b

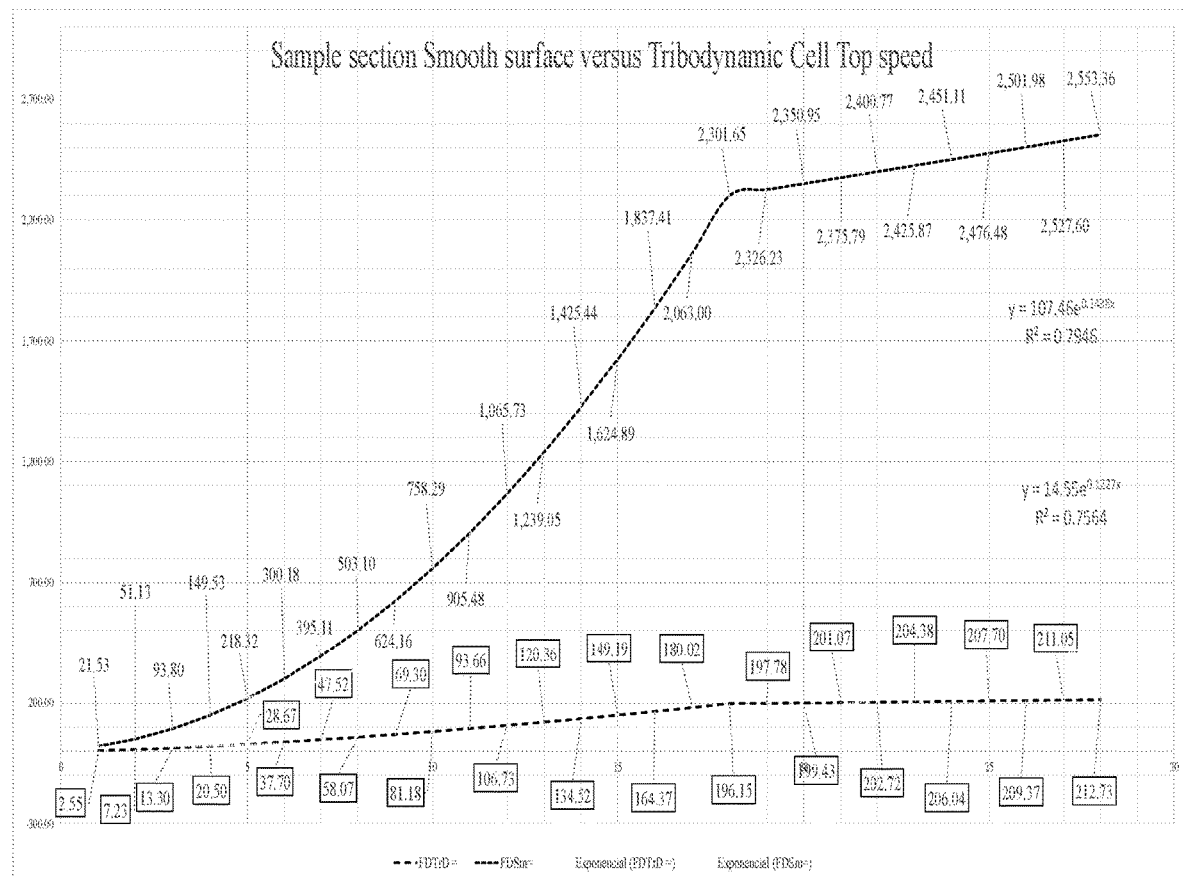
Fig. 28 Graph top speed after friction in dynamic conditions sample section Smooth Surface versus Tribodynamic Aerodynamic equation method + Reynolds Transport Theorem

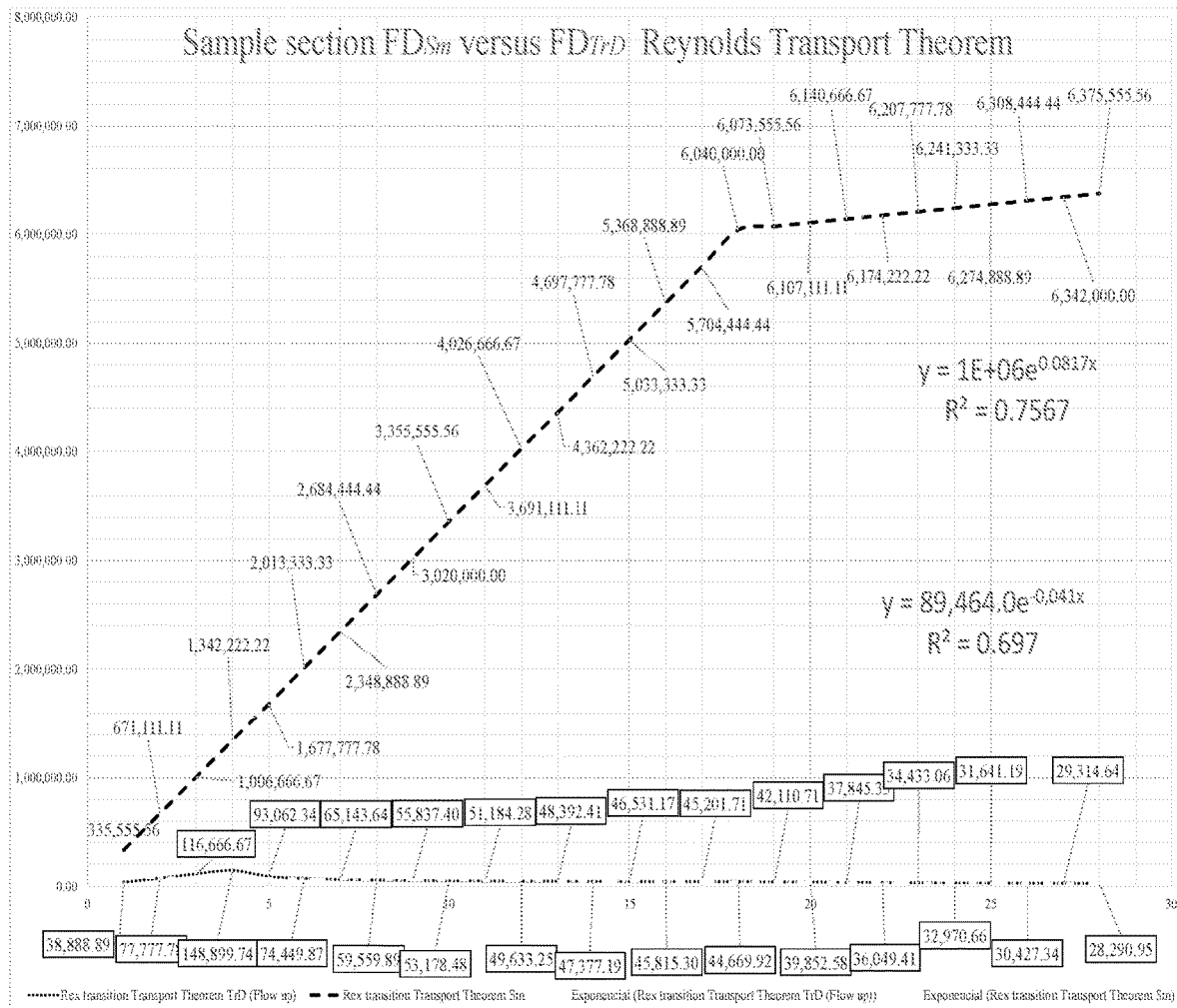
Fig. 29 Graphic Reynolds for theorem method ($R_{ex}$) Sample Section Smooth Surface versus Tribodynamic Cell Table 6.a and 6.b.

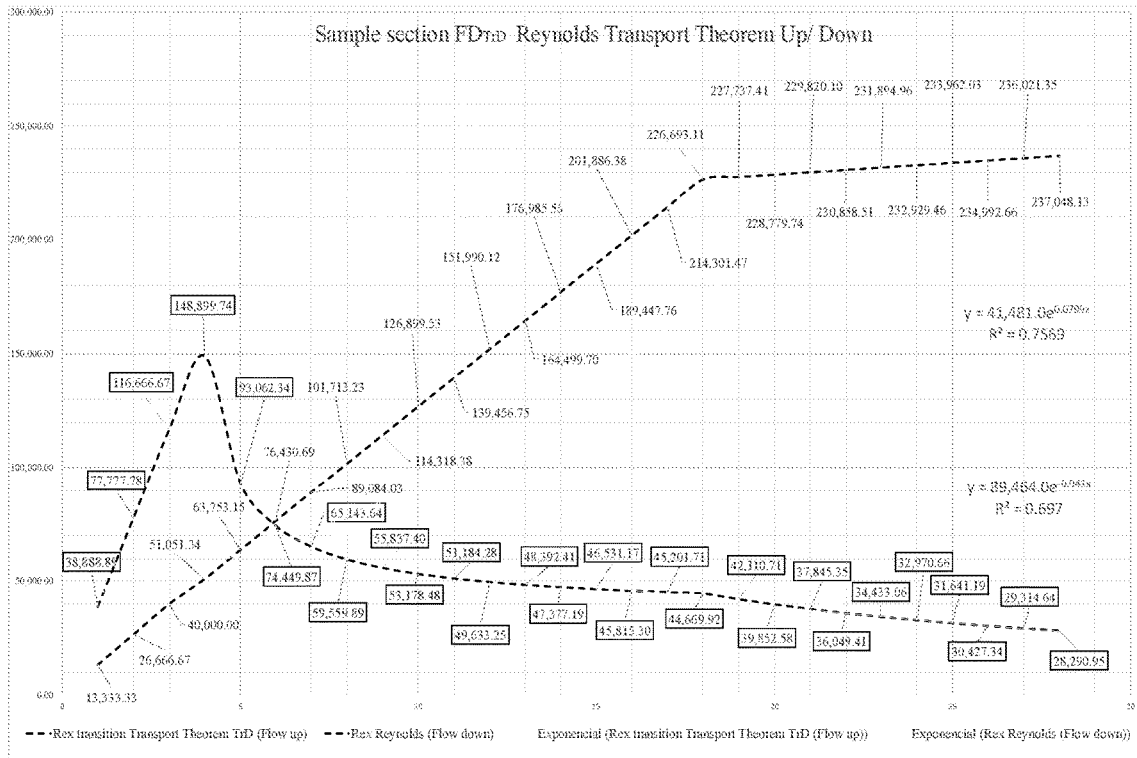
Fig. 30 Reynolds transitions graph in sample section with Tribodynamic cell
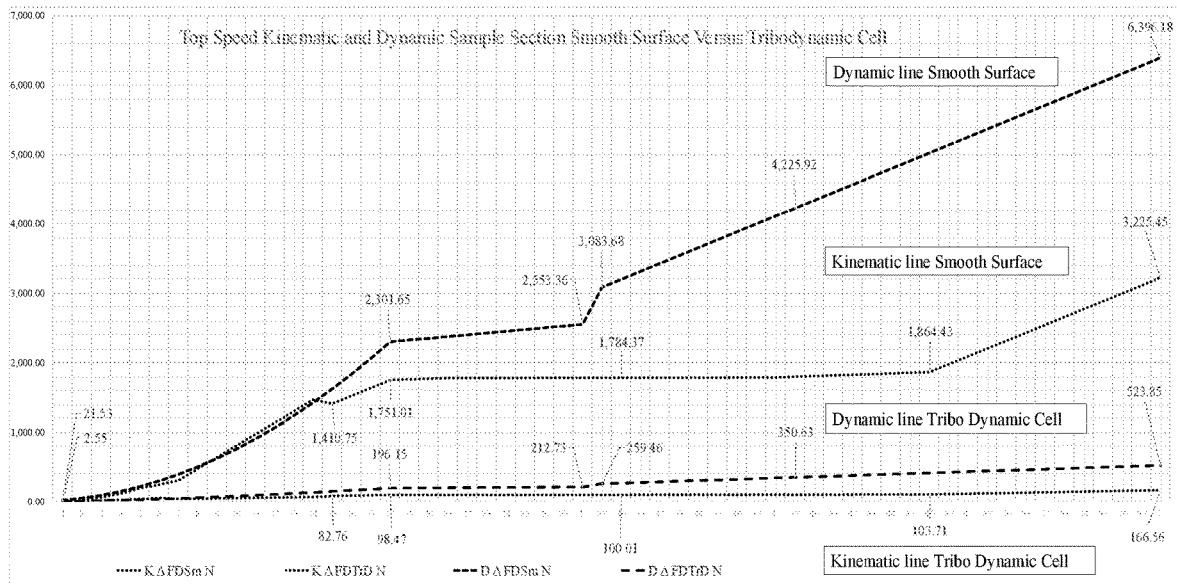
Fig. 31 Graphic top speed kinematic and dynamic sample section Smooth Surface versus Tribodynamic cell Table 6.a. and 6b

DEVICES, SYSTEM AND ASSOCIATED METHODS FOR AERODYNAMIC DRAG REDUCTION USING TRIBODYNAMIC CELLS

FIELD

The present invention relates to the reduction of aerodynamic drag in any system and/or equipment where a surface is exposed to the rigors and demands of aerodynamic resistance. More specifically, the invention can be directly applied to transport systems of any length, size and shape, such as within the families of the semi-trailer, dry van, box trailer, enclosed trailer, refrigerated trailer, reefer, curtain sider and straight truck. An aerodynamic reduction occurs when a surface pattern has been formed and/or modified to using the specific framework and cohesion of the compound hexagonal pyramidal volumes and semi-spherical caps developed. A response geometry in turn results from the physical, dynamic, and triboelectric variables which occur directly above these surface patterns, forming the Tribodynamic flow containment cell producing a vortex of superficial air that protects a desired surface area and therefore reducing aerodynamic resistance.

BACKGROUND

The vast majority of road transportation equipment in the United States has evidence of surface elastoplastic deformations. The physics of air flow behavior on a transport system produces an aerodynamic resistance.

The following U.S. patents address issues related to aerodynamic resistance: U.S. Pat. No. 5,058,737, October 1991, Wheeler; U.S. Pat. No. 6,685,256, March 2004, Shermer; U.S. Pat. No. 6,702,364, March 2004, Neel; U.S. Pat. No. 6,926,345, August 2005, Ortega, et al.; U.S. Pat. No. 6,959,958, November 2005, Basford; U.S. Pat. No. 7,093,889, August 2006, Grahan; U.S. Pat. No. 7,431,381, October 2008, Wood; U.S. Pat. No. 8,091,951, January 2012, Fitzgerald; U.S. Pat. No. 8,770,649, July 2014, Praskovsky, et al.; U.S. Pat. No. 8,870,275, October 2014, Schmidt; U.S. Pat. No. 8,899,660, February 2014, Praskovskaya, et al.; U.S. Pat. No. 9,616,945, April 2017, Henderson, et al.; U.S. Pat. No. 9,637,182, May 2017, Wayburn, et al.; U.S. Pat. No. 9,567,016, Feburary 2017, Magee; and U.S. Pat. No. 9,571,009, February 2017, Wang, et al.

Other publications that address issues related to aerodynamic resistance include: Raymond A. Serpa, John W. Jewett, Jr. Vol. 1; "Physics for Scientists and Engineers", 2008, ISBN: 0-495-11243-7. Pages; (3-11), (19-39), (53-59), (71-87), (100-119), (137-148), (174-177), (204-209), (227-255); Raymond A. Sternway, John W. Jewett, Jr. Vol. 2; "Physics for Scientists and Engineers with Modern Physics", 2008, ISBN: 0-495-11244-0. Pages; (641-661), (673-682), (710), (808-825); R. P. Feynman, R. B. Leighton, and M. Sands, Vol. 1; "Physics" 1963, ISBN-10: 0465024939, (Chapters 4-5-8-9-10-11-12-18-19); Mihir Sen, University of Notre Dame, Indiana, EE.UU. "Fluid Mechanics", 2009. Paper, pages: (5-9), (11-24), (27-37); R. Courant and K. Friedrichs; "Supersonic Flow and Shock Waves, Interscience" 1948; L. Prandtl and O. Tietjens; "Fundamentals of Hydro- and Aero-Mechanics, Dover" 1957; Steven C. Chapra, Raymond P. Canale, 7 Edition; "Numerical Methods for Engineers", 2015, ISBN 978-0-07-339792-4. Pages: (11-21), (55-59), (81-106), (456-487), (490-502), (526-561); John D. Anderson, Jr. 3 edition; "Series in Aeronautical and Aerospace Engineering", 1989, ISBN 0-07-001641-0. Pages: (84-154), (178-201), (559-561); L. Prandtl and 0. G. Tietj ens. Dover Publications, New York; "Fundamentals of Hydro and Aeromechanics, United Engineering Trustees", 1957. Pages: 233-250; L. S. Mc Carty and G. M. Whitesides. Angewandte Chemie International Edition, Vol. 47; "Electrostatic Charging Due to Separation of Ion at Interfaces", 2008. Pages: (2188-2207); H. T. Baytekin, A. I. Patashinski, M. Branicki, B. Baytekin, S. Soh, B. A. Grzybowski, Science, Vol. 333 N°. 6040; "The mosaic of surface charge in contact electrification.", 2011, Digital Object Identifier (DOI):10.1126/science.1201512. Pages: (308-312); Daniel J Lacks and R Mohan Sankaran, Journal of Physics D: Applied Physics. N° 45, Vol. 44; "Contact electrification of insulating materials", 2011. Page Digital (453001); AIP Advances Vol. 2; "Triboelectric charging of insulating polymers, some new perspectives" 2012. Page digital 010701; Journal, Faraday Discussions 2014; "Triboelectric Nanogenerators as new energy technology and self-powered sensors, Principles, problems and perspectives".D.O.I: 10.1039/C4FD00159A. Pages: (176), (447-458); By A. A. Campoli, J. Cervik, and R. L. United States Department of the Interior Bureau of Mines Report of Investigations: "Triboelectric Effects on Polyethylene Methane Drainage Pipelines" 1986. Pages: (1-12); Theodore L. Brown, University of Illinois at Urbana-Champaign, 13. Edition; "Chemistry the Central Science", 2014, ISBN: 13: 978-0-321-91041-7. Pages: (300-325); James Ross, D. Satran, James T. Heineck, Stephen Walker, and D. Yaste, B. Storms NASA Ames Research Center, Moffet Field; "DOE's Effort to Reduce Truck Aerodynamic Drag—Joint Experiments and Computations Lead to Smart Design". Pages: 18; U.S. Department of Transportation, Bureau of Transportation Statistics, U.S. Department of Commerce, Census Bureau; Statistics Canada; Transport Canada; "North American Transportation in Figures"; National Research Conseil national; "Technical Report Review of Aerodynamic Drag Reduction Devices for Heavy Trucks and Buses"; NASA Langley Research Center 2SSAI, 3Booz Allen Hamilton Inc., Norfolk, VA; "Surface meteorology and Solar Energy (SSE) Release 6.0 Methodology Version 3.2." Jun. 2, 2016; Ed Mc Graw-Hill "Surface Metrology Rugosity in Metrology" 1995. Page: (436); U.S. Department of Transportation Federal Highway Administration (FHWA); "Federal Size Regulations for Commercial Motor Vehicles, (Truck Tractor-Semitrailer-Trailer Combinations)" October 2004 FHWA-HOP-04-022 EDL 14012. Page: (3); and Stacy C. Davis, Susan E. Williams Center for Transportation Analysis Energy and Transportation Science Division, Edition 35; "Transportation Energy Data Book". October 2016.

This background information is provided to reveal information believed by the applicant to be of possible relevance to the present invention. No admission is intended, nor should be construed, that any of the preceding information constitutes prior art against the present invention.

SUMMARY OF THE INVENTION

With the above in mind, embodiments of the present invention are related to reducing the surface of friction produced by the permanent and active contact of the air with the walls of a moving structure, for example, a transportation truck.

This and other objects, advantages and features in accordance with the present invention may be provided by a tribodynamic cell system for reducing aerodynamic resistance of an equipment surface exposed to the aerodynamic resistance. The tribodynamic cell system includes a plurality of tribodynamic cells arranged in a surface pattern, each tribodynamic cell defining a hexagonal pyramidal volume and comprising an upper hexagonal frame, a lower hexagonal frame, six planar side elements coupled together between the upper hexagonal frame and the lower hexagonal frame to define the hexagonal pyramidal volume, and a rounded cap coupled to the six geometric elements and extending below the lower hexagonal frame.

Additionally, and/or alternatively, during operation as the equipment surface is exposed to aerodynamic resistance, each tribodynamic cell forms a tribodynamic flow containment cell that produces a vortex of superficial air that protects the equipment surface and therefore reduces the aerodynamic resistance.

Additionally, and/or alternatively, each of the six planar side elements comprises a trapezoid geometric element or an isosceles trapezoid geometric element.

Additionally, and/or alternatively, the rounded cap comprises a semispherical cap or a semi-capsular cap.

Additionally, and/or alternatively, a depth of the hexagonal pyramidal volume of the tribodynamic cell is based upon a material of the equipment surface.

Another embodiment is directed to a transportation container having a container surface exposed to aerodynamic resistance. The transportation container includes a tribodynamic cell system on the container surface for reducing aerodynamic resistance thereof and including a plurality of tribodynamic cells arranged in a surface pattern.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

FIG. 1.0 is an isometric view of an embodiment of the unitary Tribodynamic cell.

FIG. 1.1 is an isometric view of another embodiment of the unitary Tribodynamic cell.

FIG. 1.2 is an isometric view of another embodiment of the unitary Tribodynamic cell.

FIG. 1.3 is an isometric view of another embodiment of the unitary Tribodynamic cell.

FIG. 1.4 is an isometric view of another embodiment of the unitary Tribodynamic cell.

FIG. 2.0A-2.0C are plan, elevation and side views of the unitary Tribodynamic cell of FIG. 1.0.

FIG. 2.1A-2.1C are plan, elevation and side views of the unitary Tribodynamic cell of FIG. 1.1.

FIG. 2.2A-2.2C are plan, elevation and side views of the unitary Tribodynamic cell of FIG. 1.2.

FIG. 2.3A-2.3C are plan, elevation and side views of the unitary Tribodynamic cell of FIG. 1.3.

FIG. 2.4A-2.4C are plan, elevation and side views of the unitary Tribodynamic cell of FIG. 1.4.

FIG. 3.0A is a plan view of the unitary Tribodynamic cell of FIG. 1.0 including example dimensions.

FIG. 3.0B is a side view of the unitary Tribodynamic cell of FIG. 1.0 including example dimensions.

FIG. 3.0C is a cross-sectional view taken at line C-C of the unitary Tribodynamic cell of FIG. 3.0A including example dimensions.

FIG. 3.0D is a cross-sectional view taken at line D-D of the unitary Tribodynamic cell of FIG. 3.0A including example dimensions.

FIG. 4.0 is an isometric view of a cell panel of unitary Tribodynamic cells of FIG. 1.0 and illustrating the orientation of the active faces of the isosceles trapezoids.

FIG. 4.1 is an isometric view of a cell panel of unitary Tribodynamic cells of FIG. 1.1 and illustrating the orientation of the active faces of the isosceles trapezoids.

FIG. 4.2 is an isometric view of a cell panel of unitary Tribodynamic cells of FIG. 1.2 and illustrating the orientation of the active faces of the isosceles trapezoids.

FIG. 4.3 is an isometric view of a cell panel of unitary Tribodynamic cells of FIG. 1.3 and illustrating the orientation of the active faces of the isosceles trapezoids.

FIG. 4.4 is an isometric view of a cell panel of unitary Tribodynamic cells of FIG. 1.4 and illustrating the orientation of the active faces of the isosceles trapezoids.

FIG. 5.0A is a plan view of a set of unitary Tribodynamic cells of FIG. 1 and acting as a single panel in sequence as a function of truncation angle and flow deflection.

FIG. 5.0B is a side view of the panel of FIG. 5.0A.

FIG. 5.1 is a plan view of the panel of FIG. 5.0A illustrating various parameters and deflections.

FIG. 5.2 is a plan view of a set of unitary Tribodynamic cells of FIG. 1.1 and acting as a single panel in sequence as a function of truncation angle and flow deflection.

FIG. 5.3 is a plan view of a set of unitary Tribodynamic cells of FIG. 1.2 and acting as a single panel in sequence as a function of truncation angle and flow deflection.

FIG. 5.4 is a plan view of a set of unitary Tribodynamic cells of FIG. 1.3 and acting as a single panel in sequence as a function of truncation angle and flow deflection.

FIG. 5.5 is a plan view of a set of unitary Tribodynamic cells of FIG. 1.4 and acting as a single panel in sequence as a function of truncation angle and flow deflection.

FIG. 5.6 is a view illustrating a regular cell volume in dihedral.

FIG. 5.7 is a view illustrating an irregular cell volume in dihedral.

FIG. 8B is a graph of tribo-electric forces associated with the walls of the tribodynamic surface trailer with speed 33.33 m/s~119.99 Km/Hr~74.56 mph.

FIG. 9A is graph of aerodynamic resistance frontal area+ yaw angle n° 1, by pressure n° 2, by tribo-electricity n° 3, in smooth surface.

FIG. 9B is a differential graph of frontal area+yaw angle n° 1, by pressure n° 2, by tribo-electricity n° 3, in tribodynamic surface in systems v/s smooth surface areas under the curve speed 33.33 m/s~119.99 Km/hr~74.56 mph.

FIG. 10 illustrates a sample section of a tribodynamic surface with flow lines.

FIG. 24 is a graph of the top speed tribodynamic versus smooth surface truck tractor+semi-trailer dry van Table 2a. and 2b.

FIGS. 25A and 25B illustrate examples of positions of steps 1 to 12 (derived from table 4b) by numerical method analysis, (with standard aerodynamic equation+cross wind+yaw angle), the parametric design of the truck tractor+semi-trailer system, with 1:1 tribodynamic surface.

FIG. 28 is a graph top speed after friction in dynamic conditions sample section smooth surface versus tribodynamic surface by aerodynamic equation method+Reynolds Transport Theorem.

FIG. 29 is a graph of Reynolds Theorem method ($R_{ex}$) for sample section smooth surface versus tribodynamic cell Table 6a and 6b.

FIG. 30 is a graph of Reynolds Transitions in sample section with tribodynamic cell.

FIG. 31 is a graph top speed kinematic and dynamic sample section smooth surface versus tribodynamic cell Table 6a. and 6b.

DETAILED DESCRIPTION

Figure 6:
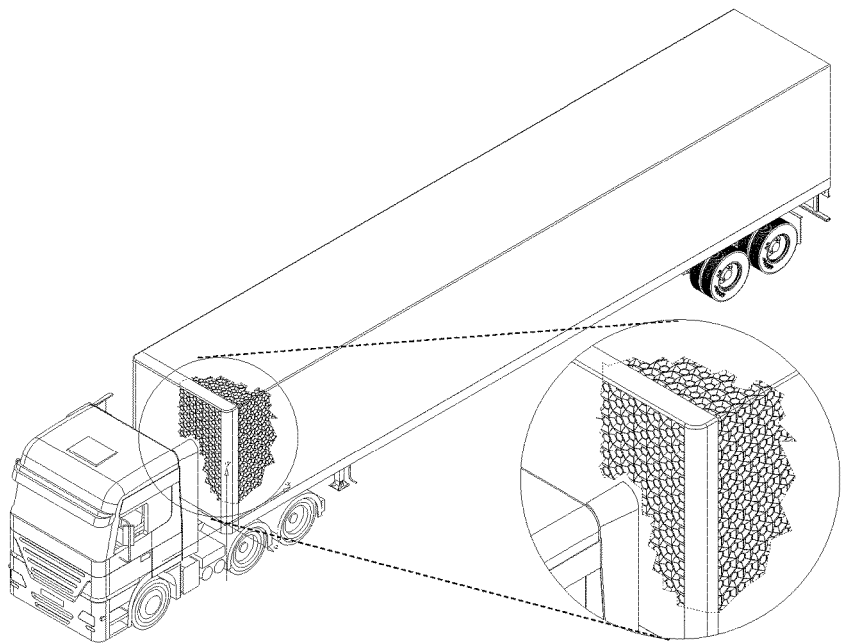
FIG. 6 is a perspective view illustrating a surface position on the walls of the Semi-trailer including the tribodynamic cell pattern.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The vast majority of road transportation equipment in the United States have evidence of surface elastoplastic deformations and a study objective was created to determine the "how" and "why" those structural surface variations occur, specifically on and around the walls of dry van/reefer 53 foot trailer, for example. Questions have been addressed in order to alleviate real world problems such as fuel consumption, carbon emission levels, and premature wear and tear of components subjected to constant dynamic loads in a general system. Once the aerodynamic behaviors on the structured surface were identified and separated out, an explanation and answer to the aerodynamic resistance was obtained: the deformations lie in the physical effects produced by the dynamic behavior of the air flow over an exposed surface. Therefore, the interactions of the active contact area should be understood and resolved, but induction or addition of deflection elements or any accessory may not be necessary and may only add resistance in a normal operating mode (only considering the general kinematic method or passive method). The present approach also demonstrates that any equations with low precision and physical magnitudes should not be considered as a decisive variables at the time of designing an aerodynamic ground system.

Disclosed herein is the Tribodynamic cell (FIG. 1.0, 1.1, 1.2, 1.3, 1.4, 1.5) which is a unitary arrangement that interpolates with several units of cells (FIG. 5.0A, 5.0B, 5.1, 5.2, 5.3, 5.4, 5.5) reducing the surface of friction produced by the permanent and active contact of the air with the walls of a Semi-trailer, dry van 53 foot (e.g. representing the most unfavorable calculation condition). In order to achieve this, the unit cell directs the air flow into a retention block, gradually weakening the volume of air until a small amount is captured and held in a circulating reserve. Once retained, the air will stay and rotate until it produces a thin protective layer within the Tribodynamic cell just above the surface. This prevents the normal and regularly deforming air flow on a smooth surface contact, therefore changing the initial contact condition of air-aluminum (more drag) to air-air-aluminum (less drag).

The change in the physical behavior of the system and reduction of the aerodynamic resistance development fluctuates between a range of 50.00% and 70.00% (only in the case of the Semi-trailer unit, dry van or reefer 53 foot). Measured in the global Truck Tractor+Semi-trailer system, where the truck is also placed (FIG. 6), the reduction of resistance can vary from 21.00% to 30.00% depending on the speed, inclination of the system, and the angle of attack of the wind on the system. As an independent surface (FIG. 4) or as unit cell (FIG. 1), the reduction in drag is higher 60.00%. These reductions are due to the incorporation of a greater number of physical quantities (real in its regime), which increases the precision of the standard method used from 75.19%, via the aerodynamic equation, to precisions of the order of 83.31%, by kinematic method of calculating the air particle, up to 91.88%, method of dynamic analysis of the air particle (Table 12).

The combination of mechanical, kinematic, dynamical, and triboelectric physical principles are what ultimately decide the boundary conditions of the present approach modeled. Therefore the behavior of the cells in each of these principles will be described.

The physics of air flow behavior on a transport system produces a known aerodynamic resistance and includes the following:

The force produced by the frontal area when coming in contact with the air, before the changes of acceleration and constant speed;

The force produced by the angle of attack and the referential variation of the system against the wind;

The force produced by the angle of attack and the referential variation of the wind against the system, acting throughout the system length as an oblique projection;

The force produced by the tribo-electricity of the air upon contact with the surface, which prevents the normal advance of the rest of the flow vectors;

The frontal and longitudinal pressure resulting from the effect of all previous force vectors; and The suction pressure resulting from the effect of frontal and longitudinal pressures.

Experiments were conducted independently in order to validate the theory of surface harmonic triboelectric charges and obtain the values related to the normal condition of air flow behavior. A system was installed on the exterior area of a vehicle x with a length of 185.00". The installed system consisted of three aluminum strips 2.0" wide by 0.02" and were aligned as two laterals and one longitudinal on top, using wooden surface partitions 2.0" in height and separated by 39.37", and three testers connected at the start and end of the aluminum bands measuring the resistance in ohms $\Omega$, (range 2,000.0$\Omega$ accuracy+/−1.2%). The electric resistance behavior reflected the following:

The measurement in each band varied while fluctuating the acceleration of the vehicle;

The measurements changed based on the modifications of speed in time;

The electrical resistance in the band increased the greater the acceleration, achieving a maximum intensity in the band when installed in the upper right hand area of the vehicle showing an artifact by-product due to the deflector angle produced by the windshield;

As a result of the electrostatic accumulation, the bands began to vibrate at high speed changes; and The vehicle was then driven in straight stretches at constant speeds and as well as the previous acceleration changes, the band had electrostatic accumulation in "x" distance before reaching a stabilizing speed on straight stretches of road.

The significant difference is that the bands before starting to vibrate produced clusters, oscillating beforehand and then vibration, passing through repetitive states of oscillation. A five mile stretch had vibration and oscillation at least three times cyclically at slower speeds, but at a faster speed traveling 5 miles more, the oscillation and vibration cycles were reduced to two times. This analysis was performed at three separate times (morning, afternoon, and night) with each section of 5.00 miles at sudden acceleration changes between 0 mph to 55 mph, 5.00 miles at 25 mph to 35 mph, and 5.00 miles at 55 mph to 75 mph. From the above studies, it was concluded that the accumulation of static depends on the amount of air flow surrounding the surface, which disappears as fast as it accelerates and its permanence depends on speed and time.

Arriving to appreciate a measurement in minimum cumulus after braking, but that triples when arriving at the 15.00 miles traveled, this is the static retained product of the friction, but the triboelectric cumulus obeys another phenomenon that is to the triboelectric charge of the air or polarization on contact with the aluminum surface and the contact of the air with the retained air, in this case it is the air that is polarized on the surface, reaching to such an extent that before it is detached from the surface, normal progress of the rest of the flow in the upper boundary layer is accumulated and prevented, that is why an oscillation harmonic before reaching the vibration of the band, and the cyclic change occurs immediately after the vibration, normalizing the system until it again accumulates polarized air and a cycle is fulfilled. This variable is the surface harmonic triboelectric phenomenon and affects 42.00% of the total aerodynamic resistance of a system, and is validated empirically and scientifically, in the present approach and is used as an element of optimization of the reduction of the aerodynamic resistance, becoming an excellent variable of the tribodynamic cell.

In addition, the present invention can provide a higher fuel efficiency to the entire truck; resulting from the reduction of the aerodynamic drag of the transported equipment as a whole. Which depending on the weather conditions, acceleration, and speed, also reduces emission levels of carbon thus making the complete transport system more efficient in every aspect and exponentially increases the usefulness and lifespan of the rolling system and structure. Depending on the structure of the Truck Tractor or Semi-trailer system, the present invention reduces structural vibration of the system and variable load responses over time, therefore, increasing the stability of the overall system. In turn, the present invention provides the mathematical and physical accuracy to be considered for all designs of every land and air system in their actual normal operating schemes.

By the general system operating rule, the present approach includes a mathematical model applied to the geometry and barycenter of the analyzed dry van 53 foot, for example, which depends on the behavior of the air particle on an aluminum surface having all the kinematic, dynamic, and associated Triboelectric variables. This complements the general equation currently applied for aerodynamic analysis and dispels the uncertainty and error of the relative method of analysis of the existing equation. The present approach is adaptive in its functions and depends on the material, physical characteristics, and general surface condition of where it is desired to optimize the aerodynamics of a system in acceleration, speed and variable consumption performance.

This approach was mathematically modeled based on a numerical method applied and designed for the Semi-trailer (dry van/reefer), for example. Once reducing the problem to an empirical level and after determining the units of analysis or magnitudes, it was analyzed at extreme speeds with kinematic and dynamic variables, bringing the present invention to the limit by cyclic analysis of the system. It has been concluded that by its kinematic design, the Tribodynamic cell has no speed limits. Considering the dynamics of operation (relative magnitudes) at subsonic, transonic, and supersonic velocities, the materiality of the initial contact surface is the determining factor, i.e. the mechanical (depending on the design of the system and where it is desired to replace the surface with the Tribodynamic cell), thermal, chemical, and tribo-electricity properties. In short, the surface is designed to work geometrically, dynamically, and electro affinity or tribo-electrically. Regardless, the faster the system, the longer the surface protection vortex, thus creating an increase of the aerodynamic drag reduction and reducing, in the case of a vehicle x mark using this technology, more than 70% of the aerodynamic drag on the aerodynamic coefficient of the moving body.

Another object of the present approach is the importance and demonstration of surface tribo-electric effects on aerodynamic drag. The present approach may be used on any automotive, transport, ballistic, and aerial surface, prior ranges relating to the materiality and barycenter of the system.

In summary, the present invention can be used on any surface desired to reduce system energy, increase performance or autonomy, improve surface structural strength, travel the same distance in a shorter time, and optimize the speed and stability of any system at low or high speed, accordingly reducing its aerodynamic drag. The tribodynamic cell described herein is able to capture the upper air volume, retain it and produce an inward flow with a vortex opposite to the advance of the upper air flow, this makes the upper flow have practically no contact with the surface and instead of operating with air/aluminum, it results in an air/air arrangement.

FIGS. 1.0-1.4 are views of various embodiments of the unitary Tribodynamic cells TC-TC4, FIGS. 2.0A-2.4C are views of the unitary Tribodynamic cells, and FIGS. 3.0A-3.0D are views of the unitary Tribodynamic cells including example dimensions.

The tribodynamic cell TC-TC4 is a geometric volume including an upper 9 and lower hexagon 8, the resulting edges 10 of both hexagons may vary depending on regularity or irregularity of either, a rounded (e.g. spherical)

$$\text{cap } 7a \text{ of area} = \left(2\pi \times \frac{(b^2 + h^2)}{2h} \times h\right),$$

$$\text{an interior volume} = \left(\frac{\pi \times h}{6}(3b^2 + h^2)\right),$$

and six planar surfaces defined by panels or isosceles trapezoids 1, 2, 3, 4, 5, 6. With these nine geometric elements a hexagonal pyramid with apothem and $$\text{volume} = \left[\frac{\sqrt{3}}{2} \times b^2 \times \frac{h}{2}\right] + \left[\frac{\pi \times h}{6} \times (3b^2 + h^2)\right]$$

is formed and defines the tribodynamic cell. This is used in the case that the geometry of the semi-trailer or a surface is rectangular as well as when the regular pyramidal volume is needed, however in the case that the surface of a section contains elliptical, parabolic curvatures, etc., then the orientation of the barycenter of the cell should be the same as the center of mass of the system where it is desired to reduce the drag force, as it is volumetric and changes to this $$\text{irregular system} = \left(\frac{1}{3} \times (fCm) \times \frac{h}{2} + \left[\frac{\pi \times h}{6} \times (3b^2 + h^2)\right]\right).$$

The orientation of the cell is not random, it is designed so that the contact points at the beginning of the operation of the non-inertial system (or forward structure), either in the frontal area of the isosceles trapezoid 1, with the diagonal isosceles trapezoids 2 and 3. In the set of cells (e.g. FIGS. 5.0A and 5.1), trapezoids 1 and 6 are always oriented horizontally to the feed in order to channel the air flow and produce the suction vortex, which is why trapezoid 1 is the first that produces resistance and trapezoids 2 and 3 produce reduction of flow and channeling via trapezoid 1. When it is required to increase the numbers of tribodynamic cells, it is very important to respect the positions, with trapezoids 1 and 6 horizontal to the plane of advancement of the system and trapezoids 2 and 5 along with trapezoids 3 and 4 must be diagonal to the surface, must always be a sequence of one point pair with another odd, an inverse position produces the opposite effect totally and produces greater resistance aerodynamics.

Referring to the tribodynamic cell embodiment in FIGS. 2.0A-2.0C, panels 1-2-3-4-5-6 are isosceles trapezoids, 7a is the volume of a spherical cap hollow section with inner and outer radius, 8 is a lower base section with a hexagonal volume, minus a circumferential section area, 9 is an upper base section of hexagonal volume, and 10 is a frustum of a regular pyramid six sides included between the base and the section parallel to the base not passing through the vertex.

Referring to the tribodynamic cell embodiment in FIGS. 2.1A-2.1C, panel 1 is an isosceles trapezoid, panels 2-3 are acute trapezoids having two adjacent acute angles on the longer base edge, panels 4-5 are acute trapezoids having two adjacent acute angles on the longer base edge, panel 6 is an isosceles trapezoid, 7a is the volume of a spherical cap hollow section with inner and outer radius, 8 is a lower base section with a hexagonal volume, minus a circumferential section area, 9 is an upper base section of hexagonal volume, and 10 is a frustum of a non-regular pyramid six sides included between the base and the section parallel to the base not passing through the vertex.

Referring to the tribodynamic cell embodiment in FIGS. 2.2A-2.2C, panel 1 is an isosceles trapezoid, panels 2-3 are acute trapezoids having two adjacent acute angles on the longer base edge, panels 4-5 are acute trapezoids having two adjacent acute angles on the longer base edge, panel 6 is an isosceles trapezoid, 7a is a volume of a semi-capsule (stadium half revolution) hollow section with inner and outer radius in spherical caps and inner and outer radius in cylinder body, 8 is a lower base section with an irregular hexagonal volume, minus a stadium section area, 9 is an upper base section of hexagonal volume, and 10 is a frustum of a non-regular pyramid six sides included between the base and the section angular to the base not passing through the vertex.

Referring to the tribodynamic cell embodiment in FIGS. 2.3A-2.3C, panel 1 is an isosceles trapezoid, panels 2-3 are acute trapezoids having two adjacent acute angles on the longer base edge, panels 4-5 are acute trapezoids having two adjacent acute angles on the longer base edge, panel 6 is an isosceles trapezoid, 7a is a volume of a semi-capsule (stadium half revolution) hollow section with inner and outer radius in spherical caps and inner and outer radius in cylinder body, 8 is a lower base section with an irregular hexagonal volume, minus a stadium section area, 9 is an upper base section of hexagonal volume, and 10 is a frustum of a non-regular pyramid six sides included between the base and the section angular to the base not passing through the vertex.

Referring to the tribodynamic cell embodiment in FIGS. 2.4A-2.4C, panels 1-2-3 are acute trapezoids having two adjacent acute angles on the longer base edge, panels 4-5-6 are acute trapezoids having two adjacent acute angles on the longer base edge, 7a is a volume of a semi-capsule (stadium half revolution) hollow section with inner and outer radius in spherical caps and inner and outer radius in cylinder body, 8 is a lower base section with an irregular hexagonal volume, minus a stadium section area, 9 is an upper base section of hexagonal volume, and 10 is a frustum of a non-regular pyramid six sides included between the base and the section angular to the base not passing through the vertex.

FIGS. 4.0-4.4 are isometric views of a cell panel of unitary Tribodynamic cells illustrating the orientation of the active faces of the isosceles trapezoids. FIG. 5.0A is a plan view of a set of unitary Tribodynamic cells of FIG. 1.0 and acting as a single panel in sequence as a function of truncation angle and flow deflection. FIG. 5.0B is a side view of the panel of FIG. 5.0A. FIGS. 5.1-5.5 are views of panels illustrating various parameters and deflections, e.g., acting as a single panel in sequence as a function of truncation angle and flow deflection. FIG. 5.6 is a view illustrating a regular cell volume in dihedral. FIG. 5.7 is a view illustrating an irregular cell volume in dihedral. FIG. 6 is a perspective view illustrating a surface position on the walls of the Semi-trailer including the tribodynamic cell pattern.

Kinematic analysis 3D tunnel truck trailer: Table 1a show this analysis will be carried out with the different wind angle variables (yaw angle) at a speed of 33.33 m/s, ranging from 0° to 5°, but with combinations in Cartesian plane (x;y), (x;z), and a wind speed of 5.0 m/s.

TABLE 1a

Analysis of drag set Truck Tractor + Semi-trailer with Smooth Surface tunnel 3D method, depending on yaw angle
FLUCTUATIONS SMOOTH SURFACE

| | Drag Coeff | $FD_{Sm}$ N | $\overline{X}$ Drag | δ Cd | Δ $FD_{Sm}$N | Stability % |
|---|---|---|---|---|---|---|
| (α; β; γ) X = 270; Y = 270; Z = 180 VEL.33.33 m/s (74.56 MPH) VAR 1° | 0.95 0.92 | 7,064.79 6,839.69 | 1.20 | 1.19 | 6,872.98 | 96.81 |
| (α; β; γ) X = 35; Y = 268; Z = 305 | 1.82 1.74 | 15,587.07 14,955.98 | 1.78 | 1.78 | 15,284.40 | 95.95 |
| (α; β; γ) X = 50; Y = 265; Z = 320 | 2.22 2.14 | 25,744.32 24,735.50 | 2.18 | 2.16 | 25,051.29 | 96.08 |
| (α; β; γ) X = 50; Y = 268; Z = 320 | 1.84 1.63 | 16,050.25 14,292.54 | 1.74 | 1.74 | 15,189.70 | 89.05 |
| (α; β; γ) X = 50; Y = 269; Z = 320 | 2.04 1.95 | 15,937.74 15,235.96 | 2.00 | 1.98 | 15,457.25 | 95.60 |
| (α; β; γ) X = 70; Y = 265; Z = 340 | 1.98 1.90 | 22,983.06 22,066.76 | 1.94 | 1.94 | 22,471.29 | 96.01 |
| (α; β; γ) X = 270; Y = 269; Z = 340 | 1.99 1.91 | 15,544.45 14,915.14 | 1.95 | 1.96 | 15,318.43 | 95.95 |
| (α; β; γ) X = 60; Y = 269; Z = 330 | 1.87 1.81 | 14,622.70 14,118.84 | 1.84 | 1.83 | 14,308.54 | 96.55 |
| (α; β; γ) X = 60; Y = 255; Z = 330 | 1.52 1.43 | 31,197.11 29,203.51 | 1.47 | 1.50 | 30,613.15 | 93.61 |

Figure 7A:
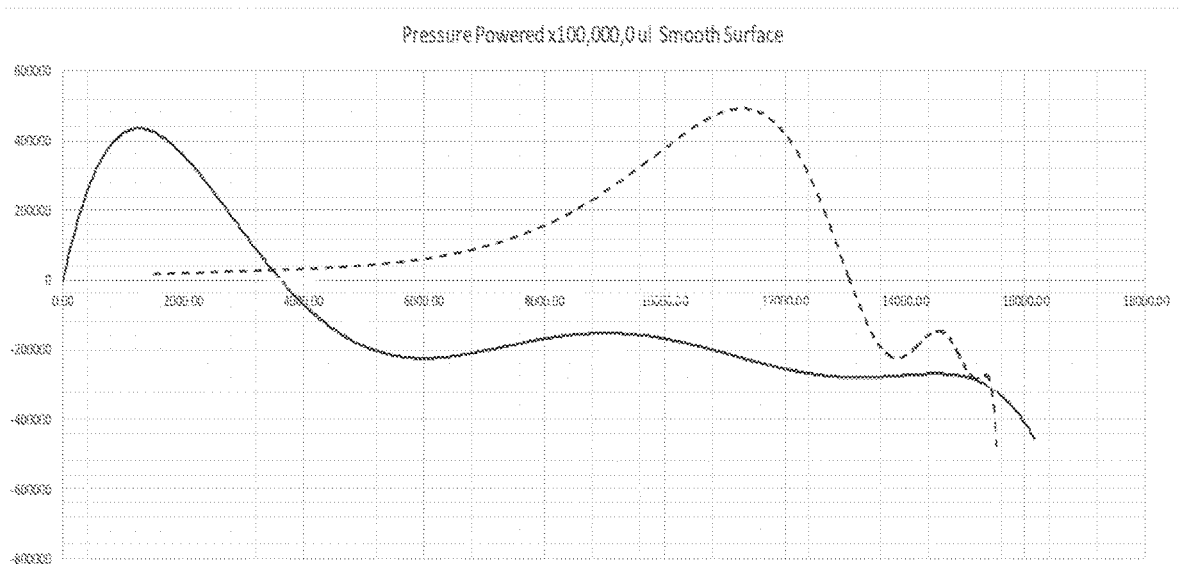
FIG. 7A is a graph of forces and pressures associated with the walls of the flat surface semi-trailer with speed 33.33 m/s~119.99 Km/Hr~74.56 mph

Table 2a. the behavior of the Semi-trailer in we must first know what are the variables that interact with the system operating rule, so we must model a Semi-trailer in 3D (FIG. 7A, Example Step 3, 6, 9) and to submit to virtual wind tunnel analysis, to obtain the pressures, maximum drag and minimum the coefficients of the same and the pressure points, corresponding to the different rates of analysis. For this the speeds of the Truck Tractor and Semi-trailer set, will be the following: 10.00 m/s; 20.00 m/s. And 38.88 m/s.

TABLE 2 a

Maximum and minimum speeds in normal conditions
FLUCTUATIONS SMOOTH SURFACE

| | Drag Coeff | $FD_{Sm}$ N | $\overline{X}$ Drag | δ Cd | Δ $FD_{Sm}$N | Stability % |
|---|---|---|---|---|---|---|
| (α; β; γ) X = 270; Y = 270; Z = 180 VEL. = 10.00 m/s (22.37 MPH-36 Km/hr) VAR 1° | 1.32 1.28 | 847.63 822.19 | 1.30 | 1.29 | 824.288 | 97.00 |
| (α; β; γ) X = 270; Y = 270; Z = 180 VEL. = 20.00 m/s (44.74 MPH-72 Km/hr) VAR 1° | 1.30 1.28 | 3,338.26 3,267.40 | 1.29 | 1.29 | 3,314.57 | 97.88 |
| (α; β; γ) X = 270; Y = 270; Z = 180 VEL. = 38.89 m/s (87 MPH-140 Km/hr) VAR 1° | 1.30 1.27 | 12,556.50 12,279.06 | 1.29 | 1.30 | 12,531.29 | 97.79 |

Under the approach (FIG. 7A), we can know the behavior of the wind on the Semi-trailer system, but it is noteworthy that the software is not parametric, that is, imported solids for analysis, are of the SAT type (only the body volume), without physical or mechanical properties, another important element is friction, nor is it an environment variable in the approach, however in an approximation we can know what the drag and coefficients, in addition to the estimated pressure points on the walls of the Semi-trailer dry van 53 foot. With this approach, we obtain the first kinematic values of the system (Table 1a-2a), pressure points are visualized on the walls of the Semi-trailer in vertical gradients, as the wind angle of attack increases (FIG. 7A, Step 6) resolves the main question of the "why" there is plastic deformation in the walls.

Analysis with aerodynamic equation+yaw wind in trailer+semi-truck: This calculation element, will yield a comparative basis, of the values obtained in 3D wind tunnel method, the analysis will be realized comprising the same variables associated to the tunnel analysis, this will result in errors related to the kinematic behavior of the Truck Tractor+Semi-trailer.

Figure 7B:
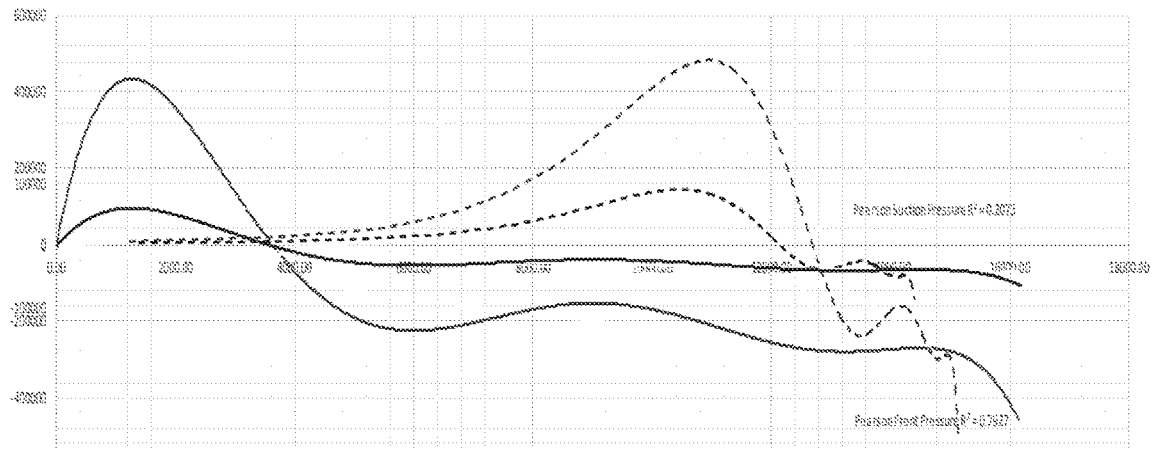
FIG. 7B is a differential graph of drag and pressure for tribodynamic versus smooth surface speed with 33.33 m/s~119.99 Km/Hr~74.56 mph
Figure 8A:
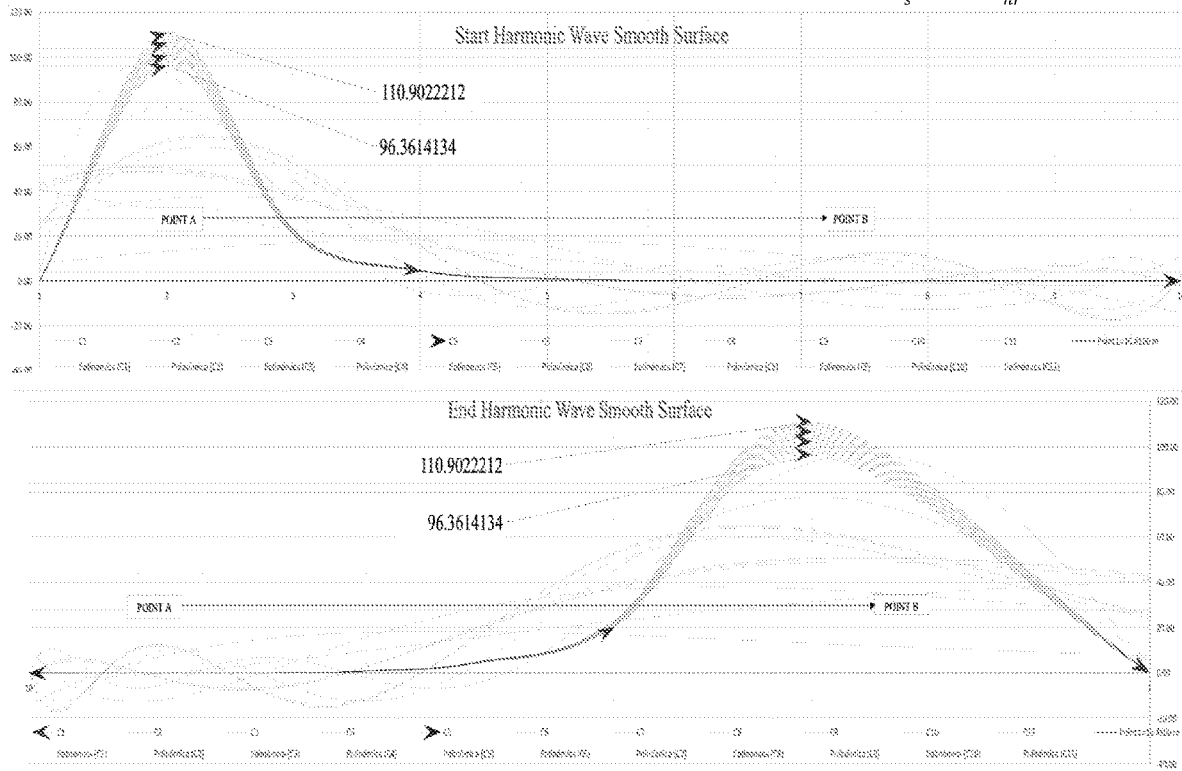
FIG. 8A is a graph of tribo-electric forces associated with the walls of the smooth surface trailer with speed 33.33 m/s~119.99 Km/Hr~74.56 mph.

Different yaw angle analysis: It is analyzed with reference of average wind speed in USA. 5.00 m/s, Paul W. Stackhouse, Jr "Surface metereology and Solar Energy". NASA Langley Research Center, Pp. 43, FIG. 9.5.2, and yaw angle configurations according to approach (FIG. 7B), with a specific volume of ν=0.775194 m³/Kg.

Aerodynamic equations:

$$\Psi_w = \cos^{-1}\left[\frac{\mho_\infty + \cos(\alpha_w) \times \mho_w}{\sqrt{(\mho_\infty + \cos(\alpha_w) \times \mho_w)^2 + (sen(\alpha_w) \times \mho_w)^2}}\right]$$

CD($\Psi_\infty \sim \Psi_W$)=Drag coefficient

A=Projected frontal area of the vehicle.

$A_{TrD}$=Area Tribodynamic effect 8.45% [m²].

TABLE 3

Yaw angle wind and force differentials
Airflow Kinematics

| | |
|---|---|
| Wind velocity [m/s] = | 5.00 |
| Truck + Semi Trailer Speed [m/s] = | 33.33 |
| ρ [kg/m3] = | 1.29 |
| Wind angle grad ψ = | 1.00 |
| Cos Phi | 0.999847695 |
| Sen Phi | 0.017452406 |
| Scos | 4.999238476 |
| Ssen | 0.087262032 |
| H = | 0.087262032 |
| Hip = | 38.329337808 |
| Drag force Wind FDW Newton = | 1,469.1381 |
| Effective Wind (a) = | 38.32933781 |
| Lateral Cross Wind (b) = | 0.0873 |
| Axial wind component (c) = | 38.32923848 |
| alpha = | 0.0023 |
| alpha rad = | 1.5685 |
| Arcos = | 89.8696 |
| Yaw angle X, Y Ψ (X, Y) = | 0.1304 |
| Yaw angle X, Z Ψ (X, Z) = | 19.1070 |

TABLE 4.a

Drag on System TruckTractor + Semi-trailer Smooth surface equation aerodynamic + Cross wind

| | | | | | Variation (x; y; z) | |
|---|---|---|---|---|---|---|
| Scheme | Area [m²] | Cd | $FD_{Sm}$ N | $FD_W$ + $FD_{Sm}$ N | Ψ X; Y (Yaw) grad | Ψ X; Z (Yaw) grad |
| 1 | 10.48 | 0.74 | 5,558.37 | 7,027.51 | 0.00 | 0.00 |
| 2 | 11.79 | 0.82 | 6,946.51 | 8,415.65 | 1.00 | 0.50 |
| 3 | 12.85 | 0.88 | 8,063.17 | 9,532.30 | 1.50 | 1.00 |
| 4 | 13.82 | 0.92 | 9,096.05 | 10,565.19 | 2.00 | 1.50 |
| 5 | 14.48 | 0.94 | 9,793.83 | 11,262.97 | 2.50 | 1.50 |
| 6 | 16.09 | 1.00 | 11,505.40 | 12,974.54 | 3.50 | 2.00 |
| 7 | 17.33 | 1.03 | 12,820.37 | 14,289.50 | 4.50 | 2.00 |
| 8 | 14.83 | 0.96 | 10,163.93 | 11,633.06 | 2.50 | 2.00 |
| 9 | 15.46 | 0.98 | 10,838.38 | 12,307.51 | 3.00 | 2.00 |
| 10 | 15.83 | 0.99 | 11,230.74 | 12,699.88 | 3.00 | 2.50 |
| 11 | 16.72 | 1.02 | 12,167.13 | 13,636.26 | 4.00 | 2.00 |
| 12 | 17.95 | 1.05 | 13,476.79 | 14,945.92 | 5.00 | 2.00 |

$FD_{Sm}$*=Drag force Truck Tractor-Semi-trailer (dry van or reefer 53 foot) and smooth surface.

$FD_W$=Oblique force produced by wind speed in different yaw-angle.

$FD_{TrD}$=Drag force tribodynamic surface $\Psi_W$=Yaw angle wind.

ρ=Density of the air.

$\mho_\infty$=Speed of the object, relative to the surrounding air.

$\mho_w$=Speed wind.

$\Psi_\infty$=Effective yaw-angle of the surrounding air relative to the vehicle motion.

Table 3: It is important to define an aerodynamic concept as variable $\Psi_W$, since the equation itself is a passive method of analysis. Therefore, any system that was analyzed under the passive criterion with a drag of less than 9.84%, and an active variable of flow in oblique loads of the wind, as a force running from A to B, would not have a significant effect on the decrease of the advance drag of the system. The variable $\Psi_W$, acts diagonally on the length of the Semi-trailer and acts as a vector other than the force of $F_D$, projected on the plane of the abscissa "x" and its effects are measured on (y;z). For terrestrial transport equipment this equation includes the yaw angle which depends on the area projected only on the ordinate "y" added as a frontal vector. This works on the improvement of the terrestrial transport equipment and diagrammed in its body with function of the center of mass thereof; the yaw of the wind incorporated in this present approach, works as a function of time and decomposes in the total of the surface in its length and serves us to measure the wear factor of the vector $F_D$. Without this vector it would assume the condition of the Truck Tractor+Semi-trailer as a whole, corresponding to 50.00% Truck Tractor+50% Semi-trailer, in yaw zero, to the total drag force. In which this is not the case, this is why the trigonometric function is incorporated in order to increase the precision of the calculation as a function of the cosine Cos. x ($F_D$).

Table 4.a. Examples of wind direction changes or yaw angle, as the projected area increases, it increases its drag exponentially. The projected wind as an oblique variable ($\Psi_W$) increases in (9.84%) the drag in the length of the system with a rate of increase of the (2.1%) by gradient less than (1°), this means that the gradient of ($\nabla F_D$=2.1%) is the one that increases the drag in the Semi-trailer by angular unit, the increase between the scheme 6 to 7 without considering the yaw oblique is (11.45%) and ($\Psi_W$) is ($\nabla F_D$−11.44%), this factor decreases with the increase of the angle of attack of the wind. The importance in the crosswind, is such that affects the stability of the Semi-trailer in the same way affects the constant advance constant of the set, in short yes; $\Psi_W > \nabla F_D$. In summary, the trend tells us that the greater the projection of the system area, the resistance produced by the drag wind starts to be less relevant than the projected area within a range of (0°) and (45°) and after angles greater than (45°) the drag wind begins to be more relevant.

Observations: Unlike the tunnel, the aerodynamic equation reveals what the drag is in terms of the projected area of the system set, however for elements that add drag to the Semi-trailer (e.g., transitions truck/Semi-trailer, interior set of rolled, and protruding elements on the boundary layer of the air flow), it does not differentiate these variables from the interior or exterior areas, which ultimately may add resistance to the system, unlike the 3D software which includes all visible areas, even if they are superimposed or hidden from the frontal area. If we compare the aerodynamic equation method with that obtained for example in step 1, VAR 1° of the 3D analysis (Table 1.a), this value throws a relative error of (20.90%), however applying the criterion of the yaw oblique, as an additional factor, then this error decreases in (2.19%) (Table 4.a) and therefore almost equaling the 3D tunnel values.

Comparisons of methods and conclusions on the truck trailer system: Both methods [3D analysis (Table 1a, Table 1.b)+(aerodynamic equation (Table 4.a)+projected drag of the flow in its length) (Table 3)], validate in the first instance the geometric similarity, kinematics, and drag values. Although these methods do not rebuke the point in question, they only serve as a method to approximate the aerodynamic behavior of the system and therefore we may fine tune the quality and precision of the analysis with kinematic and dynamic particle calculations in order to fully understand the superficial phenomenon.

Analysis of the sample section with analytical method (SS. Sample section): The input force is extracted into the system and is integrated as a vector on the surface of the Semi-Semi-trailer and it is demonstrated on a sample section of 0.3% of the total area of the Semi-trailer in order to calculate the kinematic vector behavior via velocities and drag in the 3D tunnel. Comparing the values obtained in aerodynamic equation method (to know the real flow behavior before the roughness and friction), with this value we obtain the actual behavior of vector R3 and its modulus and adding the aluminum/air friction index and the kinematic viscosity, in order to determine the Reynolds number, in the differential section of the sample. (Surface metrology. Roughness. In metrology Ed. Mc. Graw-hill 1995. ch. 17p 436).

Methodology

Analysis of the air flow on the surface as a function of time (t).

The total amount of air property α in the system at time t is:

$$\int_{V(t)} \alpha(t) dV$$

and the amount of air α at the instant t+δt is:

$$\int_{V(t+\delta t)} \alpha(t + \delta t) dV$$

The material derivative of the total amount of air α or flow in the system:

$$\frac{D}{Dt} \int_{V(t)} \alpha(t) dV = \lim_{\delta t \to 0} \frac{1}{\delta t} \left\{ \int_{V(t+\delta t)} \alpha(t + \delta t) dV - \int_{V(t)} \alpha(t) dV \right\}$$

By derivation.

$$\frac{D}{Dt} \int_{V(t)} \lim_{\delta t \to 0} \left[ \frac{1}{\delta t} \left\{ \int_{V(t+\delta t)} \alpha(t + \delta t) dV - \int_{V(t)} \alpha(t + \delta t) dV \right\} + \frac{1}{\delta t} \left\{ \int_{V(t)} \alpha(t + \delta t) dV - \int_{V(t)} \alpha(t) dV \right\} \right]$$

Fixed integration with volume change in sample section.

$$\lim_{\delta t \to 0} \frac{1}{\delta t} \left[ \int_{V(t+\delta t)} \alpha(t + \delta t) dV - \int_{V(t)} \alpha(t + \delta t) dV \right]$$

By reducing the material derivative of the total quantity and the fixed integration.

$$\lim_{\delta t \to 0} \frac{1}{\delta t} \int_{V(t+\delta t) - V(t)} \alpha(t + \delta t) dV$$

If the air travels through the area of the Semi-Semi-trailer as a body dA at two distinct points and at two time intervals t y (t+δt) within the field of action of the tribo surface between the two instants of air in transition dA from point "A" to point "B", then the variation of velocity in time allows us to determine by Reynolds theorem the states of the volume of the flow in each section of the sample section.

As a function of the volume change over time: If $F_D$ is the vector normal to the surface and $\mho$ is the velocity of the system $F_D \times \mho$, corresponds to the velocity normal to the surface, in the lapse $\delta t$, the surface moves at a distance $\mho \times F_D \, \delta t$, normal to it, then:

$$dV = \mho \times F_D \delta t \, dA$$

Representing the fixed integration with change of volume on the surface.

$$\lim_{\delta t \to 0} \int S(t)\alpha(t+\delta t)\mho \times F_D \delta t \, dA$$

Simplifying the limit.

$$\int_{S(t)} \alpha(t)\mho \times F_D \delta t \, dA$$

As a function of the movement of the air flow in time, over the surface.

$$\int_{V(t)} \left[\frac{\partial \alpha}{\partial t} + \frac{\partial(\alpha \mho_i)}{\partial x_i}\right] dV$$

The resulting vector has components (dx, dy, dz) in the axes (x, y, z), respectively, the line of projection velocity of flow $\mho$ is parallel to the direction of (ds). Therefore, the components in graphs are u, v, w, with the modular vector of the element as (ds).

$$\frac{ds}{ds} = \frac{dx}{ds}i + \frac{dy}{ds}j + \frac{dz}{ds}k$$

It must be equal to the modular vector of $\mho$.

$$\frac{\mho}{\mho} = \frac{u}{\mho}i + \frac{v}{\mho}j + \frac{w}{\mho}k$$

(ds) and $\vec{\mho}$, correspond to the magnitudes ds y $\mho$.

$$\left.\begin{array}{l}\dfrac{dx}{ds} = \dfrac{u}{\mho} \\[4pt] \dfrac{dy}{ds} = \dfrac{v}{\mho} \\[4pt] \dfrac{dz}{ds} = \dfrac{w}{\mho}\end{array}\right\} \Rightarrow \frac{dx}{u} + \frac{dy}{v} + \frac{dz}{w}$$

Under an inertial system (air), with position.

$$r_a = r_0 + r_{Al}$$

With respect to time.

$$\frac{dr_a}{dt} = \frac{dr_0}{dt} + \frac{dr_{Al}}{dt}$$

With a speed and depending on the change of position.

$$\Omega = \Omega = \begin{pmatrix} \cos(\phi)\cos(\theta) & -\sin(\theta)\cos(\alpha) + \cos(\theta)\sin(\phi)\sin(\alpha) & \sin(\theta)\sin(\alpha) + \cos(\theta)\sin(\phi)\cos(\alpha) & 0 \\ \sin(\theta)\cos(\phi) & \cos(\theta)\cos(\alpha) + \sin(\theta)\sin(\phi)\sin(\alpha) & -\cos\theta\sin\alpha + \sin\theta\sin\phi\cos\alpha & 0 \\ -\sin(\phi) & \cos(\phi)\sin(\alpha) & \cos(\alpha)\cos(\phi) & 0 \\ 0 & 0 & 0 & 1 \end{pmatrix}$$

$$\mho_a = \mho_0 + \mho_{Al} + \Omega \times r_{Al}$$

With acceleration.

$$a_z = a_l + a_{Al} + 2\Omega \times \mho_{Al} + \Omega \times (\Omega \times r_{Al})$$

From all of the above, we obtain the line of projection of the flow in vectorial terms relative to the velocity. These lines are connected with the points established within the area and space of a sample section, (2,226,447 points analyzed under a renewal cycle or sweep of 4,608.00 times Table 7a), so that all the inertial air particles produced on the curves are product of the projection and contact a structured mesh surface which produce vectors tangential to these projections. This is where the flow lines in the sample plots indicate the direction of vector movement along the non-inertial surface (aluminum) (Table 10) within a period of given time.

TABLE 5.a

Wind tunnel analysis 3d speeds sample section Smooth Surface 10.0 m/s. To 140.0 m/s.
(22.4 mph~313.2 mph)
FLUCTUATIONS SMOOTH SURFACE

| Directional Variations and Speed | Drag Coeff (Max/Min) | $FD_{Sm}$ N | $\bar{X}$ Drag | $\delta$ Cd | $\Delta FD_{Sm}$ N | Stability % |
|---|---|---|---|---|---|---|
| ($\alpha$; $\beta$; $\gamma$) X = 270; Y = 270; Z = 180 Speed. 10.00 m/s.~22.37 mph. Var. 1° | 1.14 0.79 | 9.44 6.54 | 0.97 | 0.82 | 6.77 | 69.28 |
| ($\alpha$; $\beta$; $\gamma$) X = 270; Y = 270; Z = 180 Speed. 20.00 m/s.~44.74 mph. Var. 1° | 1.08 0.87 | 35.63 28.70 | 0.99 | 1.06 | 34.99 | 80.54 |
| ($\alpha$; $\beta$; $\gamma$) X = 270; Y = 270; Z = 180 Speed. 30.00 m/s.~67.11 mph) Var. 1° | 0.87 0.64 | 64.28 47.48 | 0.75 | 0.85 | 62.72 | 73.86 |

TABLE 5.a-continued

Wind tunnel analysis 3d speeds sample section Smooth Surface 10.0 m/s. To 140.0 m/s. (22.4 mph~313.2 mph)
FLUCTUATIONS SMOOTH SURFACE

| Directional Variations and Speed | Drag Coeff (Max/Min) | $FD_{Sm}$ N | $\overline{X}$ Drag | δ Cd | $\Delta FD_{Sm}$ N | Stability % |
|---|---|---|---|---|---|---|
| (α; β; γ) X = 270; Y = 270; Z = 180 Speed. 40.00 m/s.~89.484 mph. Var. 1° | 1.15 0.87 | 150.99 114.58 | 1.06 | 0.89 | 117.59 | 75.88 |
| (α; β; γ) X = 270; Y = 270; Z = 180 Speed. 50.00 m/s~111.85 mph. Var. 1° | 1.06 0.87 | 218.47 178.61 | 0.96 | 0.96 | 194.89 | 81.75 |
| (α; β; γ) X = 270; Y = 270; Z = 180 Speed. 60.00 m/s.~134.22 mph. Var. 1° | 1.18 0.79 | 349.97 233.78 | 1.05 | 0.83 | 245.00 | 66.80 |
| (α; β; γ) X = 270; Y = 270; Z = 180 VEL. 70.00 m/s~156.59 mph. Var. 1° | 0.90 0.80 | 341.00 303.00 | 0.85 | 0.81 | 308.13 | 88.86 |
| (α; β; γ) X = 270; Y = 270; Z = 180 Speed. 140.00 m/s~313.17 mph. Var. 1° | 0.97 0.97 | 1,469.41 1,468.60 | 0.97 | 0.97 | 1,469.28 | 99.94 |

TABLE 6.a

Obtaining vectors R3, after friction loss and roughness (Reynolds transport Theorem), analytical method Smooth Surface 10.00 m/s. To 190.00 m/s. (22.40 mph-425.02 mph)

| Speed Sample Section Ʊ [m/s] | $FD_{Sm}$ N | Rex transition Transport Theorem Sm | Rate smooth Reynolds |
|---|---|---|---|
| 10 | 21.53 | 335,555.56 | 0.00281 |
| 20 | 51.13 | 671,111.11 | 0.00561 |
| 30 | 93.80 | 1,006,666.67 | 0.00842 |
| 40 | 149.53 | 1,342,222.22 | 0.01122 |
| 50 | 218.32 | 1,677,777.78 | 0.01403 |
| 60 | 300.18 | 2,013,333.33 | 0.01683 |
| 70 | 395.11 | 2,348,888.89 | 0.01964 |
| 80 | 503.10 | 2,684,444.44 | 0.02244 |
| 90 | 624.16 | 3,020,000.00 | 0.02525 |
| 100 | 758.29 | 3,355,555.56 | 0.02805 |
| 110 | 905.48 | 3,691,111.11 | 0.03086 |
| 120 | 1,065.73 | 4,026,666.67 | 0.03366 |
| 130 | 1,239.05 | 4,362,222.22 | 0.03647 |
| 140 | 1,425.44 | 4,697,777.78 | 0.03927 |
| 150 | 1,624.89 | 5,033,333.3 | 0.04208 |
| 160 | 1,837.41 | 5,368,888.9 | 0.04488 |
| 170 | 2,063.00 | 5,704,444.4 | 0.04769 |
| 180 | 2,301.65 | 6,040,000.0 | 0.05049 |
| 181 | 2,326.23 | 6,073,555.6 | 0.05077 |
| 182 | 2,350.95 | 6,107,111.1 | 0.05105 |
| 183 | 2,375.79 | 6,140,666.7 | 0.05133 |
| 184 | 2,400.77 | 6,174,222.2 | 0.05161 |
| 185 | 2,425.87 | 6,207,777.8 | 0.05189 |
| 186 | 2,451.11 | 6,241,333.3 | 0.05217 |
| 187 | 2,476.48 | 6,274,888.9 | 0.05245 |
| 188 | 2,501.98 | 6,308,444.4 | 0.05273 |
| 189 | 2,527.60 | 6,342,000.0 | 0.05302 |
| 190 | 2,553.36 | 6,375,555.6 | 0.05330 |

| Speed Sample Section Ʊ [m/s] | Axial wind component | alpha | alpha rad | Arcos | Yaw angle ΨX,Y |
|---|---|---|---|---|---|
| 10.00 | 15.005 | 0.0058177 | 1.5649786 | 89.66667 | 0.33333 |
| 20.00 | 24.999 | 0.0034906 | 1.5673058 | 89.80000 | 0.20000 |
| 30.00 | 34.999 | 0.0024932 | 1.5683031 | 89.85715 | 0.14285 |
| 40.00 | 44.999 | 0.0019392 | 1.5688571 | 89.88889 | 0.11111 |
| 50.00 | 54.999 | 0.0015866 | 1.5692097 | 89.90909 | 0.09091 |
| 60.00 | 64.999 | 0.0013425 | 1.5694538 | 89.92308 | 0.07692 |
| 70.00 | 74.999 | 0.0011635 | 1.5696328 | 89.93334 | 0.06666 |

TABLE 6.a-continued

| | | | | | |
|---|---|---|---|---|---|
| 80.00 | 84.999 | 0.0010266 | 1.5697697 | 89.94118 | 0.05882 |
| 90.00 | 94.999 | 0.0009186 | 1.5698778 | 89.94737 | 0.05263 |
| 100.00 | 104.999 | 0.0008311 | 1.5699653 | 89.95238 | 0.04762 |
| 110.00 | 114.999 | 0.0007588 | 1.5700375 | 89.95652 | 0.04348 |
| 120.00 | 124.999 | 0.0006981 | 1.5700982 | 89.96000 | 0.04000 |
| 130.00 | 134.999 | 0.0006464 | 1.5701499 | 89.96296 | 0.03704 |
| 140.00 | 144.999 | 0.0006018 | 1.5701945 | 89.96552 | 0.03448 |
| 150.00 | 154.999 | 0.0005630 | 1.5702333 | 89.96774 | 0.03226 |
| 160.00 | 164.999 | 0.0005289 | 1.5702675 | 89.96970 | 0.03030 |
| 170.00 | 174.999 | 0.0004986 | 1.5702977 | 89.97143 | 0.02857 |
| 180.00 | 184.999 | 0.0004717 | 1.5703246 | 89.97297 | 0.02703 |
| 181.00 | 185.999 | 0.0004692 | 1.5703272 | 89.97312 | 0.02688 |
| 182.00 | 186.999 | 0.0004666 | 1.5703297 | 89.97326 | 0.02674 |
| 183.00 | 187.999 | 0.0004642 | 1.5703322 | 89.97341 | 0.02659 |
| 184.00 | 188.999 | 0.0004617 | 1.5703346 | 89.97355 | 0.02645 |
| 185.00 | 189.999 | 0.0004593 | 1.5703371 | 89.97369 | 0.02631 |
| 186.00 | 190.999 | 0.0004569 | 1.5703395 | 89.97382 | 0.02618 |
| 187.00 | 191.999 | 0.0004545 | 1.5703418 | 89.97396 | 0.02604 |
| 188.00 | 192.999 | 0.0004521 | 1.5703442 | 89.97409 | 0.02591 |
| 189.00 | 193.999 | 0.0004498 | 1.5703465 | 89.97423 | 0.02577 |
| 190.00 | 194.999 | 0.0004475 | 1.5703488 | 89.97436 | 0.02564 |

Reynolds sample section theorem conclusion: Table 5.a and Table 6.a show the difference between the two methods may be significant, on average a 30% incremental between gear changes, the motive is the increase in drag is product of the inclusion of magnitudes in the numerical method which is necessary in order to obtain the states of transitions of Reynolds flows.

With the Drag forces attained ($FD_{Sm}$) with different velocities (10.00 m/s~190.00 m/s) in the kinematic numerical method, from the sample section we can extract the obtained vectors (Table 6.a) and apply these vectors on the walls of the Semi-trailer. The increase of the drag in dynamic conditions with the associated roughness index and the kinematic viscosity index of the air was measured and the Reynolds number was obtained for the total system ($R_{ex}$ Transition Transport Theorem Sm in Table 6.a), and the air flow behavior of different speeds.

Analysis of the electro affinity and adherence of the air particle with the surface of the semi-trailer (dry van 53 foot): To add this variable to the analysis, we must know the properties of the air particle (Table 8) and determine by the Lewis structure method of the free electrons to calculate the separation point in a continuous cycle system of the particle on the surface. Each of the constituent elements of the air are calculated separately giving the result of the operation; the pairs of electrons in the bonds between the atoms of the air molecule and the free electrons, which is the value of interest as a variable of calculation and depending on the tribo-electricity as well as the numbers of cycles in the regime of the system, will depend the volume of containment of the invention. That is to say the vortex of protection of the surface, besides the reliability of the design should be associated with this parameter and increase the accuracy of the actual drag values on the surface. This analysis has been performed at extreme system velocities. The initial vectors are obtained from the sample section and are derived in the areas (knowing that a Truck Tractor would not reach these velocities, but we need to know its maximum and minimum dissipation point for other modes of transportation and other applicable surfaces type possibilities).

TABLE 8

Particle and tribo-electricity tables
Percentage by volume

| | Gas | Symbol | Volume (%) |
|---|---|---|---|
| 1 | Nitrógeno (N2) | N2→ | 7.81E+01 |
| 2 | Oxígeno (O2) | O2→ | 2.09E+01 |
| 3 | Argón (Ar) | Ar→ | 9.34E−01 |
| 4 | Dióxido de carbono (CO2) | CO2→ | 3.50E−02 |
| 5 | Neón (Ne) | Ne→ | 1.82E−03 |
| 6 | Helio (He) | He→ | 5.24E−04 |
| 7 | Metano (CH4) | CH4→ | 1.79E−04 |
| 8 | Kriptón (Kr) | Kr→ | 1.14E−04 |
| 9 | Hidrógeno (H2) | H2→ | 5.50E−05 |
| 10 | Óxido nitroso (N2O) | N2O→ | 3.00E−05 |
| 11 | Monóxido de carbono (CO) | CO→ | 1.00E−05 |
| 12 | Xenón (Xe) | Xe→ | 9.00E−06 |
| 13 | Ozono (O3) | O3→ | 0 to 7E−06 |
| 14 | Dióxido de nitrógeno (NO2) | NO2→ | 2.00E−06 |
| 15 | Yodo (I2) | I2→ | 1.00E−06 |
| 16 | Amoniaco (NH3) | NH3→ | 3.00E−04 |

Tribo Electric Series

| | | |
|---|---|---|
| AIR→ | STEEL→ | POLYESTER→ |
| SKIN→ | WOOD→ | POLYESTYRENE→ |
| HUMAN HAIR→ | LUCITE→ | CELLOPHANE TAPE→ |

TABLE 8-continued

Particle and tribo-electricity tables
Percentage by volume

| | Gas | Symbol | Volume (%) |
|---|---|---|---|
| MICA→ | AMBER→ ↑ | POLYURETHANE→ | |
| | ⌢ | POLYETHYLENE→ | ↑ |
| NYLON→ ↑ | RUBBER BALLOON→ + | | ⌢ |
| ⌢ | ⌣ | POLYPROPYLENE→ | \| |
| WOOL→ + | HARD RUBBER→ ↑ | | ⌣ |
| ⌣ | MYLAN→ ↓ | POLYMIDE→ | ↓ |
| CAT FUR→ ↓ | ⌢ | PVC→ | |
| LEAD→ | EPOXY GLASS→ \| | TEFLON→ | |
| SILK→ | ⌣ | SILICONE RUBBER→ | |
| ALUMINUM→ | NICKEL→ ↓ | | |
| PAPER→ | COPPER→ | | |
| COTTON→ | SILVER→ | | |
| | GOLD, PLATINUM→ | | |

Electro affinity of the air particle on the surface: The air particle has a greater affinity to the aluminum surface. As the speed of the system increases in reciprocity to the dynamic variables, a retention point greater than that of the electro-affinity occurs. By Coulomb's law "the charge q of a particle is a numerical quantity that specifies the magnitude and direction of the electric force on a particle such that $$\left|\frac{q_1}{q_2}\right| = \pm \frac{\vec{f_1}}{\vec{f_2}}$$

depending on the electrons of the object, which in this case is aluminum, and the relative directions of $(\vec{f_1} \, y \, \vec{f_2} \ldots \vec{f_n})$ the air are also the same. Therefore, the relative magnitude and direction of the electric forces depend only on the electronic affinity of the air/aluminum elements and in the case of a continuous flow example of air/air/aluminum operating system. The number of electrons for aluminum is 13 and the free electrons of the air is 5, then the aluminum will not lose electrons, but will adopt those of the air. The air in the first contact with the aluminum surface will lose electrons, product of the friction of air with the surface as well as the upper particle to which it lost electrons, it also tends to lose electrons in turn by the contact of the lower particle. These particles will electronically add up and tend to repel the particles in the higher states, then, by Coulomb's law, the charge Q of a particle system is defined as the total charge, ie. as the sum of the charges $q_1, q_2, q_3, \ldots q_n$, of all the particles of the system implies that $Q=q_1+q_1+q_1+ \ldots q_n$, with this the point of adhesion of the air particle is obtained with an aluminum surface between a velocity range 10.00 m/s to 250.00 m/s, and the maximum point when the charges of the air particles are equal to the of aluminum (4.47 times a cycle of renewal).

The behavior of the particle is dispersed but its lower limit tells us about which area functions and produces drag. The trend shows us that it decays but does not lose its force on the surface as friction, roughness, surface geometry, temperature, system velocity, wind speed, relative humidity, causing this effect to have a constant harmonic behavior and is released as a whip effect, or as an additional charge or as a suction. Provided that the harmonic wave is born and until it decays, to be detected it is necessary to submit to the system a continuous cycle of work, that is to say to consider the adhesion of the particle and the separation of this in (x, y, z) maintaining the vectorial equality with the loss factors associated with the elements calculated above, their duration is 17.59 seconds (which must be added at 7 minutes 33 seconds of the displacement of the air particle over the system). This variable adds to the dynamic drag 42.84% more resistance to advance. This phenomenon is produced by the active and passive contact of the aluminum surface with the air flow and produces a harmonic wave system, which goes from a point A to a point B, It is cumulative in nature and is linear at the rate of advance of the system.

In Table 9.a, Speed 33.33 m/s, Plotted in the FIG. 10.a, 10.b, represents the standard high-speed highway speed in the USA, 42.84% is the vector differential loss across the entire length of the Semi-trailer, in the "x" plane. In detail, it is the forward resistance of the vector of $F_{DSm}=110.90$ Newton, with a Reynolds number $R_{ex}=1,118,407.00$, obtained after the dynamic analysis of the inertial flow in the sample section, the graph of FIG. 10a. Indicates the beginning of the harmonic cycle of the vector $F_{DSm}$ started in horizontal C1 to vertical C8, in a time of 0.49 seconds (time it takes to change direction of the vector at a speed $$\text{U}\_\infty = 33.33 \frac{m}{s}$$

and with a yaw angle $\Psi_W=1°$ with a wind speed $$\text{U}_W = 5.00 \frac{m}{s}\text{),}$$

subjected to electroaffinity between the air and the entire surface of the Semi-trailer (dry van 53 foot), gives the vector C2 horizontal=109.45 Newton in a time of 0.448 seconds, the difference of 0.448 hundredths of seconds is due to the initial vector being in affinity state tribo-electric, causing the next vector C2 to travel the length of the surface of the Semi-Semi-trailer in less time, but with a directional instability, since the surface roughness index is gradually reduced and the kinematic viscosity increases in the system, and so on until reaching horizontal C11 as a function of vertical C8.

In FIG. 9A, the areas under the curve and chord lengths of all variables of the kinematic, dynamic and tribo-electric calculations are plotted, being: Area N° 1=The resultant of the behavior of the vector trajectory obtained from the kinematics of the flow, in dynamic environmental transitions, N° 2=Is the suction pressure produced by the protrusion of the flow in active contact with the surface, and N° 3=Is the tribo-electric behavior of the flow on the surface, the calculation procedure is repeats in (Table 9.a) at speeds of 10.00~20.00~30.00~33.33~38.88~40.00~50.00~100.00~150.00~200.00 and 250.00 m/s. To obtain comparative parameters between the normal surface and the present approach.

The time of propagation and dissipation of the flow in tribo-electric transition state (FIG. 9A., tribo-electric Drag N° 3) at a velocity of 50.00 m/s, (111.85 mph), is 17.59 seconds, at a distance of 879.51 meters (0.55 mi). For a speed (knowing that the set does not reach this speed), from 343.20 m/s (767.72 mph), the dissipation time is 17.59 seconds at a distance of 6,033.47 meters (3.75 mi), in all cases, the tribo-electric drag is the same 42.84%, which acts on the $F_{DSm}$, in the case of a velocity of 33.33 m/s (119.99 mph) the input vector is 110.90 Newton and after the triboelectric drag is 96.36 Newton, therefore, the tribo-electric variable depends on the speed and is linear to the distance, that is to say, the more speed reaches the set, it needs to travel more distance to be able to dissipate the surface harmonic frequency in the Semi-Semi-trailer system, the 17.59 seconds are referential to a Semi-trailer (dry van 53 foot), therefore the dwell time is shorter in smaller lengths of dry van or reefer.

In a physical analysis of a wind tunnel, it would be very difficult to detect this phenomenon, because it works with the static system and the flow in dynamic conditions, but basically what is measured in a tunnel is the kinematic behavior of the air over the areas with aerodynamic curvature, and to be detected must be calculated by kinematics and particle dynamics, in addition to the tribo-electric component, under a system of analysis of linear, surface and volumetric electric charge densities ($\sigma$, $\rho$, $\Lambda$), which is why the presemt approach is referred to as "Aerodynamic Drag Reduction using Tribodynamics Cells".

General conclusion on normal smooth surface, in semi-semi-trailer: The maximum force occurs in the convergence of 4 factors associated with the force of advance of the system, these are:
 a. The projection of the kinematic force of the wind and the resultant of this associated to the length of the walls of the Semi-trailer, equivalent to 9.84% of the initial force of entrance to the system
 b. The kinematic viscosity of the air plus the index of friction, associated with the micro-cluster of the order of retention at the 0.6% advance, incremental at the rate of advancement of the upper boundary layer over 5.4% a high velocities (while the upper boundary layer reaches the laminar state, the flow in active contact, it changes its state to transition and turbulent, according to its speed)
 c. The projection of pressure on the active faces of the Semi-trailer walls, acting as a suction vortex on the walls opposite the angle of attack of the wind flow equivalent to 25.06% (maximum hypotenuse of the equipment 14.14% of the total area of 124.28 m² (1,337.73 ft²), minus the suction vortex).
 d. The tribodynamic effect, which acts as a wall to the normal flow advance, making it circulate in a cyclic regime and at a given time constraining the advance by a 42.84% in projected lengths of time.

All reach their maximum magnitude as a function of time and act as a single mass throughout the system, occurs in quadruple convergence, which produces a determined force and added in a cycle, with a permanence dependent on the progress and speed of the system and produces waves, which ultimately are the cause of the plastic deformation of the Semi-trailer walls, with depth of the wave is 35.00 mm (1.38") and an height 28.72 mm (1.13"). This phenomenon interacts as a dynamic load, which produces an additional consumption of fuel (at high speeds), which may indicate the significance of analyzing the aerodynamic systems for transport, from a kinematic and dynamic point of view of the behavior of the air itself.

Boundary condition of the present approach: All the parameters of calculation considered in the previous analyzes are those that ultimately tell us what edge conditions to consider for the optimal solution to the deformation effect of the Semi-trailer walls, the idea is to give a scientific basis to the cause effect and do not incur elements of chance, therefore, all of the above, macro analysis and microanalysis we rescue the following points, for the parameters of the present approach:
 a) From the kinematic drag: (3D design+aerodynamic equation+kinematic particle analysis), with this analysis we obtain the conditions of yaw angle, at different speeds and the influence of the surface in the advance, we know the vectorial behavior of the flow scalar magnitudes R3 and mixed vector product) before the friction, besides the influence of the wind, contrary to the advance and we know that the surface of the Semi-trailer in conditions of yaw angle, influences almost 50% that must be added to the drag of advance, therefore, the design must reduce that drag, that is to say that with this we obtain the necessary area of reduction and uniformity of the invention.
 b) Dynamic drag: (kinematic analysis+dynamic particle analysis+Reynolds transport theorem), we obtain the points to be channeled and the measurement of the points of dispersion, this implies that we now know which matrix direction our invention should lead, (walls of channeling and deflection), in addition to the pressure in the system, with this we obtain the geometry of the section and the depth (volume resistant), therefore the resistance of the wall and increase kinematic and dynamic of the flow in conditions of friction.
 c) Tribodynamic Effect: From this parameter we obtain the permanence of the flow, maximum speed of the invention and renewal cycles, in addition to the harmonic surface cycle of the Semi-trailer, the height and depth of the wave, and the tribo-electric effect on the walls of the dry van, therefore, we obtain the volume of tribo-electric retention, and of electro affinity of the section, that is to say for the design of the invention, it gives us air flow that acts on the upper wind flow as a protective mattress system, and the design of the mini section type Van de Graaft, (we will take advantage of the electro affinity of the air particle with the surface, to increase the system of retention and flotation)

Parametric configuration of the present approach: Knowing the metallurgical area, hexagonal structures in Bravais networks are the most resistant bonds of nature, just study the family of carbon allotropes, and we will realize that these characteristics make it one of the most resistant to the planet, as an example of the graphene, its geometrical properties make them flexible but very resistant, because by vectorial decomposition, when a tension is applied, it dissipates the concentration of the effort in its diagonal vertices, and concentrates them inside the themselves, their corners almost do not stress to the application of the load, because when they bind the cells, they become stronger with each other.

A cell is resistant by itself, but added and linked, with two cells, increases its resistance to deformation by a 52.68%. In this understanding, the approach to the deformation should be hexagonal, as a point of the first, but not the given that the perimeter of the section (x, y) must be of this geometry, but; What happens to the depth?, If we project the surface in (z), we would have the same surface but now with a depth. With the data obtained from the harmonic equations with the depth of the wave that produce the deformation, it is not useful to project the surface in depth with a scale 1:1, since the walls would be weak points, and would not produce a cycle of renewal, if not containment of pressures. To produce renewal cycles and considering the strength of the wall, plus the volume of air retention that must be increased in its dynamics of movement, to produce a rotational cycle inside it, the option of volumetric condition is a hexagonal pyramid. Knowing that the equipment's column width condition is 3.0", this gives us the area over which we must work and meet the design goal of the present approach.

With this we fulfill the parameters of surface resistance in (x, y, z), that is, by the mere fact of adding nerves and hexagonal sections, plus a depth with conical pyramidal reduction, we are contributing more than 60.02% (testing of the cell as a whole) of resistance to the current surface, increasing a 7.0% of its weight in a material having an elongation limit of 21.0%. In summary it improves the mechanical properties to the torsion and traction or its module of section or moments durables, reason why it becomes an integral member to the general resistance of the equipment, chassis and box of the dry or refrigerated Semi-trailer.

With the above we obtain the first part to the approach, but in the inferior faces of the hexagonal pyramid, friction takes place, and calculating this surface we have a reduction of the 34.87% of the aerodynamic resistance, but the surface pressure decreases to the east reduction volume, so we need to produce a dead surface at the base, that is, we must continue with the strength of the volume, but now we have the edge condition, which must be frictionless at its base. Calculated the harmonic cycles, and tribo-electric, we know that the electrostatic cumulative is 4.47 times by density of surface electric charge and volumetric air circulation, and that produces the whip and deformation effect on the walls of the Semi-trailer, the depth of the wave is 35.00 mm (1.38') and a height 28.72 mm (1.13"), we add a Semi-spherical cap, which by tribo-electricity (produced by constant friction), captures this harmonic cycle and uses it to benefit the cell itself, flow in a regime of 4.47 times and will reduce the internal friction, this cap will act as a mini accumulator of Van de Graaft. Basically by including the hemispherical cap, we capture the harmonic wave of the surface, and we interrupt its constancy, (by effect of the low center of gravity of the unit cell, CG=$\Delta$x=3.92"; $\Delta$y=4.52"; $\Delta$z=0.83"), we capture the particle of air, and with this we concentrate the action on the center of gravity in the equipment that produces the air flow, and increases the stability of the system in the Semi-trailer assembly in 29.68%, in its mass center in a system of particles.

$$\sum_{i=1}^{n} mi(ri - R) = 0$$

Table 10 show de analysis of the entire section with the built-in cap, in a specimen of the same character (long, wide, high) that the specimen extracted in the Semi-trailer and replace its faces with a set of cells tribodynamics, apply charges in (x, y, z) at its maximum ends, in order to worsen the calculation condition and to assimilate the actual load that the surface could suffer and assuming as condition an aluminum plate of 1.5 mm thickness (0.059"), these loads are:

Upper side; we measure compression and traction at x=2,204.62 Lb.
Central interior; we measured interior pressure, inner traction and external compression at z=2,204.62 Lb.
Upper descending; we measured buckling, and compression at y=2,204.62 Lb.

TABLE 10

Analysis of both sample sections: tension, torsion, compression and buckling
Reaction Force and Moment on Constraints

| Constraint Name | Reaction Force | | Reaction Moment | |
|---|---|---|---|---|
| | Magnitude | Component (X, Y, Z) | Magnitude | Component (X, Y, Z) |
| Fixed Constraint: 1 | 27746.9 N | 19620 N | | 0 Nm |
| | | −19620 N | 18003.4 Nm | 0 Nm |
| | | 0 N | | 18003.4 Nm |

| Result Summary | | | Material(s) | |
|---|---|---|---|---|
| Name | Minimum | Maximum | Name | Aluminum 6061 Sheet |
| Volume | 5867420 mm³ | | Mass Density | 2.7 g/cm³ |
| Mass | 15.842 kg | | Yiekl Strength | 275 MPa |
| Von Mises Stress | 5,90257E−18 MPa | 4583.03 MPa | Ultimate Tensile Strength | 310 MPa |
| 1st Principal Stress | −1261.58 MPa | 4809.36 MPa | Young's Modulns | 68.9 GPa |
| 3rd Principal Stress | −5586.08 MPa | 872,236 MPa | Poisson's Ratio | 0.33 ul |
| Displacement | 0 mm | 334.126 mm | Shear Modules | 25.9023 GPa |
| Safety Factor | 0.0600039 ul | 15 ul | | |
| Stress XX | −2234.91 MPa | 2082.92 MPa | | |
| Stress XY | −588.431 MPa | 638.929 MPa | Physical | |
| Stress XZ | −1024.14 MPa | 921.382 MPa | Material | Aluminum 6061 |
| Stress YY | −3133.87 MPa | 2692.32 MPa | Density | 2.7 g/cm^3 |
| Stress YZ | −1313.5 MPa | 1339.91 MPa | Mass | 15.842 kg |
| Stress ZZ | −5528.91 MPa | 4777.78 MPa | Area | 7110920 mm^2 |

TABLE 10-continued

Analysis of both sample sections: tension, torsion, compression and buckling
Reaction Force and Moment on Constraints

| | Reaction Force | | Reaction Moment | |
|---|---|---|---|---|
| Constraint Name | Magnitude | Component (X, Y, Z) | Magnitude | Component (X, Y, Z) |
| X Displacement | −36.7273 mm | 14.276 mm | Volume | 5867390 mm^3 |
| Y Displacement | −3.86417 mm | 14.5275 mm | Center of Gravity | x = 228.511 mm |
| Z Displacement | −24.7872 mm | 334.122 mm | | y = −431.056 mm |
| Equivalent Strain | 7.48678E−23 ul | 0.0616953 ul | | z = −280.35 mm |
| 1st Principal Strain | −0.00033544 ul | 0.0601554 ul | | |
| 3rd Principal Strain | −0.0682602 ul | 0.00015294 ul | | |
| Strain XX | −0.0330206 ul | 0.0336728 ul | Mesh settings: | |
| Strain XY | −0.0113587 ul | 0.0123335 ul | Avg. Element Size (fraction of model diameter) | 0.1 |
| Strain XZ | −0.0197694 ul | 0.0177857 ul | Min. Element Size (fraction of avg. size) | 0.2 |
| Strain YY | −0.0394413 ul | 0.030317 ul | Grading Factor | 1.5 |
| Strain YZ | −0.025355 ul | 0.0258648 ul | Max. Turn Angle | 60 deg |
| Strain ZZ | −0.066669 ul | 0.0590936 ul | Create Curved Mesh Elements | Yes |

Note:
DOT 412 and MC-312 DOT-406 and MC-306 respectively refer to the acceleration and deceleration components 0.25 and 0.5 times a s and sx, therefore it can be used in tank mantles and reduce the weight of the equipment, taking as reference the thickness of the walls of the transport of acid and fuel according to standard, fortifying the surface and improving the effective voltage of the equipment. S = [0.5 (Sy + Sx)] [0.25 (Sy − Sx) $^2$ + Ss 2] 0.5.

Kinematic and dynamic analysis of the particle on the tribodynamic sample section: The tribodynamic cell was designed to satisfy all the physical variables of the environment in a system of operating regime in both low and high speed, we must if or if to do an analysis of the flow behavior, on the surface of the sample section of 0.3%, but adding tribodynamic cell volumes (FIG. 10), is why we incorporate the graphs of the projections of the particle, and thus maintain the level of mathematical abstraction and bring it to a graphical representation universal (reviewer).

Kinematics of the tribodynamic cell: All the calculation elements are used to make a kinematic analysis of the wind flow on the Tribodynamic surface, the geometry of the cell is made up of truncated angles, so it is very important to establish the flow behavior parameters, in order to obtain the air renewal cycles inside the surface, it is intended to validate:

The induced decrease in the potential kinetics of the retained flow.

Potential kinetic increase in free flow.

Impulse towards cell reduction point, containment in a cycle of 4.47 times its volume.

Formation of contact pad between cell and upper flow

Changes of state in the upper boundary layers and induced flow with a global Reynolds number Re≤5×105

Define its operation under Newton's three laws of motion

Kinematic, dynamic and parametric equations of the air particle trajectory on a Tribodynamic cell.

Parameters conditional to the Newtonian Mechanics of the particle.

- First law $= m_1\vec{v}_1 + m_2\vec{v}_2 = m_1\vec{v'}_1 + m_2\vec{v'}_2$

- Second law $= \vec{f} = \dfrac{d}{dx}(m\vec{v}) = m\dfrac{d\vec{v}}{dx} = m\vec{a}$

- Third law $= -\dfrac{\Delta \vec{p}_1}{\Delta t} = \dfrac{\Delta \vec{p}_2}{\Delta t} \Leftrightarrow -\dfrac{d\vec{p}_1}{dt} = \dfrac{d\vec{p}_2}{dt} \Leftrightarrow -\overrightarrow{f_{(p_1 p_2)}} = \overrightarrow{f_{(p_2 p_1)}}$ Modular and Scalar R3

$a = a_1 i + a_2 j + a_3 k$ $b = b_1 i + b_2 j + b_3 k$ $c = c_1 i + c_2 j + c_3 k$ $\vec{a}\times(\vec{b}\times\vec{c}) = \begin{vmatrix} a_1 & a_2 & a_3 \\ b_1 & b_2 & b_3 \\ c_1 & c_2 & c_3 \end{vmatrix} = \begin{vmatrix} b_2 & b_3 \\ c_2 & c_3 \end{vmatrix} a_1 - \begin{vmatrix} b_1 & b_3 \\ c_1 & c_3 \end{vmatrix} a_2 + \begin{vmatrix} a_1 & a_2 \\ b_1 & b_2 \end{vmatrix} a_3$ $\vec{a}\times(\vec{b}\times\vec{c}) = c_1 i + c_2 j + c_3 k$ Cosine Directors $\cos\alpha = \dfrac{x}{\|\vec{v}\|} = \dfrac{x}{\sqrt{x^2 + y^2 + z^2}}$ $\cos\beta = \dfrac{y}{\|\vec{v}\|} = \dfrac{y}{\sqrt{x^2 + y^2 + z^2}}$ $\cos\gamma = \dfrac{z}{\|\vec{v}\|} = \dfrac{z}{\sqrt{x^2 + y^2 + z^2}}$ Modules (x, y, z)

$|\vec{v}| = \sqrt{(x_2-x_1)^2 + (y_2-y_1)^2 + (z_2-z_1)^2}$

Cord length of the wind vector.

when $\to \vec{v}R$ to $\mathbb{R}^n s = \displaystyle\int_a^b \sqrt{\left(\dfrac{dx}{dt}\right)^2 + \left(\dfrac{dy}{dt}\right)^2 + \left(\dfrac{dz}{dt}\right)^2}\, dt$ Projection of the vector force field acting on the air particle.

$$\int_a^b \overrightarrow{FD} \times d\vec{r} =$$

$$\lim_{|\Delta\vec{r}_i|\to 0} \sum_{i=1}^{\infty} \overrightarrow{FD}_i \times \Delta\vec{r}_i = \lim_{|\Delta\vec{r}_i|\to 0} \left( \overrightarrow{FD}_1 \times \Delta\vec{r}_1 + \overrightarrow{FD}_2 \times \Delta\vec{r}_2 + \ldots + \overrightarrow{FD}_n \times \Delta\vec{r}_n \right)$$

Product Point of the Projection of the Particle $$\int_a^b \overrightarrow{FD} \times d\vec{r} =$$

$$\lim_{|\Delta\vec{r}_i|\to 0} \left( |\overrightarrow{FD}_1||\Delta\vec{r}_1|\cos\theta_1 + |\overrightarrow{FD}_2||\Delta\vec{r}_2|\cos\theta_2 + \cdots + |\overrightarrow{FD}_n||\Delta\vec{r}_n|\cos\theta_n \right)$$

$$\int_a^b \overrightarrow{FD} \times d\vec{r} = \lim_{n\to\infty} \sum_{i=1}^{n} |\overrightarrow{FD}_i||\Delta\vec{r}_i|\cos\theta_i$$

Pearson Correlation Coefficient $$r(x, y) = \frac{\sum xiyi - n\overline{xy}}{(n-1)_{SxSy}} = \frac{n\sum xiyi - \sum xi \sum yi}{\sqrt{\left[n\sum x^2_i - \left(\sum x_i\right)^2\right] \times \left[n\sum y^2_i - \left(\sum y_i\right)^2\right]}}$$

$$r(x, z) = \frac{\sum xiyi - n\overline{xz}}{(n-1)_{SxSz}} = \frac{n\sum xiyi - \sum xi \sum yi}{\sqrt{\left[n\sum x^2_i - \left(\sum x_i\right)^2\right] \times \left[n\sum z^2_i - \left(\sum z_i\right)^2\right]}}$$

Table 11.a Shows the cord lengths projected areas in (x; y), (x; z) of the kinetic trajectory of the particle on the Tribodynamic surface (step 1-8).

TABLE 11.a

| | Method of Integration Length and Area Step 1 | | | |
|---|---|---|---|---|
| | AREA VECTOR [mm²]<br>(X; Y) | INTEGRAL [mm]<br>S = (X; Y) | AREA VECTOR [mm²]<br>(X; Z) | INTEGRAL [mm]<br>S = (X; Z) |
| 1b | 3,255.7514 | 750.1132 | 4,612.0825 | 777.8612 |
| 2b | 3,647.1539 | 753.7503 | 3,141.9457 | 770.6590 |
| 3b | 3,929.7349 | 757.7294 | 1,970.8129 | 762.3896 |
| 4b | 4,143.3329 | 762.5109 | 1,091.4048 | 754.5583 |
| 5b | 4,280.8444 | 768.4165 | 461.1873 | 746.4506 |
| 6b | 4,357.0546 | 776.1146 | 208.5487 | 736.6380 |
| | Method of Integration Length and Area Step 2 | | | |
| | AREA VECTOR [mm²]<br>(X; Y) | INTEGRAL [mm]<br>S = (X; Y) | AREA VECTOR [mm²]<br>(X; Z) | INTEGRAL [mm]<br>S = (X; Z) |
| 1b | 5,236.9273 | 773.3222 | 297.0623 | 736.5484 |
| 2b | 4,831.2709 | 765.3479 | 1,527.5871 | 742.3449 |
| 3b | 4,594.6573 | 759.8000 | 2,871.1972 | 751.6569 |
| 4b | 4,300.7170 | 755.2604 | 4,669.2266 | 767.0885 |
| 5b | 3,950.7569 | 751.4301 | 7,393.0888 | 782.7331 |
| 6b | 4,208.3688 | 748.7228 | 8,231.1345 | 804.6541 |
| | Method of Integration Length and Area Step 3 | | | |
| | AREA VECTOR [mm²]<br>(X; Y) | INTEGRAL [mm]<br>S = (X; Y) | AREA VECTOR [mm²]<br>(X; Z) | INTEGRAL [mm]<br>S = (X; Z) |
| 1b | 6,181.5044 | 770.7180 | 228.9373 | 736.4312 |
| 2b | 5,437.4486 | 762.3796 | 1,760.9770 | 737.0839 |
| 3b | 5,098.4943 | 757.3146 | 2,954.5639 | 750.4691 |
| 4b | 4,720.3296 | 753.0158 | 4,452.7923 | 764.9591 |
| 5b | 4,301.1545 | 749.3744 | 6,470.9850 | 782.9180 |
| 6b | 5,216.6157 | 747.5796 | 8,342.5073 | 807.5608 |
| | Method of Integration Length and Area Step 4 | | | |
| | AREA VECTOR [mm²]<br>(X; Y) | INTEGRAL [mm]<br>S = (X; Y) | AREA VECTOR [mm²]<br>(X; Z) | INTEGRAL [mm]<br>S = (X; Z) |
| 1b | 12,953.1607 | 751.2416 | 256.3615 | 736.4976 |
| 2b | 6,826.6545 | 746.4309 | 186.0035 | 736.8178 |
| 3b | 7,704.2883 | 744.3932 | 122.6171 | 736.5760 |
| 4b | 9,027.8064 | 744.1620 | 1,405.0341 | 742.4409 |
| 5b | 10,048.4906 | 747.4080 | 636.8978 | 739.2625 |
| 6b | 13,027.6925 | 758.5421 | 77.4072 | 736.9200 |

TABLE 11.a-continued

| Method of Integration Length and Area Step 5 | | | |
|---|---|---|---|
| AREA VECTOR [mm²] (X; Y) | INTEGRAL [mm] S = (X; Y) | AREA VECTOR [mm²] (X; Z) | INTEGRAL [mm] S = (X; Z) |
| 1b 15,361.0570 | 753.8757 | 6,268.7798 | 739.5009 |
| 2b 11,679.7493 | 741.9899 | 5,889.9737 | 738.8737 |
| 3b 9,166.4620 | 742.8233 | 5,410.9254 | 738.9674 |
| 4b 7,935.4816 | 744.7721 | 4,825.9142 | 738.8181 |
| 5b 7,148.5551 | 748.0875 | 4,288.3084 | 738.8428 |
| 6b 15,917.4352 | 756.2741 | 2,819.6998 | 737.1888 |

| Method of Integration Length and Area Step 6 | | | |
|---|---|---|---|
| AREA VECTOR [mm²] (X; Y) | INTEGRAL [mm] S = (X; Y) | AREA VECTOR [mm²] (X; Z) | INTEGRAL [mm] S = (X; Z) |
| 1b 17,406.2082 | 759.2932 | 1,503.8786 | 736.7865 |
| 2b 7,312.0210 | 749.2595 | 3,289.5533 | 738.3784 |
| 3b 8,050.5642 | 745.2538 | 4,208.5831 | 738.3147 |
| 4b 9,205.8902 | 742.5884 | 4,473.7853 | 737.5232 |
| 5b 12,321.6341 | 740.9625 | 5,529.9515 | 738.1719 |
| 6b 16,392.9594 | 752.7756 | 5,457.6495 | 738.4467 |

| Method of Integration Length and Area Step 7 | | | |
|---|---|---|---|
| AREA VECTOR [mm²] (X; Y) | INTEGRAL [mm] S = (X; Y) | AREA VECTOR [mm²] (X; Z) | INTEGRAL [mm] S = (X; Z) |
| 1b 18,871.6601 | 762.4960 | 3,045.9706 | 760.7860 |
| 2b 7,459.1260 | 750.6603 | 3,502.2605 | 765.5670 |
| 3b 8,197.6212 | 746.2995 | 3,709.4685 | 764.6057 |
| 4b 9,951.9644 | 743.1594 | 3,593.2663 | 760.4252 |
| 5b 13,672.0758 | 741.5232 | 4,289.3253 | 764.2065 |
| 6b 17,869.0684 | 752.9006 | 3,877.5688 | 763.0310 |

| Method of Integration Length and Area Step 8 | | | |
|---|---|---|---|
| AREA VECTOR [mm²] (X; Y) | INTEGRAL [mm] S = (X; Y) | AREA VECTOR [mm²] (X; Z) | INTEGRAL [mm] S = (X; Z) |
| 1b 20,373.2699 | 766.5493 | 5,299.5714 | 767.5610 |
| 2b 7,616.1950 | 752.4939 | 5,568.8027 | 762.0782 |
| 3b 8,380.9523 | 747.5913 | 5,698.6437 | 759.5126 |
| 4b 11,151.8660 | 744.5491 | 5,400.1615 | 757.3822 |
| 5b 14,688.7201 | 743.5291 | 5,803.9743 | 755.7851 |
| 6b 18,430.6671 | 754.0897 | 7,552.9962 | 783.1896 |

In summary, the present approach is more efficient with the dynamic components of the environment and the system itself, these values tell us that at 33.33 m/s, the surface is 79.38% (in the section sample) faster than a normal surface, the Tribodynamic cell is able to capture the upper air volume, retain it and produce an inward flow with a vortex opposite to the advance of the upper air flow, this makes the upper flow practically have no contact with the surface and instead of working together air/aluminum, it makes the system itself work in an air/air arrangement.

Table 12 show the Truncation Error (Theorem Taylor): It can be seen that the vectors produced by the advance of the particle tend to order the trajectory, after beginning the separation of the upper and lower flow, previously a dispersion of the upper particles is observed, which tend to be channeled by the structure of the design, the physical magnitude (Table 12) causes that under a kinematic criterion, not including the tribo-electric variables, increase the precision of the method in this case in 26.13% including all the variables indicated in the principle of operation.

Once the values were obtained via experimental logic, the problem and its properties were identified, the problem was reproduced, the critical variables of the system were isolated, these variables were analyzed, the variable was brought to the limit of its capacity (stress strain analysis and top speed) and the result is a structurally-speaking and high-resistance cell, aerodynamically speaking more efficient than a normal surface and reducing the feed force by more than 75.00% (in the case of FIG. 10), the approach to the "effect" and we have the answers to "how" and "why" of the problem.

With the tensile, compression and buckling analysis, we obtain the resistance of the tribodynamic cell, linked to other cells and forming a panel, which improves the mechanical condition of the surface itself by 97.8%, with the same wall thickness.

Loss of friction and contact with the active face of the cell: The Tribodynamic sections in FIG. 11 to FIG. 16 show the effect of degradation of the inertial wind flow over the non-inertial inner volume of the cell upon contact with the upper faces of the hexagonal pyramid. This flow varies as the system advances, which tells us that the surface advances, with an associated velocity and the air flow passes in the opposite direction over the surface with another speed, gradually as the surface advances, the angle of attack of the wind flow varies from 8° (angle of attack in height of the z-axis with a yaw angle of 1° in this case), to cover the surface with an angle of 61°, these angles cover a specific area in the upper face of the cell, which in the case of 8° covers 4.85% of the total area (FIG. 11, cycle 1 to 2), this percentage is associated with friction, so that it produces flows with frictional losses of speed, this phenomenon occurs at the entrance of the cell, this implies that the inflow to the active contact area will always have a decrease in relation to the total input pressure at system generates 1, as the cell progresses and there is wind flow, the area of contact will gradually decrease, i.e. inversely proportional to the advance of the cell to friction loss and to the frontal contact of the wind with active area of the cell.

Figure 14:
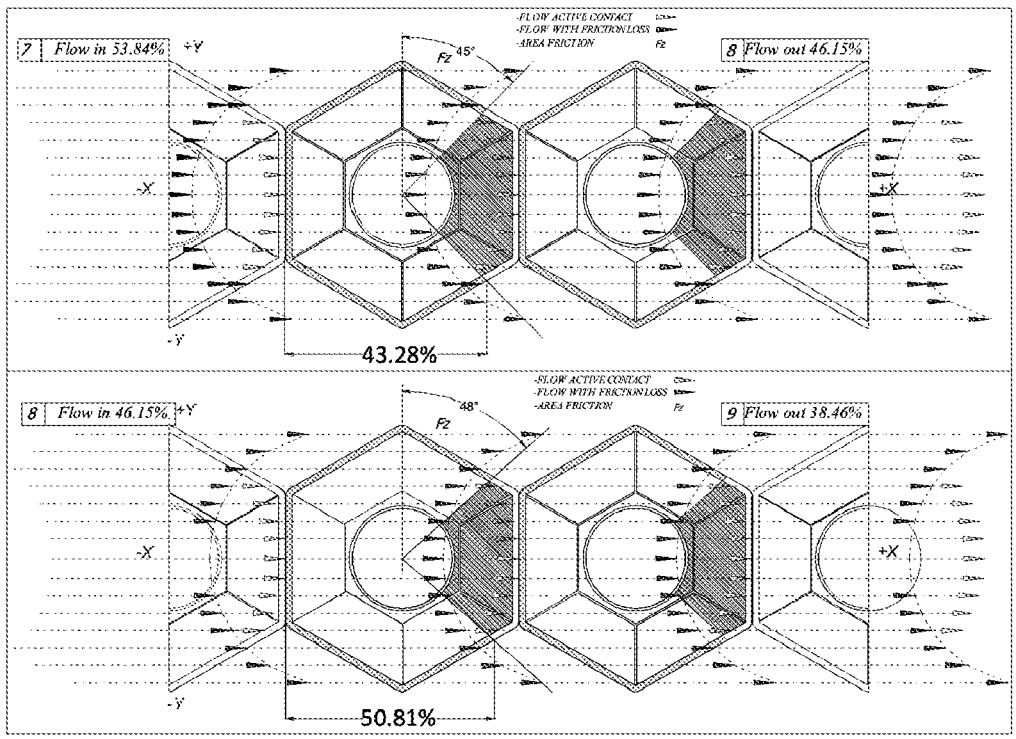
Figure 15:
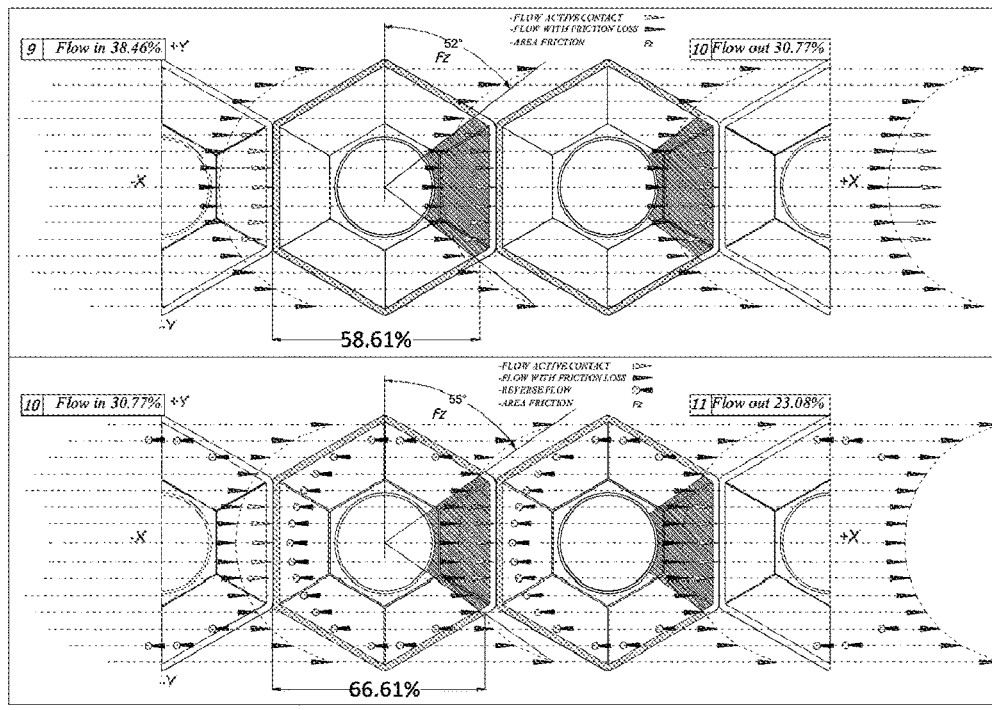

This process of producing in relation to the advance of the flow and not to the advance of the cell, this could have a constant speed and still the wind would decay and reach the cap of retention of the Tribodynamic cell, this cycle is renewed every 4.41 times (demonstration by mathematical model of the system) independent of the speed, (the system was designed to dissipate the harmonic frequency, of the walls of the Semi-trailer), the cycle as seen in FIG. 15, sequence 9 to 10, has a friction area of 58.61% with an attack $\alpha$=52°, the flow which delivers to the output of the system is reduced in 30.77%, at this stage the contact flow in the frontal area is so weak that it begins to decay towards the interior of the cell, as seen in FIG. 14, sequence 10 to 11, the upper friction angle, is in the order of 66.61%, whereby active flow is already stagnant in the system and weakened by the loss a of friction energy 23.08%. Beginning to appear vectors of wind opposite to the advance superior flow, arriving to decay in its totality when the angle of attack $\alpha$=61° that is greater to the inclination of the deflector walls of the cell (60°), the upper area that produces the main friction component of the system is almost 100% this means that the flow of the active area, is in the cell retention zone FIG. 16 sequence 13 to 14, and before this whole phenomenon occurred, the air flow had to go through a series of stages of combinations between mass and velocity of the air flow.

Figure 11:
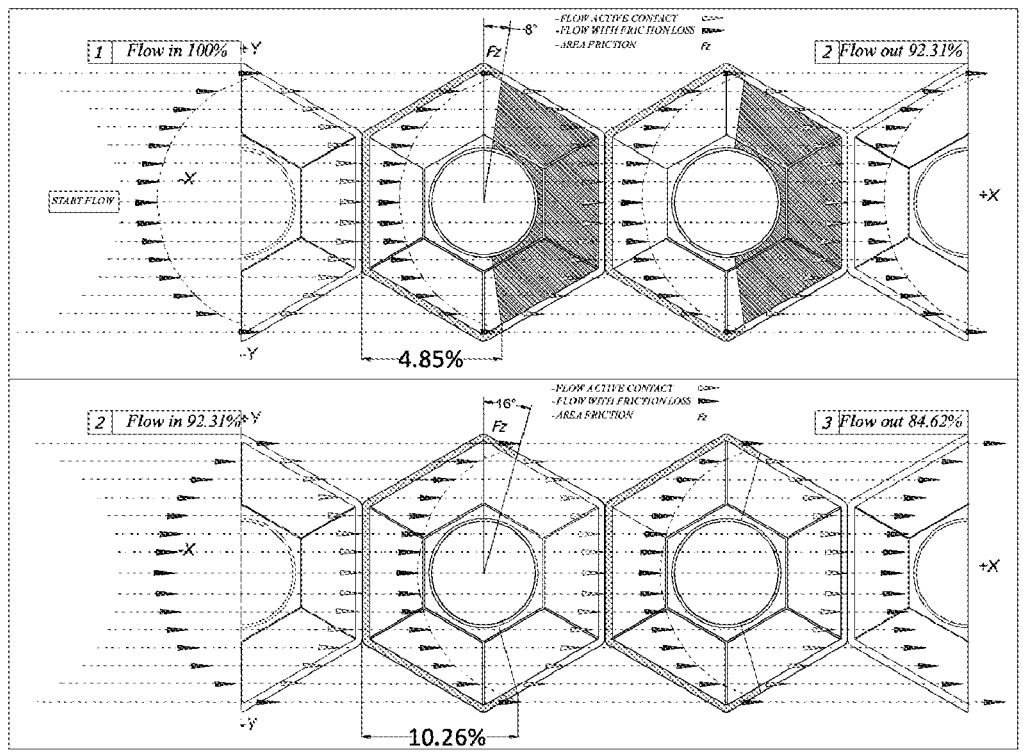
FIGS. 11 to 16 illustrate Reynolds Transitions States Conversion Processes for the tribodynamic surface.

Reynolds Transition States Explanation Processes:

FIG. 11, 1. Flow in 1~flow out 2: System enters the air flow at 100% with an angle of attack of 8°, covering 4.85% of the upper area of the cell, delivering a flow with frictional losses of 92.31%, (the cell advances with a rate "x" of constant speed, and contrary to the wind flow), Reynolds N° $R_{ex}$=123.330,88; 2. Flow in 2~flow out 3: System enters the airflow at 92.31% with an angle of attack of 16°, covering 10.26% of the upper area of the cell, delivering a flow with frictional loss of 84.62%, (the cell advances with a rate "x" of constant speed, and contrary to the flow of wind). Reynolds N° $R_{ex}$=125,058.55.0.

Figure 12:
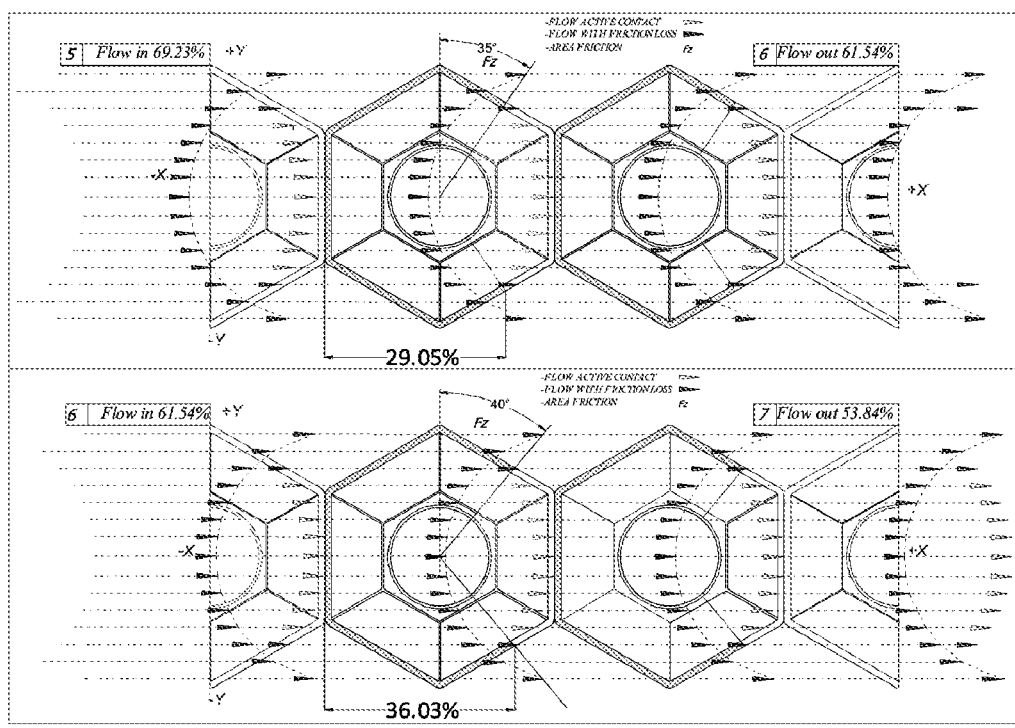

FIG. 12. 3. Flow in 3~flow out 4: System enters the air flow at 84.62% with an angle of attack of 23°, covering 16.11% of the upper area of the cell, delivering a flow with frictional loss of 76.92%, (the cell advances with a rate "x" of constant speed, and contrary to the flow of wind). Reynolds N° $R_{ex}$=129.616,67; 4. Flow in 4~flow out 5: The system enters the air flow at 76.92% with an angle of attack of 29°, covering 22.41% of the upper area of the cell, delivering a friction loss flow of 69.23%, (the cell advances with a rate "x" of constant speed, and contrary to the flow of wind). Reynolds N° $R_{ex}$=101,974.10

Figure 13:
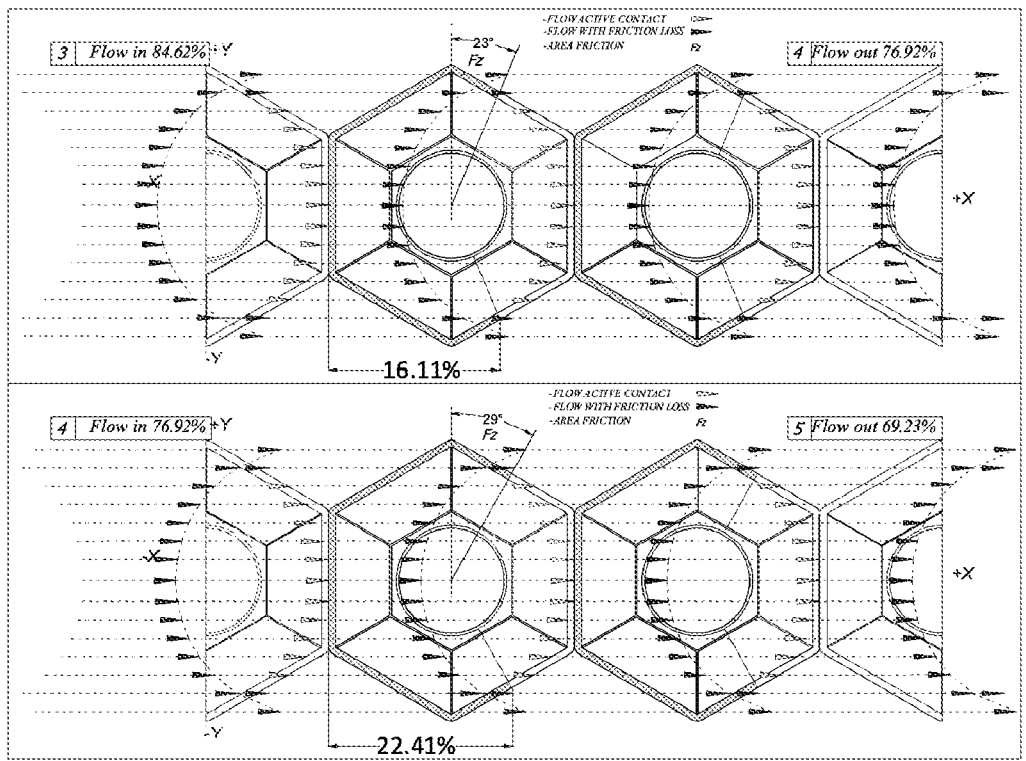

FIG. 13, 5. Flow in 5~flow out 6: System enters the airflow at 69.23% with an angle of attack of 35°, covering 29.05% of the upper area of the cell, delivering a flow with frictional loss of 61.54%, (the cell advances with a rate "x" of constant speed, and contrary to the flow of wind). Reynolds N° $R_{ex}$=93,283.28; 6. Flow in 6~flow out 7: Enter the system airflow at 61.54% with an angle of attack of 40°, covering 36.03% of the upper area of the cell, delivering a flow with frictional loss of 53.84%, (The cell advances with a rate "x" of constant speed, and contrary to the flow of wind). Reynolds N° $R_{ex}$=82,916.44

FIG. 14, 7. Flow in 7~flow out 8: Enter the air flow system at 53.84% with an angle of attack of 45°, covering 43.28% of the upper area of the cell, delivering a flow with frictional loss of 46.15%, (the cell advances with a rate "x" of constant speed, and contrary to the flow of wind). Reynolds N°. $R_{ex}$=85,481.61; 8. Flow in 8~flow out 9: System enters the airflow at 46.15% with an angle of attack of 48°, covering 50.81% of the upper area of the cell, delivering a flow with frictional loss of 38.46%, (the cell advances with a rate "x" of constant speed, and contrary to the flow of wind). Reynolds N° $R_{ex}$=82,220.69.

FIG. 15, 9. Flow in 9~flow out 10: System enters the airflow at 38.46% with an angle of attack of 52°, covering 58.61% of the upper area of the cell, delivering a flow with frictional losses of 30.77%, (the cell advances with a rate "x" of constant speed, and contrary to the flow of wind). Reynolds N° $R_{ex}$=81,017.69; 10. Flow in 10—flow out 11: Air enters the system at 30.77% with an angle of attack of 55°, covering 66.61% of the upper area of the cell, delivering a flow with frictional loss of 23.08%, (the cell advances with a rate x of constant speed, and contrary to the flow of wind). At this point, the upper flow begins to encapsulate the lower flow. Reynolds N°. $R_{ex}$=321,394.67.

Figure 16:
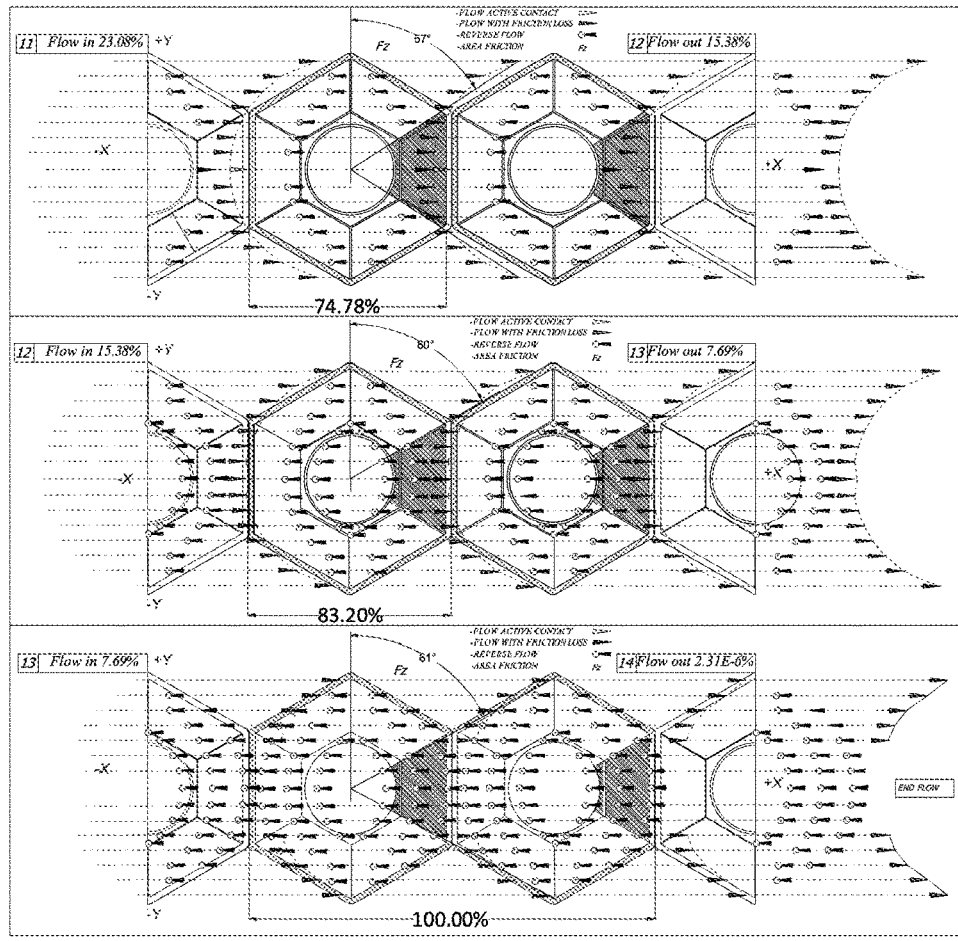
Figure 17:
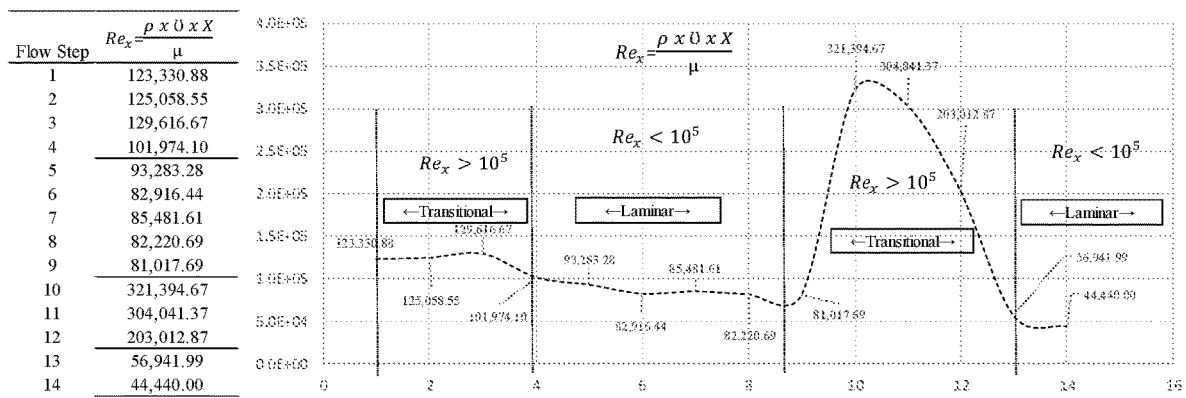
FIG. 17 is a graph of surface transitions states of the air flow for the tribodynamic surface.
Figure 18:
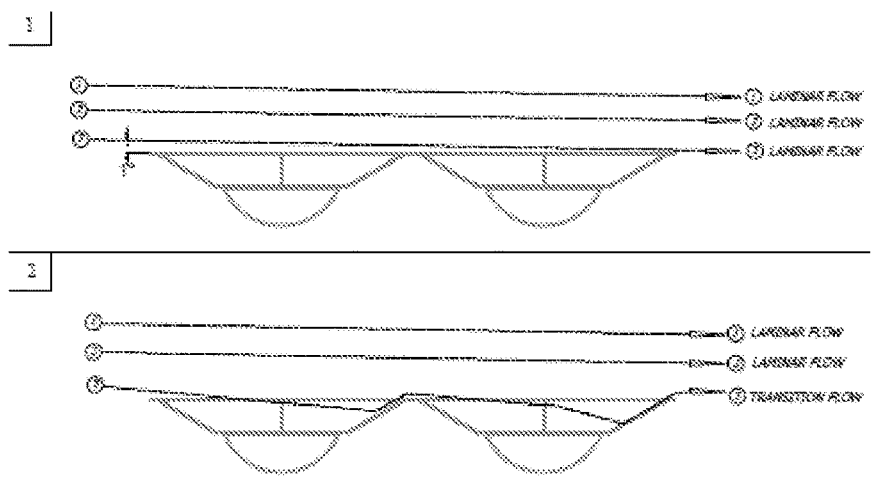
FIGS. 18 to 22 illustrate the behavior of the mass and speed of the air flow to the interior of the tribodynamic cell.
Figure 19:
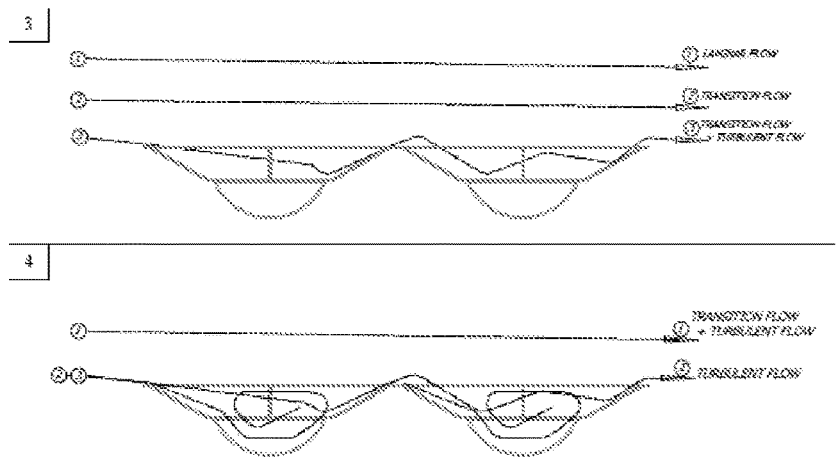
Figure 20:
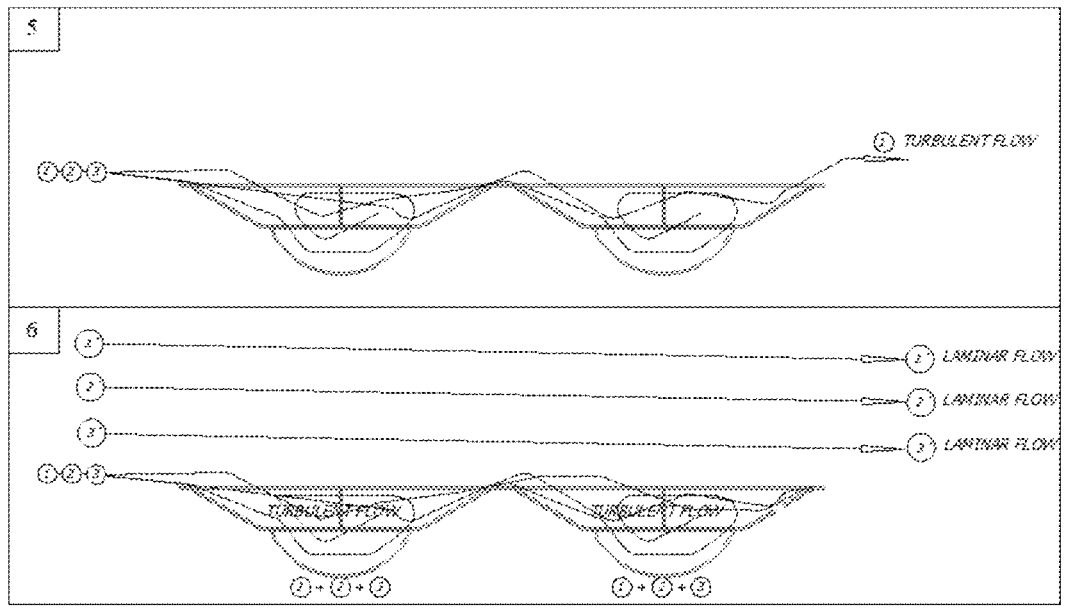
Figure 21:
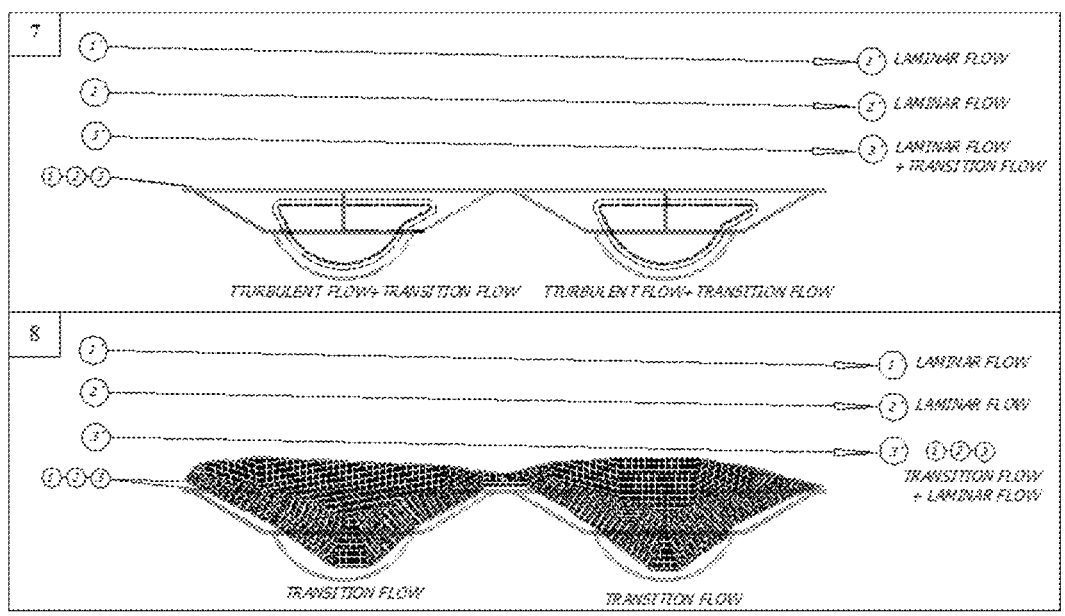
Figure 22:
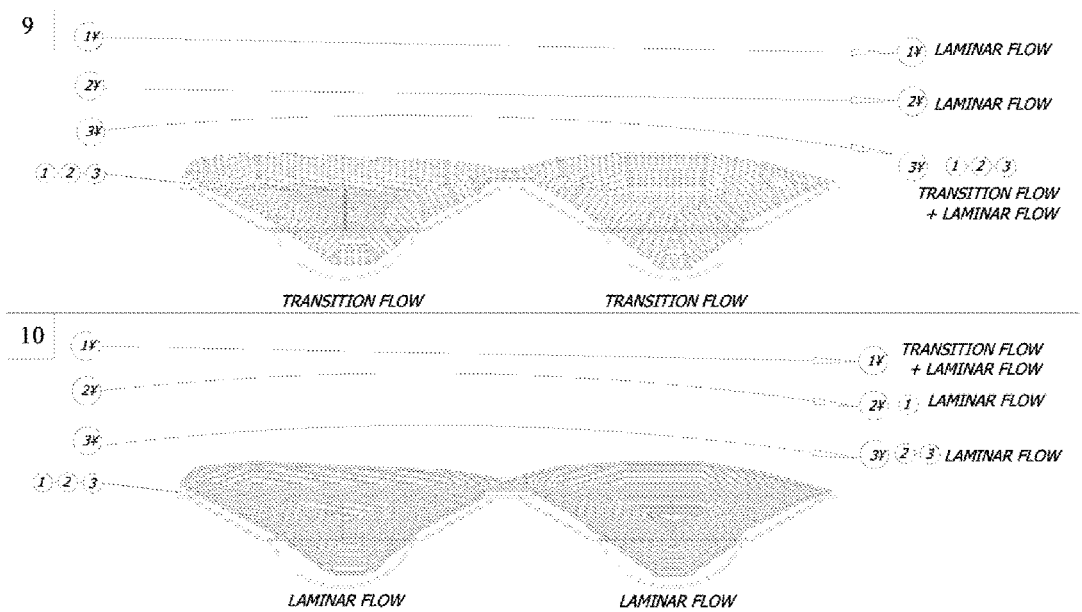

FIG. 16. 11. Flow in 11~flow out 12: System enters the airflow at 23.08% with an angle of attack of 57°, covering 74.78% of the upper area of the cell, delivering a flow with frictional losses of 15.38%, (the cell advances with a rate "x" of constant speed and contrary to the flow of wind). The contact of the frontal area almost disappears and the internal rotation of the turbulent flow begins to take place. Reynolds N° $R_{ex}$=304,041.37; Flow in 12~flow out 13: System enters the airflow at 15.38% with an angle of attack of 60°, covering 83.20% of the upper area of the cell, delivering a flow with frictional loss of 7.69%, (the cell advances with a rate "x" of constant speed, and contrary to the flow of wind). The contact of the frontal area already disappears and the internal rotation begins to take place in turbulent regime to transition. Reynolds N°. $R_{ex}$=203,012.87; 13. Flow in 13~flow out 14: Enter the system airflow at 7.69% with an angle of attack of 61°, covering 100% of the upper area of the cell, delivering a flow with friction losses of 0.00000231%, (the cell advances with a constant speed of 15.53 mph and opposite to the flow of wind). The contact of the frontal area disappeared and the internal rotation begins to take place in transition regime to laminar. Reynolds N°. $R_{ex}$=56,942.0; 14. Final cycle: Two states of laminar regime occur, one corresponding to the flow that passes on the surface of $R_{ex}$=56,942.00 and flow in laminar state to the interior of the cell of $R_{ex}$=44,440.00 however, the flow rates vary depending on the angle of attack, initial contact area and active contact zone. (FIG. 17).

Behavior of the mass and speed of the flow of air to the inside of the cell: Explanation of the principle in FIG. 18 to FIG. 22 by loss of friction, parallel flow had a behavior induced by the same vector configuration of the cell, forcing the flow to circulate in a certain way, in order to change the component of friction and pressure in the walls of the normal Semi-trailer, to air walls that induce the upper flow of air, to work without the constant friction component changing the surface to air/air component, passing through the following states:

FIG. 32. Step 1: Enter the flow system 1~2~3 in laminar regime. Step 2: Flow 3 decays by friction component (wind against cell feed), entering transition mode.

FIG. 33. Step 3: Flow 2 changes from laminar state to transition, by cell-induced change in direction, velocity and vector volume (path copy in vector boundary layer 3), flow 3 changes from transition state to turbulent. Step 4: Flow 1, enters transition state to turbulent (by the same previous principle in step 3), flow 2 enters turbulent state.

FIG. 34. Step 5: Flow 1 enters a turbulent state, but even under a flow regime. Step 6: Flows 1~2 and 3, decay to turbulent state, feel trapped by upper flow 1'~2'~3'.

FIG. 35. Step 7: Flows 1~2 and 3, go from turbulent to transition in the interior circulation by induction of 1'+2'+3'. Step 8: Flow 1~2 and 3, enter at transition rate induced by circulation of upper flows.

FIG. 36 Step 9:Flow 1~2 and 3, begin to dissipate by induction of upper surface, being faster than the upper flow, entering into transition and increasing the pressure on flow 3'. Step 10: Flow 1~2 and 3 enter the internal laminar regime, increasing pressure in 3' and 2', producing renovations every "x" cycle.

Comparative analysis of the present approach: The same operatives are carried out from points 1 to 6, with the incorporation of the Tribodynamic cell, and the same analysis criteria are compared, in order to establish the real drag of the Tractor Trailer set and the validation and reliability of the design of the invention in addition to the consumption parameters in equipment with similar statistical characteristics in the United States, (U.S. Department of Transportation BTS00-05, Washington DC:2000).

In the function of the yaw angle: The Tribodynamic cell decreases aerodynamic drag at different speeds and flow transitions, unlike a Semi-trailer with a smooth surface (Table 1.a), versus a Semi-trailer with Tribodynamic Cell (Table 1.b), it reduces on average the advance aerodynamic drag in 65.3%, considering all the conditions of Yaw angle (Table 13), the fluctuations in the gradients are more stable than a normal surface of aluminum, that is, the influence of the yaw angle (in the graph of fluctuations in FIG. 23), shows greater stability between variations of airflow attacks, this directly affects the useful life of the equipment, and wear of the neural elements of the tire, (tires and bearings) and decreases the effect of deflection, product of the dynamic frequency in the structure ($\omega_n$ y $\omega_d$), between the reaction points of the Semi-trailer (King Pin/axes), therefore fatigue decreases due to the dynamic effects of running on the road, but more importantly, the reduction in the cost of fuel, as a result of stability and the reduction of aerodynamic drag.

A Semi-trailer is always under a damping operation system produced by both the load itself, the weight of the structure itself and the aerodynamic force that interacts with the surface of the equipment, the relative damping coefficient "$\zeta$", is considered in the lateral ends of the Semi-trailer and the upper surface from the front "A", to the final point "B". Understand by this factor "$\zeta$" as the coefficient of the system, which will determine the form of the transitory response to the actions of external influences of the environment. Depending on its value, it can be deduced if the system is unstable, critically stable, sub-damped, critically damped, or over-damped.

For a smooth surface Semi-trailer, its damping coefficient is $\zeta=0.94$, and tends mostly to $\zeta=1$, so its factor depends critically on the variation of the angle of attack of the wind, its field of oscillation is included in three states of temporary response of the system;

Sub damped system fluctuates, 0>1.
Critically damped system=1.
Over damped system≤1, the behavior on a smooth surface is conditioned to three harmonic surface frequencies along its structure (smooth surface); therefore, its limits are established by the critical parameters (equation 2) of an envelope damping (equation 1).

Sub Damped $$y(t) = k \times U_e \times \left[1 - e^{-\zeta\omega_n t}\left(\cos(\omega_d t) + \frac{\zeta}{\sqrt{1-\zeta^2}} \times \sin(\omega_d t)\right)\right], \quad 1)$$

$t \geq 0.$

Critically damped $$y(t) = k \times U_e \times \left(1 - e^{-\frac{t}{\tau}} - \frac{t}{\tau}e^{-\frac{t}{\tau}}\right), t \geq 0. \quad 2)$$

Over damped $$y(t) = k \times U_e \times \left(1 - \frac{\tau_2}{(\tau_2 - \tau_1)} \times e^{-\frac{t}{\tau_2}} + \frac{\tau_1}{(\tau_2 - \tau_1)} \times e^{-\frac{t}{\tau_1}}\right), t \geq 0. \quad 3)$$

The behavior of the tribodynamic surface is different from the smooth surface, and its response is conditioned only to two harmonic movements, and its operating structure tends to the closest temporal response, considering a yaw angle of 1° this response is converted to state critically stable, therefore, its sub-buffered response is defined by the lower limit in critical response tending to zero:

Sub Damped $$y(t) = k \times U_e \times \left[1 - e^{-\zeta\omega_n t}\left(\cos(\omega_d t) + \frac{\zeta}{\sqrt{1-\zeta^2}} \times \sin(\omega_d t)\right)\right], \quad 1)$$

$t \geq 0.$

Critically Stable $y(t)=kxU_e x(1-\cos(\omega_n t)), t \geq 0$      2)

k=static system gain
y(t)=output of the Semi-trailer system in standard transfer rate
$U_e$=Temporary response to system input before acceleration and deceleration transitions.
$\omega_n$=natural sinusoidal frequency without considering the damping of the system in radians per second
$\omega_d$=natural damped frequency dependent on $\omega\_n$
$\tau$=Time constant associated with the closest support King Pin/axes in the Semi-trailer $\tau_2 > \tau_1$.

In both cases the temporal response of the trailer systems depends directly on the speed of the set, change of wind inclination, change of position of the system, and changes of speed in the wind, (yaw oblique calculated as independent variable and applied in conditions of roughness and viscosity), undoubtedly the superficial harmonic as it was calculated in tribo-electric functions, has direct effect on the increase of the advance force by aerodynamics, and in turn on the index in the physical mechanical behavior of the road transport equipment.

As a function of speed: In conditions of speed, standard of roads and considering a minimum yaw 1° between the air and the Tractor-Trailer set, the average drag is of 55.87%, with an increase in the reduction of 2.48%, at standard speeds of city and highway of 22.37 MPH, 44.74 MPH, and 87.00MPH. This difference is attributed to the frontal direct contact of the air and incremental with the Tractor-Trailer, therefore, at lower wind angle greater resistance to the advance, however the increase in stability at high speed is 27.52% product of the deflection of the wind towards a point of channeling and orientation of the unitary cell structure (FIG. 1.0 (Faces 1,2,3), working together (FIG. 4.0) on the walls of the trailer (FIG. 6), If the Tractor-Trailer system was integrated in tribodynamic cell structure, this effect would be inverse, greater speed greater drag reduction, as shown in Table 13. Comparison of Table 2 a.~Table 2 b.

Table 13. Show the comparison of methods and surfaces table 1 a.~table 1 b.: In conditions with an angle of attack of the wind equal to 1°, the Truck Tractor, represents almost 50% of the total of the forward force, the remaining corresponds to the aerodynamic drag produced by the trailer, if and only if, the yaw of the angle is equal to or less than 1°, under this analogy in the reduction of the aerodynamic strength of the trailer, in the first variable of Table 13. It tells us that the reduction of the drag is 58.39%, on the surface of the trailer, but the global system this drag corresponds to 29.2% reduction and 20.82% is distributed between; geometry of the Semi-trailer, suspension set, lower structure trailer (underbody), therefore, the Tractor-Trailer variable, is not constant in the distribution of the system's global drag, nor is the remaining 20.82%. By Lagrange interpolation, in the last drag with inertial reference system equal 5°, the drag reduction is 71.54%, in the global system this percentage is part of the 65.49% of the trailer set, so both represents 46.85% of the drag of the system, and the remaining 18.64% corresponds to the geometry of the trailer, suspension set, lower trailer structure, and 34.51% is the drag of the Truck Tractor, then; (34.52+46.86+18.63)=100% of the global system, you cannot assume 50.00% of the drag of the trailer in all conditions of operation of the whole, that is why the physical magnitude included in the previous cases of analysis, it clears the uncertainty before the proportionality of the global system, in this stage of analysis the numerical uncertainty is high.

Figure 23:
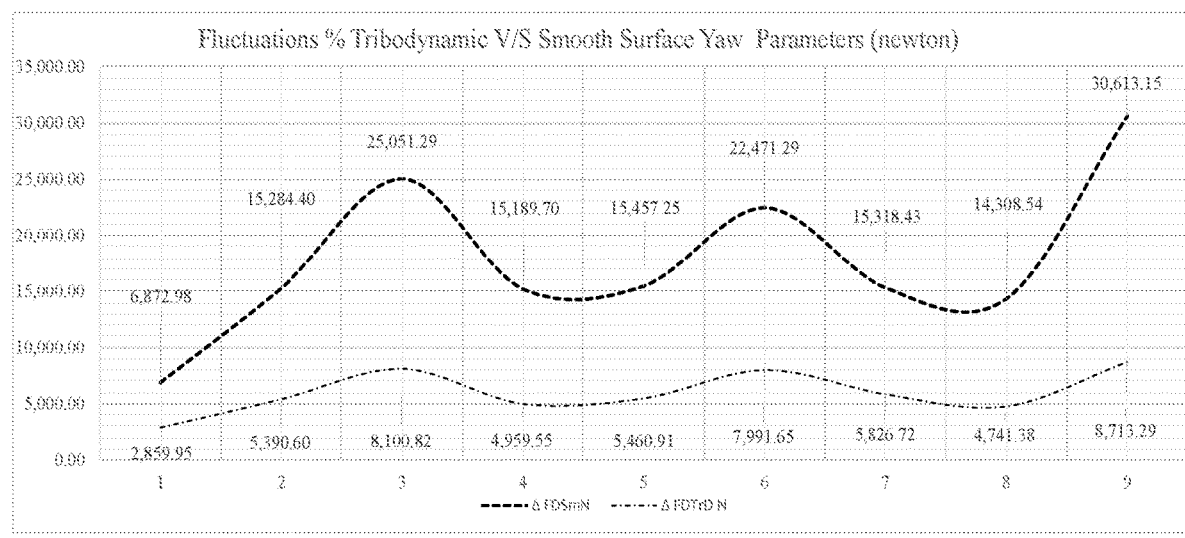
FIG. 23 is a graph of the yaw angle tunnel 3D truck tractor+semi-trailer dry van and reefer 53 foot tribodynamic surface versus smooth surface Table 1a. and 1b.

In FIG. 23, the incidence between the different angle variables of the global system is plotted, it is seen that the variations in the tribodynamic surface are softer than the normal smooth surfaces, this behavior between the change of states is due to the channeling effect and deflector of the cell, the greatest dispersion of drag behavior occurs when the wind is producing resistance in a three-dimensional system, meaning that the maximum increase of the drag is due to the greater exposure of the surface of the Semi-trailer TABLE 1.b Drag analysis in the Tractor-Trailer System with Tribodynamic Surface 3D tunnel method
FLUCTUATIONS TRIBODYNAMIC

| Directional Variations | Drag Coeff | $FD_{Tr-D}$ N | $\overline{X}$ Drag | $\delta$ Cd | $\Delta\ FD_{Tr-D}$ N | Stability % |
|---|---|---|---|---|---|---|
| ($\alpha$; $\beta$; $\gamma$) X = 270; Y = 270; Z = 180 Speed. 33.33 m/s~74.56 mph. Var.1° | 0.50 0.48 | 2,956.57 2,846.39 | 0.48 | 0.49 | 2,859.95 | 96.27 |
| ($\alpha$; $\beta$; $\gamma$) X = 35; Y = 268; Z = 305 | 0.62 0.60 | 5,484.83 5,330.99 | 0.61 | 0.61 | 5,390.60 | 97.20 |
| ($\alpha$; $\beta$; $\gamma$) X = 50; Y = 265; Z = 320 | 0.70 0.66 | 8,232.42 7,773.66 | 0.68 | 0.69 | 8,100.82 | 94.43 |
| ($\alpha$; $\beta$; $\gamma$) X = 50; Y = 268; Z = 320 | 0.58 0.53 | 5,235.27 4,761.71 | 0.54 | 0.55 | 4,959.55 | 90.95 |
| ($\alpha$; $\beta$; $\gamma$) X = 50; Y = 269; Z = 320 | 0.70 0.67 | 5,648.21 5,408.11 | 0.68 | 0.68 | 5,460.91 | 95.75 |
| ($\alpha$; $\beta$; $\gamma$) X = 70; Y = 265; Z = 340 | 0.70 0.67 | 8,272.81 7,854.64 | 0.69 | 0.68 | 7,991.65 | 94.95 |
| ($\alpha$; $\beta$; $\gamma$) X = 270; Y = 269; Z = 340 | 0.76 0.71 | 6,030.09 5,671.00 | 0.73 | 0.73 | 5,826.72 | 94.05 |
| ($\alpha$; $\beta$; $\gamma$) X = 60; Y = 269; Z = 330 | 0.58 0.59 | 4,784.28 4,669.91 | 0.58 | 0.59 | 4,741.38 | 97.61 |
| ($\alpha$; $\beta$; $\gamma$) X = 60; Y = 255; Z = 330 | 0.56 0.54 | 9,091.58 8,562.58 | 0.55 | 0.55 | 8,713.29 | 94.18 |

TABLE 13

Comparison Table 1.a. and 1.b. 3d tunnel method Tribodynamic versus Smooth Surface yaw angle, Tractor-Trailer
TRIBODYNAMIC VERSUS % SMOOTH SURFACE ALL PARAMETERS

| Directional Variations | Drag Coeff | $FD_{Sm}$ V/S $FD_{Tr-D}$ | $\overline{X}$ Drag | $\delta$ Cd | $\Delta\ FD_{Tr-D}$ V/S $FD_{Sm}$ |
|---|---|---|---|---|---|
| ($\alpha$; $\beta$; $\gamma$) X = 270; Y = 270; Z = 180 Speed.33.33 m/s~74.56 mph. Var 1° | −47.37 −47.83 | −58.15 −58.38 | −60.00 | −58.82 | −58.39 |
| ($\alpha$; $\beta$; $\gamma$) X = 35; Y = 268; Z = 305 | −65.93 −65.52 | −64.81 −64.36 | −65.73 | −65.73 | −64.73 |
| ($\alpha$; $\beta$; $\gamma$) X = 50; Y = 265; Z = 320 | −68.47 −69.16 | −68.02 −68.57 | −68.81 | −68.06 | −67.66 |
| ($\alpha$; $\beta$; $\gamma$) X = 50; Y = 268; Z = 320 | −68.48 −67.48 | −67.38 −66.68 | −68.97 | −68.39 | −67.35 |
| ($\alpha$; $\beta$; $\gamma$) X = 50; Y = 269; Z = 320 | −65.69 −65.64 | −64.56 −64.50 | −66.00 | −65.66 | −64.67 |

TABLE 13-continued

Comparison Table 1.a. and 1.b. 3d tunnel method Tribodynamic versus Smooth Surface yaw angle, Tractor-Trailer
TRIBODYNAMIC VERSUS % SMOOTH SURFACE ALL PARAMETERS

| Directional Variations | Drag Coeff $FD_{Sm}$ V/S $FD_{T-D}$ | | $\overline{X}$ Drag | $\delta$ Cd | $\Delta$ $FD_{T-D}$ V/S $FD_{Sm}$ |
|---|---|---|---|---|---|
| ($\alpha$; $\beta$; $\gamma$) X = 70; Y = 265; Z = 340 | −64.65<br>−64.74 | −64.00<br>−64.41 | −64.43 | −64.95 | −64.44 |
| ($\alpha$; $\beta$; $\gamma$) X = 270; Y = 269; Z = 340 | −61.81<br>−62.83 | −61.21<br>−61.98 | −62.56 | −62.76 | −61.96 |
| ($\alpha$; $\beta$; $\gamma$) X = 60; Y = 269; Z = 330 | −68.98<br>−67.40 | −67.28<br>−66.92 | −68.48 | −67.76 | −66.86 |
| ($\alpha$; $\beta$; $\gamma$) X = 60; Y = 255; Z = 330 | −63.16<br>−62.24 | −70.86<br>−70.68 | −62.59 | −63.33 | −71.54 |

Table 14. Shows the comparison of methods and surfaces table 2 a.~table 2 b: Depending on the speed increase at an angle of 1°, the aerodynamic drag behaves inversely proportional to the acceleration variations of the system. This increase will occur when the angle of attack of the wind is between 0 and 1°, the reduction of drag in condition of city is 57.02% in the trailer, and taken to the global system, it is equivalent to 28.51% reduction in the set, and the remaining 21.49% corresponds to the geometry of the trailer, suspension set, and the lower structure of the trailer (28.51+ 21.49=50%), 50% of the overall system corresponds to the Truck Tractor, (FIGS. 25A and 25B). In high speed road conditions this drag changes in the global system, passing 47.52% of the Truck Tractor, 35.95% of the trailer and the remaining 16.53%, corresponds to the trailer geometry, (47.52+35, 95+16.53=100%)). In FIG. 24, the graph shows the effect of the reduction of the drag at different speeds in a 3D simulation, note the variation of aerodynamic resistance, by increasing the speed of advance, this phenomenon is related to the contact at a higher speed of the Truck Tractor and the interaction between flow and the visible percentage of the trailer.

TABLE 2.b

Top speed Tribodynamic cell Tractor-Trailer (dry van 53 foot)
FLUCTUATIONS TRIBODYNAMIC

| Directional Variations | Drag Coeff | $FD_{T-D}$ N | $\overline{X}$ Drag | $\delta$ Cd | $\Delta$ $FD_{T-D}$ N | Stability % |
|---|---|---|---|---|---|---|
| ($\alpha$; $\beta$; $\gamma$), X = 270°; Y = 270°; Z = 180°, Speed = 10.00 m/s.~22.37 MPH~36 Km/hr) Var. 1° | 0.56<br>0.54 | 359.69<br>351.05 | 0.55 | 0.55 | 354.26 | 97.60 |
| ($\alpha$; $\beta$; $\gamma$), X = 270°; Y = 270°; Z = 180°, Speed = 20.00 m/s.~44.74 MPH~72 Km/hr) Var. 1° | 0.57<br>0.53 | 1,469.05<br>1,375.04 | 0.55 | 0.56 | 1,457.04 | 93.60 |
| ($\alpha$; $\beta$; $\gamma$), X = 270°; Y = 270°; Z = 180°, Speed = 38.89 m/s.~87.00 mph.~140 Km/hr) Var. 1° | 0.59<br>0.57 | 5,780.29<br>5,513.26 | 0.58 | 0.58 | 5,696.43 | 95.38 |

TABLE 14

Comparison Table 2.a. and 2.b. Top speed Tribodynamic versus smooth surface Tractor-Trailer (dry van 53 foot)

| Directional Variations | Drag Coeff $FD_{Sm}$ V/S $FD_{T-D}$ | | $\overline{X}$ Drag | $\delta$ Cd | $\Delta$ $FD_{T-D}$ V/S $FD_{Sm}$ |
|---|---|---|---|---|---|
| ($\alpha$; $\beta$; $\gamma$), X = 270°; Y = 270°; Z = 180°, Speed = 10.00 m/s.~22.37 MPH~36 Km/hr) Var. 1° | −57.58<br>−57.81 | −57.56<br>−57.30 | −57.69 | −57.36 | −57.02 |
| ($\alpha$; $\beta$; $\gamma$), X = 270°; Y = 270°; Z = 180°, Speed = 20.00 m/s.~44.74 MPH ~72 Km/hr) Var. 1° | −56.15<br>−58.59 | −55.99<br>−57.92 | −57.36 | −56.59 | −56.04 |
| ($\alpha$; $\beta$; $\gamma$), X = 270°; Y = 270°; Z = 180°, Speed = 38.89 m/s. ~87.00 mph.~140 Km/hr) Var. 1° | −54.62<br>−55.12 | −53.97<br>−55.10 | −55.04 | −55.38 | −54.54 |

Table 4.b. Shows the Comparison of smooth surface methods TABLE 4.a. Versus Tribodynamic surface, with aerodynamic equation+yaw angle method, in Tractor-Trailer system: With the standard aerodynamic equation, in both cases (Tractor-Trailer, with smooth surface and tribodynamic surface), the results of the measurement are not similar to the values obtained in the 3D tunnel method, with the same scheme variables N°.1=1°, like the 3D method, the difference between the equation and the program method is 19.13%, if we only use the standard aerodynamic equation, and without decomposing the yaw angle in the total areas and length, we would limit the conclusions to the mathematical environment of this equation, in this case the uncertainty is high. Paradoxically it is not the same to change the direction of the body, to change the direction of the wind, and to assume that the wind in conditions of different angle of attack, behaves linearly on the effective area considered in the aerodynamic equation, for example; if we consider a wind vector in cross wind acting on an inclined plane of 13°, it is not the same to tilt the vector 13° and apply it on a plane, this action produces a differential between relativities of 3.50257%, (by vector decomposition of the legs), and produces a rate of change in its length of 0.858977% and 0.504799% in the frontal (projected on ordinate and abscissa).

In scheme N° 7, the kinematic drag by 3D tunnel is=15,318.5 Newton, the drag as a function of the projected yaw angle is=14,289.5 Newton, however the results obtained from the aerodynamic equation in the same item and configuration, before the addition of the oblique yaw, is 12,820.4 Newton, the biggest difference in the measurement, occurs in the standard numerical method and the 3D method being equal to 16.4%, and the difference between the equation with yaw ($\Psi_W$) versus 3D model is 6.71%. In all cases (with the invention), the greater the exposure of the surface of the trailer, the greater the reduction in aerodynamic drag, in schemes 10, 11, 12, they are analysis in extreme conditions of yaw angle, the reduction of drag in these cases exceed 60%. By previous analyzes, the exposure of the tribodynamic surface, to greater projections of angles, produces a protective vortex with greater speed.

The variability of the area and the advance coefficient, $$\left( C_D = \frac{2 \times F_d}{\rho \times \mathrm{U}^2 \times (a \times b)} \right)$$

in Table 4b, Are linearly proportional in the present approach, because to the contact points explained in the operating principles in FIG. 11-16, and the state of Reynolds transitions in the sample section, therefore while the yaw increases, the projection of the surface area of the trailer increases (FIG. 25 projection examples). All these changes in aerodynamic drag have a direct impact on fuel consumption, depending on the distance traveled in the elapsed time. In the global system this fuel saving would be expressed in a Tractor-Trailer 53 foot set, traveling at a speed of 120 Km/Hr~33.33 m/s~74,56 MPH, and considering a truck consumption of 2.5 km for each liter ~5.8804 mi/gal., And assuming an annual operation of 120,000.0 km would imply a saving of 13,641.6 liters~3,603.8 gal. Considering an estimated value of diesel between $2.276-$5.00 USD, the estimated savings would be in a range of $8,202.25-$20,000 USD+taxes per year, and would improve the consumption autonomy from 2.5 km/liter, to 3.21 km/liter.

This case is a conservative analysis, given that in reality, the calculation conditions are more fluctuating than a yaw between 0 and 1°, and a Tractor-Trailer system (dry van 53 foot), runs through different stretches with different gradients, different variables of angle of attack, and wind speeds. To appreciate the actual operation of the cell and purpose of the present approach, as the analysis condition worsens, with an angle of attack of the non-inertial system of (4.5°; 2.0° Table 4.a) and an inertial gradient of (1°,0; 1°,0), one of the properties of the Tribodynamic cell is to capture the flow, retain it and produce a surface air mattress, saving Diesel under this condition would be 17,088 liters~4,514.3 gal., and a reduction of the annual cost exceeding $20,000 USD+taxes, and an increase in the autonomy from 2.5 km/liter to 3.39 km/liters (7.98 mi/gal).

Figure 26:
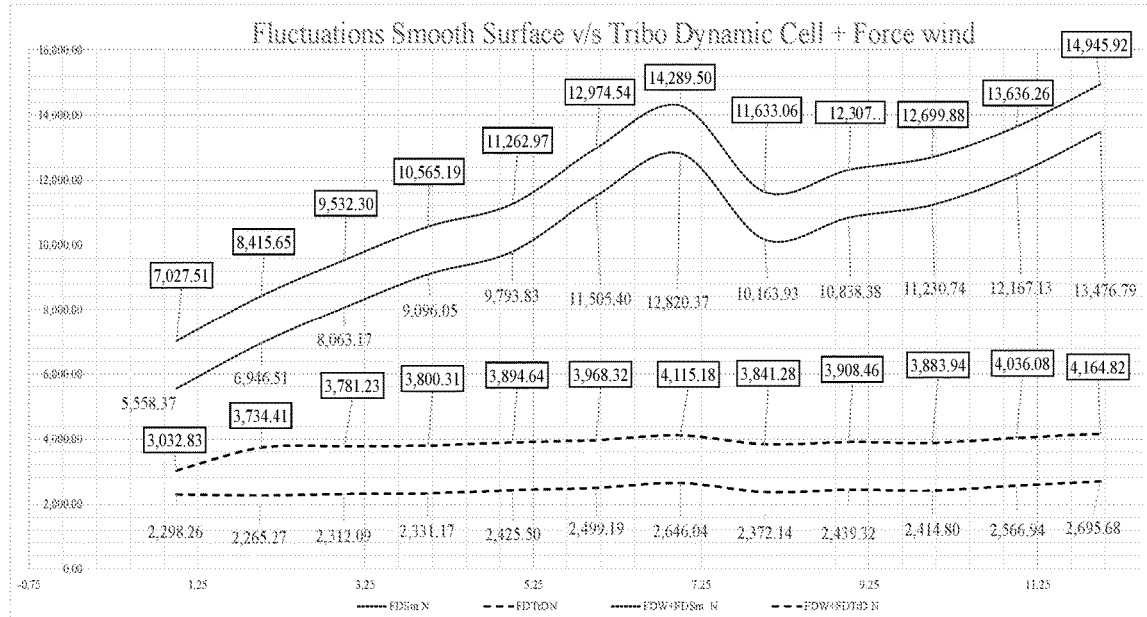
FIG. 26 is a graph comparing smooth surface versus tribodynamic cell before and after component wind force Table 4a. and 4b.

In the graph of FIG. 26, show the normal surface, denotes an exponential degree product of the largest surface projection, this sample is the differential of the mathematical methods of the equation, before and after the addition of $\Psi_W$, its implication lies in obtaining a greater precision of the method, incorporating a larger vector projection of the air flow, as an independent variable or as an inertial system depending on a non-inertial system or global system (Tractor-Trailer), the variations of the forces of advance due to the projection and flow path throughout the stage of the Tractor-Trailer system, in the case of the smooth surface, the difference is 9.83% between the passive method and the $\Psi_W$. And in the case of the Tribodynamic surface, there is a difference between states in 35.2%, this increase shows us that to make the analysis with the passive method, we could not see a great difference in the results, however this variable $\Psi_W$. Includes all the contact area of the Tribodynamic volume, is therefore the biggest difference between states.

TABLE 4.b

Drag in system Truck-Trailer Smooth surface Versus Tribodynamic equation aerodynamic + Cross wind

| Scheme | $A_{TrD}$ [m²] | Cd | $FD_{Sm}$ N | $FD_{TrD}$ N | Reduce Drag % | $FD_W$ + $FD_{Sm}$ N | $FD_W$ + $FD_{TrD}$ N | Reduce Drag % |
|---|---|---|---|---|---|---|---|---|
| 1 | 10.4830 | 0.5900 | 5558.37 | 2298.26 | 58.65 | 7027.51 | 3032.83 | 56.84 |
| 2 | 10.4078 | 0.5857 | 6946.51 | 2265.27 | 67.39 | 8415.65 | 3734.41 | 55.63 |
| 3 | 10.5145 | 0.5918 | 8063.17 | 2312.09 | 71.33 | 9532.30 | 3781.23 | 60.33 |
| 4 | 10.5581 | 0.5942 | 9096.05 | 2331.17 | 74.37 | 10565.19 | 3800.31 | 64.03 |
| 5 | 10.7732 | 0.6059 | 9793.83 | 2425.50 | 75.23 | 11262.97 | 3894.64 | 65.42 |
| 6 | 10.9412 | 0.6147 | 11505.40 | 2499.19 | 78.28 | 12974.54 | 3968.32 | 69.41 |
| 7 | 11.2762 | 0.6315 | 12820.37 | 2646.04 | 79.36 | 14289.50 | 4115.18 | 71.20 |
| 8 | 10.6515 | 0.5993 | 10163.93 | 2372.14 | 76.66 | 11633.06 | 3841.28 | 66.98 |
| 9 | 10.8047 | 0.6076 | 10838.38 | 2439.32 | 77.49 | 12307.51 | 3908.46 | 68.24 |

TABLE 4.b-continued

Drag in system Truck-Trailer Smooth surface Versus Tribodynamic equation aerodynamic + Cross wind

| Scheme | $A_{TrD}$ [m²] | Cd | $FD_{Sm}$ N | $FD_{TrD}$ N | Reduce Drag % | $FD_W +$ $FD_{Sm}$ N | $FD_W +$ $FD_{TrD}$ N | Reduce Drag % |
|---|---|---|---|---|---|---|---|---|
| 10 | 10.7488 | 0.6046 | 11230.74 | 2414.80 | 78.50 | 12699.88 | 3883.94 | 69.42 |
| 11 | 11.0958 | 0.6226 | 12167.13 | 2566.94 | 78.90 | 13636.26 | 4036.08 | 70.40 |
| 12 | 11.3894 | 0.6370 | 13476.79 | 2695.68 | 80.00 | 14945.92 | 4164.82 | 72.13 |

Figure 27:
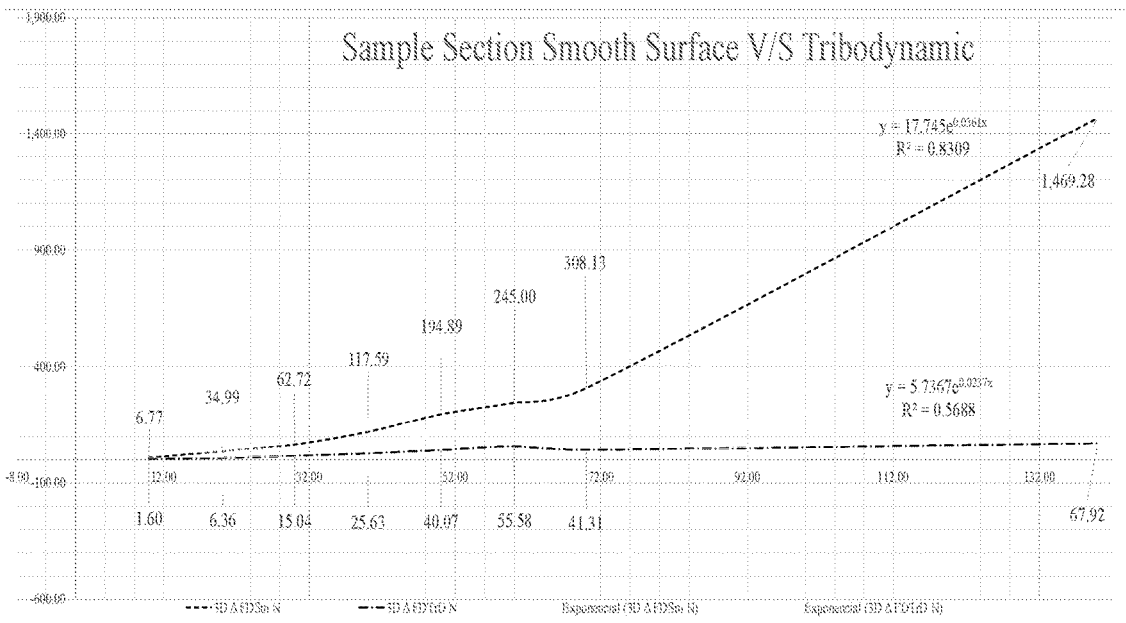
FIG. 27 is a graph of a sample section smooth surface versus tribodynamic cell Table 5a. and 5b.

The graph of FIG. 27, it represents the exponential growth rate before the changes of speed, in a top speed, of $$140.0 \frac{m}{s},$$

the sample section with smooth surface, is subjected to a force of 1,469.29 Newton, and the inertial force of the sample section is 38.82 Newton, the body mass is 3.96 kg~8.56 Pound, at this speed, the aerodynamic force is 37.84 times higher than the strength and resistance of the body, therefore, the sample section should be in the process of plastic deformation and for its geometry the section is not resistant to the action of this force (structural design of the section), however in the Tribodynamic sample section, its strength inertial is 41.43 Newton, and its mass is 4.22 kg~9.3 Pound, the force of advance on the surface at a speed of 140.0 m/s, is 67.92 Newton, this means that the body of the surface is still in equilibrium on the Cartesian analysis plane and can support up to 40.0% more s of force of advance, and even then it would not be in a state of elastic or plastic deformation, given the structural integrity that the truncated volumetric design contributes to the resistance of the body, at this stage of the investigation the maximum limit of the surface was unknown.

Table 6b. show the comparison of the numerical method of vector analysis obtained by means of Reynolds Transport Theorem, with the objective of determining the Reynolds number in the states of superficial transitions of the air flow, on the smooth surface (Table 6.a), versus the Tribodynamic implicit in Table 6b. Unlike the smooth surface in table 6.a, where the Reynolds numbers vary according to the speed and the changes of acceleration on the surface produce sudden changes of states in the flow, going from laminar state to 10 m/s, and changing rapidly has been laminar/transition, between 20 m/s and 30 m/s, and between 80 m/s and 90 m/s has been turbulent, after 90 m/s the rate of increase decreases, but does not want to say that the flow is tending to change again to transition/laminar state, if not that the turbulent state is in an irregular non-stationary movement and is in an almost homogeneous state between the lower and upper boundary layer.

Contrary to this behavior, the Tribodynamic cell presents a behavior different from that of a smooth surface, given that its flow states are subdivided into more than two layers, in the case of 10 m/s, in table 6b, there are two state transitions, one laminar superior of $R_e=38,888.89$ and the second also laminar inferior of $R_e=13,333.33$, this takes place by differential dispersion of volume, while the inner volume of the Tribodynamic cell is filled, the air flow is subdivided, in an upper one and another lower one, the lower one while increasing the speed, contains the boundary layer that in its initial state was the lower limit, which was governed by the behavior of the upper layer, these states, both the upper and lower, at 60 m/s, they tend to equal between the upper and lower laminar sheets and it is at this stage that the changes in the state of the flow are more significant, as a result of the gradual containment of the flow, until the lower flow is fully captured and this state of flow becomes laminar to transition but in a system of coupling between harmonic oscillatory movements, between the surface and part of the flow, meanwhile the upper flow is in a laminar state, in the same table 6b., at 140 m/s, the lower state increased by 56.8%, in relation to 60 m/s, meaning that the flow is mostly transitory inside the cell and there is so much encapsulated content that produces very small flow renewals, this is an index that the system is in internal rotation, an effect produced by the hemispherical cap of the cell. All the changes of upper and inner states are plotted in FIG. 30, which is the only representation of the section of the Tribodynamic sample in relation to the Reynolds numbers, (also explained in graphs of FIG. 17 with an average road speed of 33.33 m/s), however both Reynolds numbers are plotted in their upper bound layers in FIG. 28 (extrapolation of table 6a, and table 6b).

The corresponding to the aerodynamic resistance, the Reynolds integration and differentiation method increases the calculation accuracy in relation to the previous analysis. These differences are produced by the addition of more physical variables that are not included in the general equation, these are; density, specific volume, specific weight, accelerations of gravity, kinematic viscosity and air dynamics, temperature and surface roughness, (at atmospheric pressure). There is a greater difference between the reductions in aerodynamic drag between Table 16 (before the addition of more variables) and Table 6b (added variables) (FIG. 45, kinematic versus dynamic), in the case of the first speed analyzed at 10 m/s, the variation before subjecting the surface to friction in $FD_{Sm}$, is 68.43%, at 20 m/s it is 31.56%, and at 40 m/s it is 21.36%, at the same speeds of 10 m/s, 20 m/s, and 40 m/s, the drag force obtained before the mathematical method in Table 6b., were 6.77; 34.99; 117.59 Newton, after the method these values changed to 21.53; 51.13; 149.53 Newton. This is because the Reynolds method as a mathematical system of integration in function of the mentioned properties, can be represented as a flow in a certain border, that is, it can have a spatial distribution and be analyzed by air particle unit, and the flow of air in turn, can be represented as a scalar, vectorial or tensor variable. If an isolated flow portion is taken, two types of forces can be considered acting on that portion: body forces and surface forces, that summed tells us what was the real border work of the portion of air studied in a continuous cycle, evidence of this precision, are the values that represent a greater aerodynamic resistance.

The comparison of aerodynamic resistances between both sample sections is made between the values obtained in methods with the theorem, where the reduction of the drag in Table 6b, $FD_{Sm}$ versus $FD_{TrD}$, in the same previous speeds is 79.22%;76.92%;77.35%, for the physical principles of the design, this percentage will increase as a function of the acceleration and speed increase of the system, reaching an aerodynamic reduction of 91.2%, and in Regarding the design, this is not its limit and the speed was selected based on the deformation limit of the aluminum, given the thickness of the sample section, it would already be showing instability effects by downforce with 212.73 Newton of load, All the effects of aerodynamic drag reduction are reflected in the graph of FIG. 28.

TABLE 6.b

Vectors R3, after friction and roughness loss, (Reynolds Transport Theorem), analytical method in Tribodynamic Cell and reduce drag $$10.0 \left[\frac{m}{s}\right]. \text{ To } 190.0 \left[\frac{m}{s}\right]. \text{ (22.4 mph~4.25.02 mph)}.$$

| Speed Sample Section ʊ [m/s] | Smooth Surface $FD_{Sm}$ N | Tribo Dynamic Cell $FD_{TrD}$ N | Rex transition Transport Theorem TrD (Flow up ↑) | Rex Reynolds (Flow down ↓) | Rate external Reynolds | Rate internal Reynolds | Reduce Drag % |
|---|---|---|---|---|---|---|---|
| 10.0 | 21.53 | 2.55 | 38,888.89 | 13,333.33 | 0.02584 | 0.00297 | −79.22 |
| 20.0 | 51.13 | 7.23 | 77,777.78 | 26,666.67 | 0.05167 | 0.00594 | −76.92 |
| 30.0 | 93.80 | 13.30 | 116,666.67 | 40,000.00 | 0.07751 | 0.00890 | −76.87 |
| 40.0 | 149.53 | 20.50 | 148,899.74 | 51,051.34 | 0.09892 | 0.01136 | −77.35 |
| 50.0 | 218.32 | 28.67 | 93,062.34 | 63,753.15 | 0.06183 | 0.01419 | −77.93 |
| 60.0 | 300.18 | 37.70 | 74,449.87 | 76,430.69 | 0.04946 | 0.01701 | −78.50 |
| 70.0 | 395.11 | 47.52 | 65,143.64 | 89,084.03 | 0.04328 | 0.01983 | −79.03 |
| 80.0 | 503.10 | 58.07 | 59,559.89 | 101,713.23 | 0.03957 | 0.02264 | −79.52 |
| 90.0 | 624.16 | 69.30 | 55,837.40 | 114,318.38 | 0.03710 | 0.02545 | −79.96 |
| 100.0 | 758.29 | 81.18 | 53,178.48 | 126,899.53 | 0.03533 | 0.02825 | −80.35 |
| 110.0 | 905.48 | 93.66 | 51,184.28 | 139,456.75 | 0.03400 | 0.03104 | −85.19 |
| 120.0 | 1,065.73 | 106.73 | 49,633.25 | 151,990.12 | 0.03297 | 0.03383 | −85.52 |
| 130.0 | 1,239.05 | 120.36 | 48,392.41 | 164,499.70 | 0.03215 | 0.03662 | −85.82 |
| 140.0 | 1,425.44 | 134.52 | 47,377.19 | 176,985.56 | 0.03148 | 0.03940 | −86.09 |
| 150.0 | 1,624.89 | 149.19 | 46,531.17 | 189,447.76 | 0.03091 | 0.04217 | −86.35 |
| 160.0 | 1,837.41 | 164.37 | 45,815.30 | 201,886.38 | 0.03044 | 0.04494 | −87.58 |
| 170.0 | 2,063.00 | 180.02 | 45,201.71 | 214,301.47 | 0.03003 | 0.04770 | −87.80 |
| 180.0 | 2,301.65 | 196.15 | 44,669.92 | 226,693.11 | 0.02968 | 0.05046 | −89.01 |
| 181.0 | 2,326.23 | 197.78 | 42,110.71 | 227,737.41 | 0.02798 | 0.05069 | −89.03 |
| 182.0 | 2,350.95 | 199.43 | 39,852.58 | 228,779.74 | 0.02648 | 0.05092 | −89.05 |
| 183.0 | 2,375.79 | 201.07 | 37,845.35 | 229,820.10 | 0.02514 | 0.05116 | −89.07 |
| 184.0 | 2,400.77 | 202.72 | 36,049.41 | 230,858.51 | 0.02395 | 0.05139 | −89.09 |
| 185.0 | 2,425.87 | 204.38 | 34,433.06 | 231,894.96 | 0.02288 | 0.05162 | −89.10 |
| 186.0 | 2,451.11 | 206.04 | 32,970.66 | 232,929.46 | 0.02190 | 0.05185 | −90.12 |
| 187.0 | 2,476.48 | 207.70 | 31,641.19 | 233,962.03 | 0.02102 | 0.05208 | −91.14 |
| 188.0 | 2,501.98 | 209.37 | 30,427.34 | 234,992.66 | 0.02021 | 0.05231 | −91.16 |
| 189.0 | 2,527.60 | 211.05 | 29,314.64 | 236,021.35 | 0.01948 | 0.05254 | −91.18 |
| 190.0 | 2,553.36 | 212.73 | 28,290.95 | 237,048.13 | 0.01880 | 0.05276 | −91.20 |

Table 7b. Shows the vector modular and scalar projections R3, obtained from the analysis of Reynolds theorem (after friction), this vector will act along the entire surface of the trailer (walls), and the field of analysis of this projection, is the area subjected to frontal pressure and suction pressure, the maximum hypotenuse of the trailer is used in its cut of diagonal section, and the flow lines are measured to determine when there is suction in the system, or change of superficial directions of the flow. In Table 7b, the differential $FD_{TrD}$, is the current line whose tangent is at all points parallel to the velocity vector at a given time, in turn the flow where the current lines do not change in time, correspond to a permanent flow, however this line has components (x; y; z), and forms projected trajectory lines of an air particle over the same flow, that is, it defines the position of the particle in the length of the trailer, according to its speed reached at the given moment. The emission lines are all elements of the flow, which at some point passed through a certain point of the three-dimensional vector space of the system, in functions of (f) time, volume change in time and movement of the air flow in the weather.

The behavior of the particle allows us to determine the direction, magnitude and vector direction of the air flow, measured at the different speeds of the dry van 53 foot system, each stage produces a drag that is subdivided into: general force, constituted by frontal and rear force and a general pressure derived from the frontal and rear forces, these variables measure the adhesion and dispersion of the air particle over the surface in time, therefore in turn measures the differential changes of the pressures. This analysis is cyclic, and is the result (as for the mathematics of the system), Table 11a, of string lengths of the integrals S (x; y; z), projected and analyzed in equations of motion. From the surface adhesion of the air particle, until its cycle ends, at a length of 16,154.4 mm (53 feet), at a speed of $$33.33 \frac{m}{s},$$

and depending on the length of the system, these cycles are equivalent to 284.94 cycles/meter, and as a function of time 9,496.97 cycles/second, the total time of the particle's travel is 7 minutes 33 seconds (00:07:33), this time is the one that delays the adhered flow, in equalizing its mass, in the exit of the system, (initial mass=final mass conservation law), from the beginning of the process to the end, the vector presented different pressure variables in the length in which it passed, these pressures are so small that for sample were amplified× 100,000.0 only to visualize their fluctuations, this effect is produced by the cumulus of air adhering superficially, product of the variables related to the viscosity, elasticity of the material, surface harmonic frequency etc., and varies until the retained volume equals the incoming vector force.

Recall that in previous analyzes the drag reduction is applied to the global Tractor-Trailer system, and implies that for the case described in Table 4.b, the analogy is the same, but the difference is that in this case the magnitude physical is greater than the previous cases, under this criterion the drag obtained by a cyclic dynamic analysis at different speeds, are the following: 10.00 m/s, the reduction of aerodynamic resistance applied to the surface of the trailer is 88.15%, and taken to a global system the aerodynamic drag is 44.08% and the difference of 5.92% corresponds to a geometric, underbody and set of rolled Semi-trailer and Tractor-Trailer, assumes the remaining 50% of aerodynamic drag.

$$20.00 \frac{m}{s},$$

aerodynamic crag is 65.85%, in the overall system it corresponds to 42.92% and 7.07% correspond to the rolling, underbody and geometry, 50% of the balance equation eventually The Truck Tractor would absorb them.

$$30.00 \frac{m}{s},$$

the aerodynamic drag is 85.81%, under a global system corresponds to 42.90%, 7.09% correspond to the roll, underbody and geometry.

$$33.33 \frac{m}{s},$$

aerodynamic resistance is 85.95%, under a global system corresponds to 42.97%, 7.02% correspond to the road, underbody and geometry.

$$38.88 \frac{m}{s},$$

the aerodynamic drag is 86.22%, under a global system it corresponds to 43.11%, 6.88% correspond to the roll, underbody and geometry.

$$40.0 \frac{m}{s},$$

the aerodynamic resistance is 86.28%, under a global system corresponds to 43.14%, 6.85% corresponds to the rolled, underbody and geometry.

$$50.0 \frac{m}{s},$$

the aerodynamic drag is 86.87%, under a global system corresponds to 43.43%, the 6.56% corresponds to the roll, underbody and geometry.

Between 10 and 40 m/s the global system would be within said speed range, the common denominator is seen at the increase of the speeds, where the general aerodynamic resistance $FD_{TrD}$ on the walls of the trailer decreases, but unlike this reduction, the underbody in its totality, increases its resistance, this is due to the fact that the cell makes the aerodynamic resistance decrease exponentially at higher speeds of the global system, and the differential of this reduction absorbs it directly in distributive functions, both the Truck Tractor, like all the components that are under the underbody, the limits of extreme speeds, are used to obtain values of transonic and supersonic, referential ranges, the relative values to pressures and forces, are the resultants of the behavior of the global system Tractor-Trailer, in dynamic and cyclical operating conditions, up to this point the reliability of the analysis is increased by 14.39%.

The boundary layer on the smooth surface presents greater accumulation of flow due to the kinematic and dynamic viscosity, the instability of the system produced by the detachment of the volume of air in retention or adhered in the lower boundary layer prevents the regular advancement of the upper limit in circulation, this produces a regression of the flow that increases the values obtained with kinematic variables, analyzed by cyclic equations of movement, that is, the accuracy of the method increases.

TABLE 7b

Forces and pressures associated with the walls of the trailer, on Tribodynamic surface. 10.0 m/s To 38.8 m/s (22.4 MPH–86.97 mph Speed 10.0 $\frac{m}{s}$ ~36.00 $\frac{Km}{hr}$ ~22.37 mph

| Total Area m² 124.28 R3 Input Vector N | Exposed Area MAX % 14.42 Linear Differential Equation Point | General FDTrD N 168.65 Length | Frontal FDTrD N 63.76 Differential FDTrD | Behind FDTrD N 104.89 Δ FDTrD to Pressure | General Pressure Pascal −184.63 Differential Pressure | Frontal Pressure 69.81 Pressure Powered ×100,000,0 | Behind Pressure −114.83 Speed m/s |
|---|---|---|---|---|---|---|---|
| 2.55 | 1.00 | 3.51 | 2.55 | 0.00 | 0.00 | 2.17 | 10 |
|  | 1,200.00 | 4,206.88 | 2.12 | −0.43 | −0.02 | −2,376.02 |  |
|  | 2,200.00 | 7,712.61 | 1.82 | −0.73 | −0.04 | −4,049.88 |  |
|  | 3,200.00 | 11,218.34 | 1.57 | −0.98 | −0.05 | −5,487.25 |  |
|  | 3,300.00 | 11,568.91 | 1.54 | −1.01 | −0.06 | −5,619.31 |  |
|  | 3,400.00 | 11,919.48 | 1.52 | −1.03 | −0.06 | −5,749.37 |  |
|  | 3,500.00 | 12,270.06 | 1.50 | −1.05 | −0.06 | −5,877.47 |  |
|  | 3,600.00 | 12,620.63 | 1.47 | −1.08 | −0.06 | −6,003.63 |  |

TABLE 7b-continued

Forces and pressures associated with the walls of the trailer, on Tribodynamic surface. 10.0 m/s To 38.8 m/s (22.4 MPH–86.97 mph)

| | | | | | | | |
|---|---|---|---|---|---|---|---|
| | 3,700.00 | 12,971.20 | 1.45 | −1.10 | −0.06 | −6,127.88 | |
| | 3,800.00 | 13,321.77 | 1.43 | −1.12 | −0.06 | −6,250.26 | |
| | 3,900.00 | 13,672.35 | 1.41 | −1.14 | −0.06 | −6,370.79 | |
| | 4,000.00 | 14,022.92 | 1.39 | −1.16 | −0.06 | −6,489.49 | |
| | 4,100.00 | 14,373.49 | 1.37 | −1.18 | −0.07 | −6,606.40 | |
| | 4,200.00 | 14,724.07 | 1.34 | −1.20 | −0.07 | −6,721.54 | |
| | 4,300.00 | 15,074.64 | 1.32 | −1.22 | −0.07 | −6,834.94 | |
| | 4,400.00 | 15,425.21 | 1.30 | −1.24 | −0.07 | −6,946.63 | |
| | 4,500.00 | 15,775.79 | 1.28 | −1.26 | −0.07 | −7,056.63 | |
| | 4,600.00 | 16,126.36 | 1.27 | −1.28 | −0.07 | −7,164.97 | |
| | 4,608.00 | 16,154.40 | 1.26 | −2.55 | −0.14 | −14,223.54 | |

Speed 20.0 $\frac{m}{s}$ ~72.00 $\frac{Km}{hr}$ ~44.74 mph

| Total Area m² 124.28 R3 Input Vector N | Exposed Area MAX % 14.42 Linear Differential Equation Point | General FDTrD N 478.41 Length | Frontal FDTrD N 180.88 Differential FDTrD | Behind FDTrD N 297.53 Δ FDTrD to Pressure | General Pressure Pascal −523.75 Differential Pressure | Frontal Pressure 198.02 Pressure Powered ×100,000,0 | Behind Pressure −325.73 Speed m/s |
|---|---|---|---|---|---|---|---|
| 7.23 | 1.00 | 3.51 | 7.23 | 0.00 | 0.00 | 6.15 | 20 |
| | 1,200.00 | 4,206.88 | 6.02 | −1.21 | −0.07 | −6,740.09 | |
| | 2,200.00 | 7,712.61 | 5.17 | −2.06 | −0.11 | −11,488.35 | |
| | 3,200.00 | 11,218.34 | 4.44 | −2.79 | −0.16 | −15,565.76 | |
| | 3,300.00 | 11,568.91 | 4.37 | −2.86 | −0.16 | −15,940.38 | |
| | 3,400.00 | 11,919.48 | 4.31 | −2.92 | −0.16 | −16,309.33 | |
| | 3,500.00 | 12,270.06 | 4.24 | −2.99 | −0.17 | −16,672.71 | |
| | 3,600.00 | 12,620.63 | 4.18 | −3.05 | −0.17 | −17,030.59 | |
| | 3,700.00 | 12,971.20 | 4.12 | −3.12 | −0.17 | −17,383.06 | |
| | 3,800.00 | 13,321.77 | 4.05 | −3.18 | −0.18 | −17,730.21 | |
| | 3,900.00 | 13,672.35 | 3.99 | −3.24 | −0.18 | −18,072.11 | |
| | 4,000.00 | 14,022.92 | 3.93 | −3.30 | −0.18 | −18,408.84 | |
| | 4,100.00 | 14,373.49 | 3.87 | −3.36 | −0.19 | −18,740.47 | |
| | 4,200.00 | 14,724.07 | 3.81 | −3.42 | −0.19 | −19,067.10 | |
| | 4,300.00 | 15,074.64 | 3.76 | −3.47 | −0.19 | −19,388.79 | |
| | 4,400.00 | 15,425.21 | 3.70 | −3.53 | −0.20 | −19,705.62 | |
| | 4,500.00 | 15,775.79 | 3.64 | −3.59 | −0.20 | −20,017.65 | |
| | 4,600.00 | 16,126.36 | 3.59 | −3.64 | −0.20 | −20,324.97 | |
| | 4,608.00 | 16,154.40 | 3.58 | −7.23 | −0.40 | −40,348.13 | |

Speed 30.0 $\frac{m}{s}$ ~108.00 $\frac{Km}{hr}$ ~67.11 mph.

| Total Area m² 124.28 R3 Input Vector N | Exposed Area MAX % 14.42 Linear Diffetential Equation Point | General FDTrD N 880.13 Length | Frontal FDTrD N 332.76 Differential FDTrD | Behind FDTrD N 547.37 Δ FDTrD to Pressure | General Pressure Pascal −963.54 Differential Pressure | Frontal Pressure 364.30 Pressure Powered ×100,000,0 | Behind Pressure −599.24 Speed m/s |
|---|---|---|---|---|---|---|---|
| 13.30 | 1.00 | 3.51 | 13.30 | 0.00 | 0.00 | 11.31 | 30 |
| | 1,200.00 | 4,206.88 | 11.08 | −2.22 | −0.12 | −12,399.66 | |
| | 2,200.00 | 7,712.61 | 9.52 | −3.79 | −0.21 | −21,134.98 | |
| | 3,200.00 | 11,218.34 | 8.17 | 5.13 | −0.29 | −28,636.15 | |
| | 3,300.00 | 11,568.91 | 8.05 | −5.26 | −0.29 | −29,325.32 | |
| | 3,400.00 | 11,919.48 | 7.93 | −5.38 | −0.30 | −30,004.08 | |
| | 3,500.00 | 12,270.06 | 7.81 | −5.50 | −0.31 | −30,672.58 | |
| | 3,600.00 | 12,620.63 | 7.69 | −5.62 | −0.31 | −31,330.97 | |
| | 3,700.00 | 12,971.20 | 7.57 | −5.73 | −0.32 | −31,979.42 | |
| | 3,800.00 | 13,321.77 | 7.46 | −5.85 | −0.33 | −32,618.05 | |
| | 3,900.00 | 13,672.35 | 7.35 | −5.96 | −0.33 | −33,247.04 | |
| | 4,000.00 | 14,022.92 | 7.23 | −6.07 | −0.34 | −33,866.52 | |
| | 4,100.00 | 14,373.49 | 7.13 | −6.18 | −0.34 | −34,476.63 | |
| | 4,200.00 | 14,724.07 | 7.02 | −6.29 | −0.35 | −35,077.52 | |
| | 4,300.00 | 15,074.64 | 6.91 | −6.39 | −0.36 | −35,669.33 | |
| | 4,400.00 | 15,425.21 | 6.81 | −6.50 | −0.36 | −36,252.19 | |
| | 4,500.00 | 15,775.79 | 6.70 | −6.60 | −0.37 | −36,826.24 | |
| | 4,600.00 | 16,126.36 | 6.60 | −6.70 | −0.37 | −37,391.61 | |
| | 4,608.00 | 16,154.40 | 6.59 | −13.30 | −0.74 | −74,227.97 | |

TABLE 7b-continued

Forces and pressures associated with the walls of the trailer, on Tribodynamic surface. 10.0 m/s To 38.8 m/s (22.4 MPH–86.97 mph Speed 33.33 $\frac{m}{s}$ ~119.99 $\frac{Km}{hr}$ ~74.56 mph

| Total Area m² 124.28 R3 Input Vector N | Exposed Area MAX % 14.42 Linear Diffetential Equation Point | General FDTrD N 1,030.99 Length | Frontal FDTrD N 389.80 Differential FDTrD | Behind FDTrD N 641.19 Δ FDTrD to Pressure | General Pressure Pascal −1,128.70 Differential Pressure | Frontal Pressure 426.74 Pressure Powered ×100,000,0 | Behind Pressure −701.96 Speed m/s |
|---|---|---|---|---|---|---|---|
| 15.59 | 1.00 | 3.51 | 15.58 | 0.00 | 0.00 | 13.25 | 33.33 |
| | 1,200.00 | 4,206.88 | 12.98 | −2.60 | −0.15 | −14,525.06 | |
| | 2,200.00 | 7,712.61 | 11.15 | −4.44 | −0.25 | −24,757.67 | |
| | 3,200.00 | 11,218.34 | 9.57 | −6.01 | −0.34 | −33,544.59 | |
| | 3,300.00 | 11,568.91 | 9.43 | −6.16 | −0.34 | −34,351.89 | |
| | 3,400.00 | 11,919.48 | 9.29 | −6.30 | −0.35 | −35,147.00 | |
| | 3,500.00 | 12,270.06 | 9.15 | −6.44 | −0.36 | −35,930.08 | |
| | 3,600.00 | 12,620.63 | 9.01 | −6.58 | −0.37 | −36,701.33 | |
| | 3,700.00 | 12,971.20 | 8.87 | −6.71 | −0.37 | −37,460.92 | |
| | 3,800.00 | 13,321.77 | 8.74 | −6.85 | −0.38 | −38,209.02 | |
| | 3,900.00 | 13,672.35 | 8.60 | −6.98 | −0.39 | −38,945.82 | |
| | 4,000.00 | 14,022.92 | 8.47 | −7.11 | −0.40 | −39,671.48 | |
| | 4,100.00 | 14,373.49 | 8.35 | −7.24 | −0.40 | −40,386.17 | |
| | 4,200.00 | 14,724.07 | 8.22 | −7.36 | −0.41 | 41,090.06 | |
| | 4,300.00 | 15,074.64 | 8.10 | −7.49 | −0.42 | −41,783.30 | |
| | 4,400.00 | 15,425.21 | 7.97 | −7.61 | −0.42 | −42,466.07 | |
| | 4,500.00 | 15,775.79 | 7.85 | −7.73 | −0.43 | −43,138.52 | |
| | 4,600.00 | 16,126.36 | 7.73 | −7.85 | −0.44 | −43,800.80 | |
| | 4,608.00 | 16,154.40 | 7.73 | −15.58 | −0.87 | −86,951.18 | |

Speed 38.88 $\frac{m}{s}$ ~139.97 $\frac{Km}{hr}$ ~86.97 mph

| Total Area m² 124.28 R3 Input Vector N | Exposed Area MAX % 14.42 Linear Diffetential Equation Point | General FDTrD N 1,299.50 Length | Frontal FDTrD N 491.32 Differential FDTrD | Behind FDTrD N 808.18 Δ FDTrD to Pressure | General Pressure Pascal −1,422.65 Differential Pressure | Frontal Pressure 537.88 Pressure Powered ×100,000,0 | Behind Pressure −884.77 Speed m/s |
|---|---|---|---|---|---|---|---|
| 19.64 | 1.00 | 3.51 | 19.64 | 0.00 | 0.00 | 16.69 | 38.88 |
| | 1,200.00 | 4,206.88 | 16.36 | −3.28 | −0.18 | −18,307.91 | |
| | 2,200.00 | 7,712.61 | 14.05 | −5.59 | −0.31 | −31,205.47 | |
| | 3,200.00 | 11,218.34 | 12.07 | −7.58 | −0.42 | −42,280.82 | |
| | 3,300.00 | 11,568.91 | 11.88 | −7.76 | −0.43 | −43,298.38 | |
| | 3,400.00 | 11,919.48 | 11.70 | −7.94 | −0.44 | −44,300.55 | |
| | 3,500.00 | 12,270.06 | 11.53 | −8.12 | −0.45 | −45,287.58 | |
| | 3,600.00 | 12,620.63 | 11.35 | −8.29 | −0.46 | −46,259.69 | |
| | 3,700.00 | 12,971.20 | 11.18 | −8.46 | −0.47 | −47,217.10 | |
| | 3,800.00 | 13,321.77 | 11.01 | −8.63 | −0.48 | −48,160.04 | |
| | 3,900.00 | 13,672.35 | 10.85 | −8.80 | −0.49 | −49,088.73 | |
| | 4,000.00 | 14,022.92 | 10.68 | −8.96 | −0.50 | −50,003.37 | |
| | 4,100.00 | 14,373.49 | 10.52 | −9.12 | −0.51 | −50,904.20 | |
| | 4,200.00 | 14,724.07 | 10.36 | −9.28 | −0.52 | −51,791.40 | |
| | 4,300.00 | 15,074.64 | 10.20 | −9.44 | −0.53 | −52,665.20 | |
| | 4,400.00 | 15,425.21 | 10.05 | −9.59 | −0.54 | −53,525.78 | |
| | 4,500.00 | 15,775.79 | 9.90 | −9.74 | −0.54 | −54,373.36 | |
| | 4,600.00 | 16,126.36 | 9.75 | −9.89 | −0.55 | −55,208.12 | |
| | 4,608.00 | 16,154.40 | 9.74 | −19.64 | −1.10 | −109,596.42 | |

Table 9b. Show the result of the surface tribo-electric effect, or electronic adhesion, (on the smooth surface it is always 42.84%), for a defined period of time, this electrical permanence increases the aerodynamic resistance to the advance, product of the superficial vectorial retention, that in the exposed cases of different speeds, increases the adherence of the flow and is definitively the one that frees of dynamic load to the vector coming from the vectorial input of R3. It affects the behavior to the point that produces a surface harmonic wave, which affects all aspects of equipment stability such as the behavior of damping and wear of rolling elements such as tires and bearings, in addition to the deflection behavior of The beam under dynamic load conditions, that is, when fluctuations due to flow retention, affects the resonance and the natural frequency of the structure. The input value in R3, is the same value calculated by the Reynolds Transport Theorem, that is to say, that the loss by friction components is already associated, basically the resolution is the permanence of the flow in a normal operating regime, product of the variations of the electrostatic charge of the air particle, when submitted by friction, with the aluminum surface in a given cycle and time, remember that the design intends to contain the volume of air, by geometry and by Van de Graaft effect (by the inner spherical cap), and produce a neutral friction surface. With all of the above, and depending on the permanence of the comparative flow between Tables 9.a., versus Table 9.b., the following is deduced:

At a speed of $$10.00 \frac{m}{s},$$

the Tribodynamic cell retains on its active contact surface 27.3% (Flow Up in advance), of the airflow under tribo-electric adhesion conditions, the containment in the inner vortex of the cell is 15.54% (Flow down in containment), by this variable the renewal of flow occurs every 2.75 times (by rotation and projection of the flow), the permanence of the surface harmonic wave, dissipates with a anticipation of 37.72 meters (Table 18), versus the wave produced on the normal smooth surface; FIG. 11b (wave N° 3' versus wave N° 3).

At a speed of $$20.00 \frac{m}{s},$$

the tribodynamic cell retains on its active contact surface 32.82% (Flow Up in advance), of the air flow in conditions of electric Tribo adhesion, the containment in the inner vortex of the cell is 10.02% (Flow down in containment), by this variable the renewal of flow occurs every 4.27 times (By rotation and projection of the flow), the permanence of the surface harmonic wave, dissipates with an anticipation of 86.93 meters (Table 18), versus the wave produced on the normal smooth surface; FIG. 11b (wave N° 3' versus wave N° 3).

At a speed of $$30.00 \frac{m}{s},$$

the tribodynamic cell retains on its active contact surface the 32.90% (Flow Up in advance), the air flow in conditions of tribo-electric adhesion, the containment in the inner vortex of the cell is 9.94% (Flow down in containment), by this variable the renewal of flow occurs every 4.32 times (by rotation and projection of the flow), the permanence of the surface harmonic wave, dissipates with a anticipation of 130.64 meters (Table 18), versus the wave produced in the normal smooth surface; FIG. 11b (wave N° 3' versus wave N° 3).

At a speed of $$33.33 \frac{m}{s},$$

the tribodynamic cell retains on its active contact surface 32.63% (Flow Up in advance), of the air flow in tribo-electric adhesion conditions, the containment in the inner vortex of the cell is 10.21% (Flow down in containment), by this variable the renewal of flow occurs every 4.19 times (by rotation and projection of the flow), the permanence of the surface harmonic wave (FIG. 10b), dissipates with an anticipation of 44.24 meters (Table 18), versus the wave produced in the normal smooth surface; FIG. 11b (wave N° 3' versus wave N° 3).

At a speed of $$38.88 \frac{m}{s},,$$

the tribodynamic cell retains on its active contact surface 32.05% (Flow Up in advance), of the airflow in conditions of tribo-electric adhesion, the containment in the inner vortex of the cell is 10.77% (Flow down in containment), by this variable the renewal of flow occurs every 3.98 times (by rotation and projection of the flow), the permanence of the surface harmonic wave, dissipates with a anticipation of 165.99 meters (Table 18), versus the wave produced on the normal smooth surface; FIG. 11b (wave N° 3' versus wave N° 3).

TABLE 9.b

Differential Analysis of Tribo–electric Cycle as a Function of time Smooth Surface in Semi-Trailer
Linear Differential Equation Dynamic Tribo Dynamic Surface Speed 10.00 $\left[\frac{m}{s}\right]$ ~36.00 $\left[\frac{Km}{hr}\right]$ ~22.37 mph

| % Tribo electrical | | | Differential N | | | | | Differential F | | |
|---|---|---|---|---|---|---|---|---|---|---|
| 27.3006 | | | 1.16481 | | | | | 0.36072 | | |

| Point L = 16.4100 m | Vector Cycles | C1 | C2 | C3 | C4 | C5 | C6 | C7 | C8 | Function Time t |
|---|---|---|---|---|---|---|---|---|---|---|
| $C_1$ | 0.0026 | 2.5495 | 0.534482 | 0.112051 | 0.023491 | 0.004925 | 0.001032 | 0.000216 | 0.000045 | 0.000010 | 0.49235 |
| $C_2$ | 0.0023 | 2.2672 | 0.475295 | 0.099643 | 0.020889 | 0.004379 | 0.000918 | 0.000192 | 0.000040 | 0.000008 | 0.44759 |
| $C_3$ | 0.0021 | 1.9848 | 0.416109 | 0.087235 | 0.018288 | 0.003834 | 0.000804 | 0.000169 | 0.000035 | 0.000007 | 0.40283 |
| $C_4$ | 0.0018 | 1.7025 | 0.356923 | 0.074827 | 0.015687 | 0.003289 | 0.000689 | 0.000145 | 0.000030 | 0.000006 | 0.35807 |
| $C_5$ | 0.0015 | 1.4202 | 0.297736 | 0.062419 | 0.013086 | 0.002743 | 0.000575 | 0.000121 | 0.000025 | 0.000005 | 0.31331 |
| $C_6$ | 0.0012 | 1.1379 | 0.238550 | 0.050010 | 0.010484 | 0.002198 | 0.000461 | 0.000097 | 0.000020 | 0.000004 | 0.26855 |

TABLE 9.b-continued

Differential Analysis of Tribo–electric Cycle as a Function of time Smooth Surface in Semi-Trailer
Linear Differential Equation Dynamic Tribo Dynamic Surface

| | | | | | | | | | | |
|---|---|---|---|---|---|---|---|---|---|---|
| $C_7$ | 0.0009 | 0.8556 | 0.179364 | 0.037602 | 0.007883 | 0.001653 | 0.000346 | 0.000073 | 0.000015 | 0.000003 | 0.22380 |
| $C_8$ | 0.0006 | 0.5732 | 0.120177 | 0.025194 | 0.005282 | 0.001107 | 0.000232 | 0.000049 | 0.000010 | 0.000002 | 0.17904 |
| $C_9$ | 0.0003 | 0.2909 | 0.060991 | 0.012786 | 0.002681 | 0.000562 | 0.000118 | 0.000025 | 0.000005 | 0.000001 | 0.13428 |
| $C_{10}$ | 0.0000 | 0.0086 | 0.001805 | 0.000378 | 0.000079 | 0.000017 | 0.000003 | 0.000001 | 0.000000 | 0.000000 | 0.08952 |
| $C_{11}$ | −0.0003 | −0.2737 | −0.057382 | −0.012030 | −0.002522 | −0.000529 | −0.000111 | −0.000023 | −0.000005 | −0.000001 | 0.04476 |

Speed 20.00 $\left[\frac{m}{s}\right]$ ~72.00 $\left[\frac{Km}{hr}\right]$ ~44.74 mph

| % Tribo electrical | Differential N | Differential F |
|---|---|---|
| 32.8177 | 1.16481 | 1.02327 |

| Point L = 16.4100 m | Vector Cycles | C1 | C2 | C3 | C4 | C5 | C6 | C7 | C8 | Function Time t |
|---|---|---|---|---|---|---|---|---|---|---|
| $C_1$ | 0.0075 | 7.2321 | 1.516173 | 0.317856 | 0.066636 | 0.013970 | 0.002929 | 0.000614 | 0.000129 | 0.000027 | 0.49235 |
| $C_2$ | 0.0068 | 6.5617 | 1.375628 | 0.288392 | 0.060459 | 0.012675 | 0.002657 | 0.000557 | 0.000117 | 0.000024 | 0.44759 |
| $C_3$ | 0.0061 | 5.8914 | 1.235084 | 0.258928 | 0.054282 | 0.011380 | 0.002386 | 0.000500 | 0.000105 | 0.000022 | 0.40283 |
| $C_4$ | 0.0054 | 5.2210 | 1.094540 | 0.229463 | 0.048106 | 0.010085 | 0.002114 | 0.000443 | 0.000093 | 0.000019 | 0.35807 |
| $C_5$ | 0.0047 | 4.5506 | 0.953996 | 0.199999 | 0.041929 | 0.008790 | 0.001843 | 0.000386 | 0.000081 | 0.000017 | 0.31331 |
| $C_6$ | 0.0040 | 3.8802 | 0.813452 | 0.170535 | 0.035752 | 0.007495 | 0.001571 | 0.000329 | 0.000069 | 0.000014 | 0.26855 |
| $C_7$ | 0.0033 | 3.2098 | 0.672907 | 0.141071 | 0.029575 | 0.006200 | 0.001300 | 0.000272 | 0.000057 | 0.000012 | 0.22380 |
| $C_8$ | 0.0026 | 2.5394 | 0.532363 | 0.111607 | 0.023398 | 0.004905 | 0.001028 | 0.000216 | 0.000045 | 0.000009 | 0.17904 |
| $C_9$ | 0.0019 | 1.8690 | 0.391819 | 0.082142 | 0.017221 | 0.003610 | 0.000757 | 0.000159 | 0.000033 | 0.000007 | 0.13428 |
| $C_{10}$ | 0.0012 | 1.1986 | 0.251275 | 0.052678 | 0.011044 | 0.002315 | 0.000485 | 0.000102 | 0.000021 | 0.000004 | 0.08952 |
| $C_{11}$ | 0.0005 | 0.5282 | 0.110731 | 0.023214 | 0.004867 | 0.001020 | 0.000214 | 0.000045 | 0.000009 | 0.000002 | 0.04476 |

Speed 30.00 $\left[\frac{m}{s}\right]$ ~108.00 $\left[\frac{Km}{hr}\right]$ ~67.11 mph

| % Tribo electrical | Differential N | Differential F |
|---|---|---|
| 32.8990 | 1.16481 | 1.88249 |

| Point L = 16.4100 m | Vector Cycles | C1 | C2 | C3 | C4 | C5 | C6 | C7 | C8 | Function Time t |
|---|---|---|---|---|---|---|---|---|---|---|
| $C_1$ | 0.0138 | 13.3049 | 2.789285 | 0.584756 | 0.122590 | 0.025700 | 0.005388 | 0.001130 | 0.000237 | 0.000050 | 0.49235 |
| $C_2$ | 0.0125 | 12.0751 | 2.531469 | 0.530706 | 0.111259 | 0.023325 | 0.004890 | 0.001025 | 0.000215 | 0.000045 | 0.44759 |
| $C_3$ | 0.0112 | 10.8453 | 2.273652 | 0.476657 | 0.099928 | 0.020949 | 0.004392 | 0.000921 | 0.000193 | 0.000040 | 0.40283 |
| $C_4$ | 0.0100 | 9.6155 | 2.015836 | 0.422607 | 0.088597 | 0.018574 | 0.003894 | 0.000816 | 0.000171 | 0.000036 | 0.35807 |
| $C_5$ | 0.0087 | 8.3858 | 1.758020 | 0.368558 | 0.077266 | 0.016198 | 0.003396 | 0.000712 | 0.000149 | 0.000031 | 0.31331 |
| $C_6$ | 0.0074 | 7.1560 | 1.500204 | 0.314508 | 0.065935 | 0.013823 | 0.002898 | 0.000608 | 0.000127 | 0.000027 | 0.26855 |
| $C_7$ | 0.0061 | 5.9262 | 1.242387 | 0.260459 | 0.054603 | 0.011447 | 0.002400 | 0.000503 | 0.000105 | 0.000022 | 0.22380 |
| $C_8$ | 0.0049 | 4.6964 | 0.984571 | 0.206409 | 0.043272 | 0.009072 | 0.001902 | 0.000399 | 0.000084 | 0.000018 | 0.17904 |
| $C_9$ | 0.0036 | 3.4666 | 0.726755 | 0.152360 | 0.031941 | 0.006696 | 0.001404 | 0.000294 | 0.000062 | 0.000013 | 0.13428 |
| $C_{10}$ | 0.0023 | 2.2368 | 0.468939 | 0.098310 | 0.020610 | 0.004321 | 0.000906 | 0.000190 | 0.000040 | 0.000008 | 0.08952 |
| $C_{11}$ | 0.0010 | 1.0071 | 0.211123 | 0.044260 | 0.009279 | 0.001945 | 0.000408 | 0.000085 | 0.000018 | 0.000004 | 0.04476 |

Speed 33.33 $\left[\frac{m}{s}\right]$ ~119.99 $\left[\frac{Km}{hr}\right]$ ~74.56 mph

| % Tribo electrical | Differential N | Differential F |
|---|---|---|
| 32.6340 | 1.16481 | 2.20516 |

| Point L = 16.4100 m | Vector Cycles | C1 | C2 | C3 | C4 | C5 | C6 | C7 | C8 | Function Time t |
|---|---|---|---|---|---|---|---|---|---|---|
| $C_1$ | 0.0161 | 15.5854 | 3.267388 | 0.684987 | 0.143603 | 0.030105 | 0.006311 | 0.001323 | 0.000277 | 0.000058 | 0.49235 |
| $C_2$ | 0.0146 | 14.1314 | 2.962549 | 0.621080 | 0.130205 | 0.027297 | 0.005723 | 0.001200 | 0.000252 | 0.000053 | 0.44759 |
| $C_3$ | 0.0131 | 12.6773 | 2.657711 | 0.557172 | 0.116808 | 0.024488 | 0.005134 | 0.001076 | 0.000226 | 0.000047 | 0.40283 |
| $C_4$ | 0.0116 | 11.2232 | 2.352872 | 0.493265 | 0.103410 | 0.021679 | 0.004545 | 0.000953 | 0.000200 | 0.000042 | 0.35807 |
| $C_5$ | 0.0101 | 9.7691 | 2.048033 | 0.429357 | 0.090012 | 0.018870 | 0.003956 | 0.000829 | 0.000174 | 0.000036 | 0.31331 |
| $C_6$ | 0.0086 | 8.3150 | 1.743195 | 0.365450 | 0.076614 | 0.016062 | 0.003367 | 0.000706 | 0.000148 | 0.000031 | 0.26855 |
| $C_7$ | 0.0071 | 6.8610 | 1.438356 | 0.301542 | 0.063216 | 0.013253 | 0.002778 | 0.000582 | 0.000122 | 0.000026 | 0.22380 |
| $C_8$ | 0.0056 | 5.4069 | 1.133517 | 0.237635 | 0.049819 | 0.010444 | 0.002190 | 0.000459 | 0.000096 | 0.000020 | 0.17904 |
| $C_9$ | 0.0041 | 3.9528 | 0.828678 | 0.173727 | 0.036421 | 0.007635 | 0.001601 | 0.000336 | 0.000070 | 0.000015 | 0.13428 |
| $C_{10}$ | 0.0026 | 2.4987 | 0.523840 | 0.109820 | 0.023023 | 0.004827 | 0.001012 | 0.000212 | 0.000044 | 0.000009 | 0.08952 |
| $C_{11}$ | 0.0011 | 1.0446 | 0.219001 | 0.045912 | 0.009625 | 0.002018 | 0.000423 | 0.000089 | 0.000019 | 0.000004 | 0.04476 |

TABLE 9.b-continued

Differential Analysis of Tribo–electric Cycle as a Function of time Smooth Surface in Semi-Trailer
Linear Differential Equation Dynamic Tribo Dynamic Surface Speed 38.88 $\left[\frac{m}{s}\right]$ ~139.97 $\left[\frac{Km}{hr}\right]$ ~86.97 mph

| % Tribo electrical | | Differential N | | | | | Differential F | | | |
|---|---|---|---|---|---|---|---|---|---|---|
| 32.0525 | | 1.16481 | | | | | 2.77947 | | | |

| Point L = 16.4100 m | Vector Cycles | C1 | C2 | C3 | C4 | C5 | C6 | C7 | C8 | Function Time t |
|---|---|---|---|---|---|---|---|---|---|---|
| $C_1$ | 0.0203 | 19.6445 | 4.118335 | 0.863383 | 0.181003 | 0.037946 | 0.007955 | 0.001668 | 0.000350 | 0.000073 | 0.49235 |
| $C_2$ | 0.0184 | 17.7743 | 3.726275 | 0.781190 | 0.163771 | 0.034334 | 0.007198 | 0.001509 | 0.000316 | 0.000066 | 0.44759 |
| $C_3$ | 0.0165 | 15.9042 | 3.334216 | 0.698997 | 0.146540 | 0.030721 | 0.006441 | 0.001350 | 0.000283 | 0.000059 | 0.40283 |
| $C_4$ | 0.0145 | 14.0341 | 2.942156 | 0.616804 | 0.129309 | 0.027109 | 0.005683 | 0.001191 | 0.000250 | 0.000052 | 0.35807 |
| $C_5$ | 0.0126 | 12.1640 | 2.550097 | 0.534611 | 0.112078 | 0.023496 | 0.004926 | 0.001033 | 0.000216 | 0.000045 | 0.31331 |
| $C_6$ | 0.0107 | 10.2938 | 2.158037 | 0.452419 | 0.094847 | 0.019884 | 0.004169 | 0.000874 | 0.000183 | 0.000038 | 0.26855 |
| $C_7$ | 0.0087 | 8.4237 | 1.765978 | 0.370226 | 0.077616 | 0.016272 | 0.003411 | 0.000715 | 0.000150 | 0.000031 | 0.22380 |
| $C_8$ | 0.0068 | 6.5536 | 1.373918 | 0.288033 | 0.060384 | 0.012659 | 0.002654 | 0.000556 | 0.000117 | 0.000024 | 0.17904 |
| $C_9$ | 0.0048 | 4.6835 | 0.981859 | 0.205840 | 0.043153 | 0.009047 | 0.001897 | 0.000398 | 0.000083 | 0.000017 | 0.13428 |
| $C_{10}$ | 0.0029 | 2.8133 | 0.589799 | 0.123648 | 0.025922 | 0.005434 | 0.001139 | 0.000239 | 0.000050 | 0.000010 | 0.08952 |
| $C_{11}$ | 0.0010 | 0.9432 | 0.197740 | 0.041455 | 0.008691 | 0.001822 | 0.000382 | 0.000080 | 0.000017 | 0.000004 | 0.04476 |

TABLE 18

Harmonic Cycle Propagation as a Function of the Time and Distance
TRIBO ELECTRIC DRAG

| Speed m/s | Speed mph | Period Dissipation t Tribo-Dynamic [seg] | Distance Dissipation Tribo-Dynamic [m] | Distance Dissipation Tribo-Dynamic [mi] | Period Dissipation t smooth [seg] | Distance Dissipation Smooth [m] | Distance Dissipation smooth [mi] |
|---|---|---|---|---|---|---|---|
| 10.00 | 22.37 | 00:00:13.818 | 138.18 | 0.086 | 00:00:17.590 | 175.90 | 0.109 |
| 20.00 | 44.74 | 00:00:13.244 | 264.87 | 0.165 | 00:00:17.590 | 351.81 | 0.219 |
| 30.00 | 67.11 | 00:00:13.236 | 397.07 | 0.247 | 00:00:17.590 | 527.71 | 0.328 |
| 33.33 | 74.56 | 00:00:13.263 | 442.05 | 0.275 | 00:00:17.590 | 586.28 | 0.364 |
| 38.88 | 86.97 | 00:00:13.321 | 517.92 | 0.322 | 00:00:17.590 | 683.91 | 0.425 |
| 40.00 | 89.48 | 00:00:13.334 | 533.36 | 0.331 | 00:00:17.590 | 703.61 | 0.437 |
| 50.00 | 111.85 | 00:00:12.487 | 624.39 | 0.388 | 00:00:17.590 | 879.51 | 0.547 |
| 100.00 | 223.69 | 00:00:08.817 | 881.75 | 0.548 | 00:00:17.590 | 1,759.03 | 1.093 |
| 200.00 | 447.39 | 00:00:06.848 | 1,369.63 | 0.851 | 00:00:17.590 | 3,518.06 | 2.186 |
| 343.00 | 767.27 | 00:00:03.446 | 1,182.13 | 0.735 | 00:00:17.590 | 6,033.47 | 3.749 |

Figure 32A:
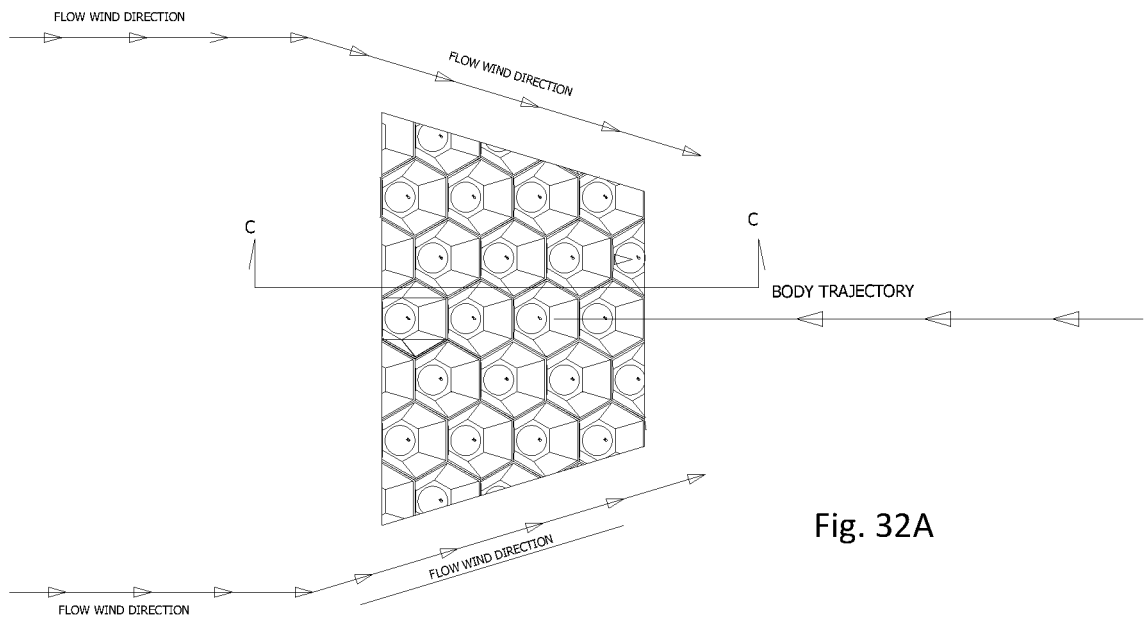
FIG. 32A to 32C are views illustrating the surface application of the tribodynamic cell system of FIG. 4.1 to an n-dimensional pyramid with regular and irregular base, and aerodynamic drag reduction in angular rear plane.
Figure 32B:
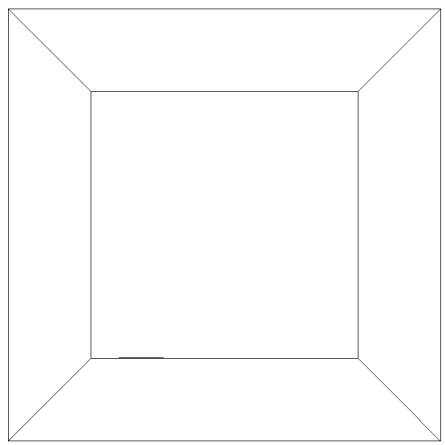
Figure 32C:
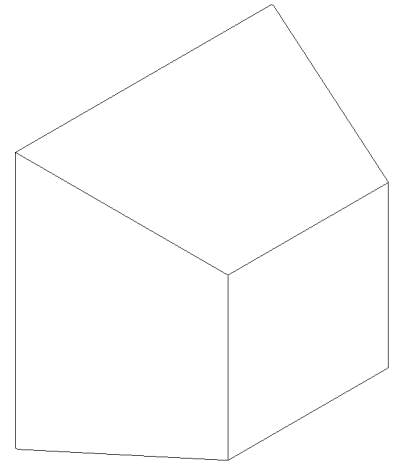
Figure 33A:
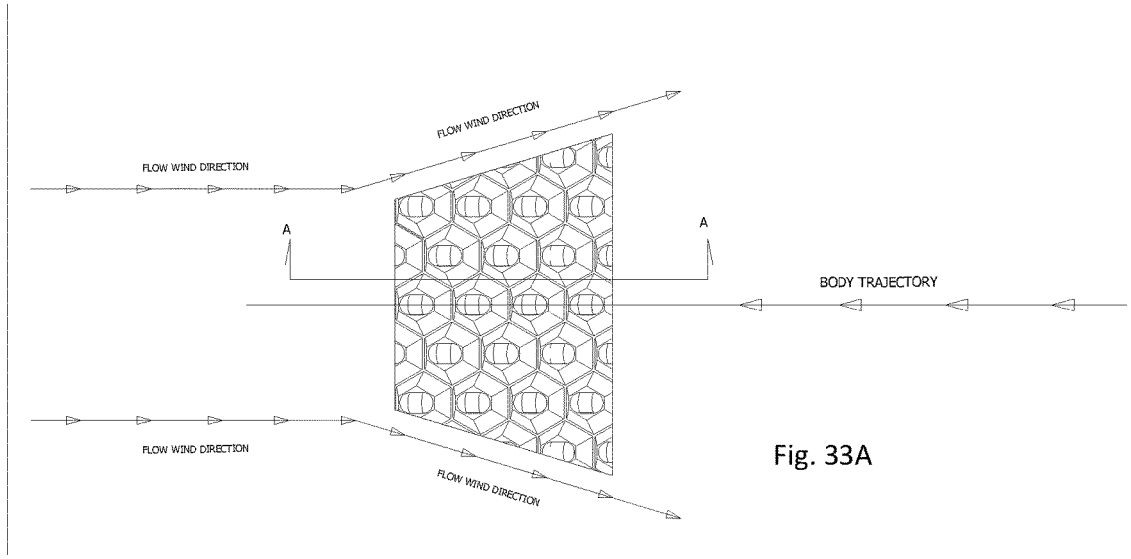
FIG. 33A to 33C are views illustrating the surface application of the tribodynamic cell system of FIG. 4.2 to an n-dimensional pyramid with regular and irregular base, and aerodynamic drag reduction in angular frontal plane.
Figure 33B:
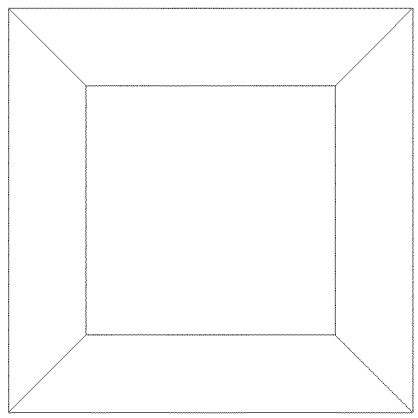
Figure 33C:
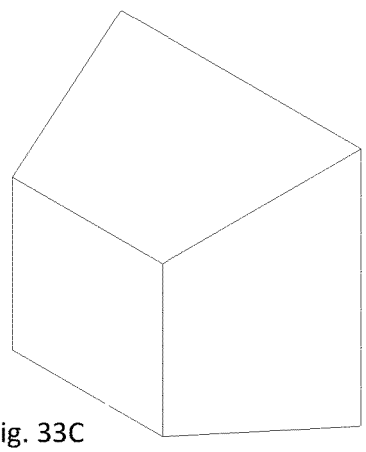
Figure 34A:
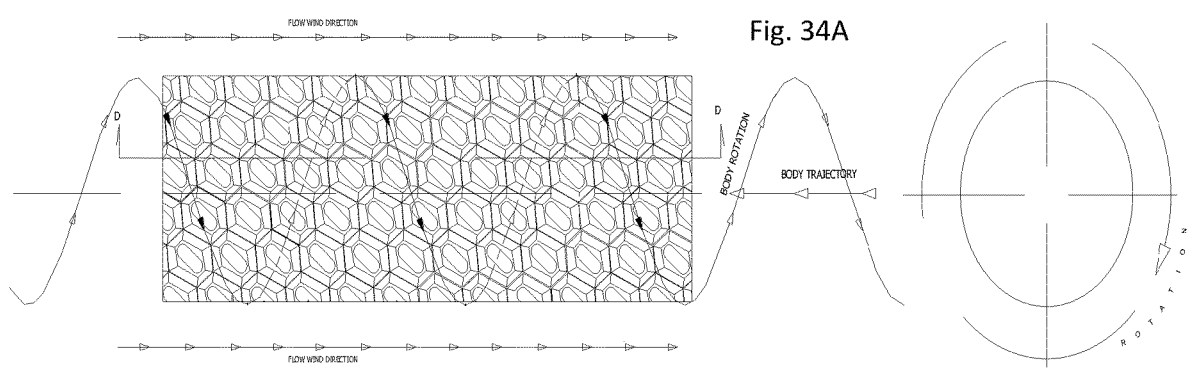
FIGS. 34A and 34B are views illustrating the surface application of the tribodynamic cell system of FIG. 4.3 to Bezier surfaces and aerodynamic drag reduction in forced rotational advance systems.
Figure 34B:
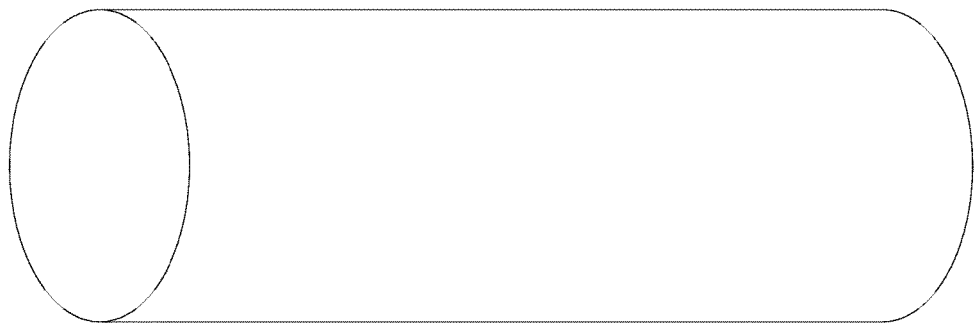
Figure 35A:
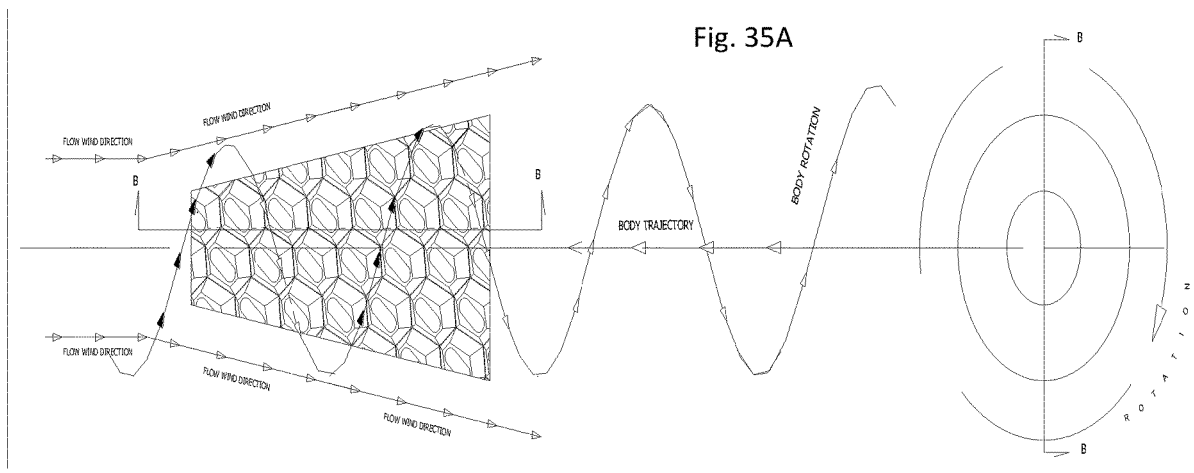
FIGS. 35A and 35B are views illustrating the surface application of the tribodynamic cell system of FIG. 4.4 to Bezier surfaces and aerodynamic drag reduction in forced rotational and elliptical advance systems.
Figure 35B:
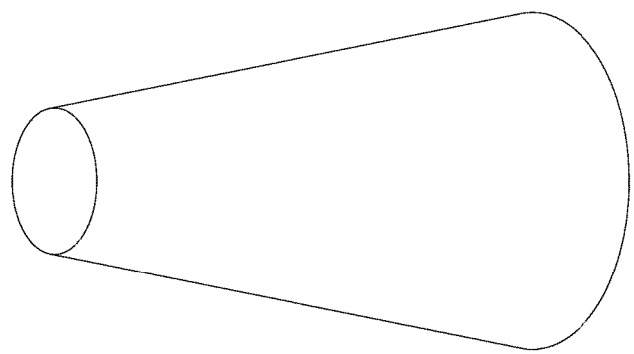

FIG. 32A to 32C are views illustrating the surface application of the tribodynamic cell system of FIG. 4.1 to an n-dimensional pyramid with regular and irregular base, and aerodynamic drag reduction in angular rear plane. The angular position of the vortex is opposite to the frontal plane and allows greater flow retention at the rear angle. FIG. 33A to 33C are views illustrating the surface application of the tribodynamic cell system of FIG. 4.2 to an n-dimensional pyramid with regular and irregular base, and aerodynamic drag reduction in angular frontal plane. The angular position of the vortex is to the frontal plane, with longer half-capsule base and not parallel to the upper hexagon, which allows greater tribodynamic loading and flow containment due to the high pressure frontal inclined plane. FIGS. 34A and 34B are views illustrating the surface application of the tribodynamic cell system of FIG. 4.3 to Bezier surfaces and aerodynamic drag reduction in forced rotational advance systems. The perpendicular position of the vortex is to the frontal plane, with a longer half-capsule base, and parallel to the upper hexagon, which allows which allows greater tribodynamic loading and flow containment in addition to forcing rotation in the body during advance. FIGS. 35A and 35B are views illustrating the surface application of the tribodynamic cell system of FIG. 4.4 to Bezier surfaces and aerodynamic drag reduction in forced rotational and elliptical advance systems. The angular position of the vortex is to the frontal plane, with a longer half-capsule base not parallel to the upper hexagon, which allows greater tribodynamic loading and flow containment in addition to forcing rotation in the body during advance due to the high pressure frontal inclined plane.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As may be used herein, the terms "substantially" and "approximately" provides an industry-accepted tolerance for its corresponding term and/or relativity between items. Such an industry-accepted tolerance ranges from less than one percent to fifty percent. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

The invention claimed is:

1. A tribodynamic cell system for reducing aerodynamic resistance of an equipment surface exposed to the aerodynamic resistance, the tribodynamic cell system comprising:
   a plurality of tribodynamic cells arranged in a surface pattern, each tribodynamic cell defining a hexagonal pyramidal volume and comprising
      an upper hexagonal frame,
      a lower hexagonal frame,
      six planar side elements coupled together between the upper hexagonal frame and the lower hexagonal frame to define the hexagonal pyramidal volume, and
      a rounded cap coupled to the six geometric elements and extending below the lower hexagonal frame.

2. The tribodynamic cell system according to claim 1, wherein during operation as the equipment surface is exposed to aerodynamic resistance, each tribodynamic cell forms a tribodynamic flow containment cell that produces a vortex of superficial air that protects the equipment surface and therefore reduces the aerodynamic resistance.

3. The tribodynamic cell system according to claim 1, wherein each of the six planar side elements comprises a trapezoid geometric element.

4. The tribodynamic cell system according to claim 1, wherein each of the six planar side elements comprises an isosceles trapezoid geometric element.

5. The tribodynamic cell system according to claim 1, wherein the rounded cap comprises a semispherical cap.

6. The tribodynamic cell system according to claim 1, wherein the rounded cap comprises a semi-capsular cap.

7. The tribodynamic cell system according to claim 1, wherein a depth of the hexagonal pyramidal volume of the tribodynamic cell is based upon a material of the equipment surface.

8. A transportation container having a container surface exposed to aerodynamic resistance, the transportation container comprising:
   a tribodynamic cell system on the container surface for reducing aerodynamic resistance thereof and including
      a plurality of tribodynamic cells arranged in a surface pattern, each tribodynamic cell defining a hexagonal pyramidal volume and comprising
an upper hexagonal frame,
a lower hexagonal frame,
six planar side elements coupled together between the upper hexagonal frame and the lower hexagonal frame to define the hexagonal pyramidal volume, and
a rounded cap coupled to the six geometric elements and extending below the lower hexagonal frame.

9. The transportation container according to claim 8, wherein during operation as the container surface is exposed to aerodynamic resistance, each tribodynamic cell forms a tribodynamic flow containment cell that produces a vortex of superficial air that protects the container surface and therefore reduces the aerodynamic resistance.

10. The transportation container according to claim 8, wherein each of the six planar side elements comprises a trapezoid geometric element.

11. The transportation container according to claim 8, wherein each of the six planar side elements comprises an isosceles trapezoid geometric element.

12. The transportation container according to claim 8, wherein the rounded cap comprises a semispherical cap.

13. The transportation container according to claim 8, wherein the rounded cap comprises a semi-capsular cap.

14. The transportation container according to claim 8, wherein a depth of the hexagonal pyramidal volume of the tribodynamic cell is based upon a material of the container surface.

15. A tribodynamic cell for reducing aerodynamic resistance of an equipment surface exposed to the aerodynamic resistance, the tribodynamic cell comprising:
an upper hexagonal frame;
a lower hexagonal frame;
six planar side elements coupled together between the upper hexagonal frame and the lower hexagonal frame to define a hexagonal pyramidal volume; and
a rounded cap coupled to the six geometric elements and extending below the lower hexagonal frame;
wherein during operation as the equipment surface is exposed to aerodynamic resistance, the tribodynamic cell forms a tribodynamic flow containment cell that produces a vortex of superficial air that protects the equipment surface and therefore reduces the aerodynamic resistance.

16. The tribodynamic cell according to claim 15, wherein each of the six planar side elements comprises a trapezoid geometric element.

17. The tribodynamic cell according to claim 15, wherein each of the six planar side elements comprises an isosceles trapezoid geometric element.

18. The tribodynamic cell according to claim 15, wherein the rounded cap comprises a semispherical cap.

19. The tribodynamic cell according to claim 15, wherein the rounded cap comprises a semi-capsular cap.

20. The tribodynamic cell according to claim 15, wherein a depth of the hexagonal pyramidal volume of the tribodynamic cell is based upon a material of the equipment surface.

\* \* \* \* \*